US009426456B2

(12) United States Patent
Kobayashi et al.

(10) Patent No.: US 9,426,456 B2
(45) Date of Patent: Aug. 23, 2016

(54) DISPLAY DEVICE AND VIDEO VIEWING SYSTEM

(71) Applicant: Panasonic Liquid Crystal Display Co., Ltd., Hyogo (JP)

(72) Inventors: Takahiro Kobayashi, Okayama (JP); Yoshio Umeda, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 514 days.

(21) Appl. No.: 13/927,374

(22) Filed: Jun. 26, 2013

(65) Prior Publication Data

US 2013/0286167 A1    Oct. 31, 2013

Related U.S. Application Data

(63) Continuation of application No. PCT/JP2011/007161, filed on Dec. 21, 2011.

(30) Foreign Application Priority Data

Dec. 27, 2010   (JP) .................................. 2010-290203

(51) Int. Cl.
*H04N 13/04*   (2006.01)
*G09G 3/00*   (2006.01)
*G09G 3/36*   (2006.01)

(52) U.S. Cl.
CPC .......... *H04N 13/0497* (2013.01); *G09G 3/003* (2013.01); *G09G 3/3611* (2013.01); *G09G 2340/0407* (2013.01); *G09G 2340/0435* (2013.01)

(58) Field of Classification Search
CPC .............. G09G 2310/0205; G09G 2300/0465
USPC ......................................................... 348/51
See application file for complete search history.

(56) References Cited

U.S. PATENT DOCUMENTS

| 2004/0041760 | A1* | 3/2004 | Tsumura | G09G 3/342 345/87 |
| 2007/0279319 | A1* | 12/2007 | Yamazaki | A63F 13/02 345/32 |
| 2008/0266227 | A1 | 10/2008 | Arasawa et al. | |

FOREIGN PATENT DOCUMENTS

| JP | 62-133891 | 6/1987 |
| JP | 2004-93717 | 3/2004 |

(Continued)

OTHER PUBLICATIONS

International Search Report issued Mar. 6, 2012 in International (PCT) Application No. PCT/JP2011/007161.

*Primary Examiner* — Jamie Atala
*Assistant Examiner* — Masum Billah
(74) *Attorney, Agent, or Firm* — Wenderoth, Lind & Ponack, L.L.P.

(57) ABSTRACT

A display device includes: a liquid crystal panel which has a display surface including pixels, and displays frame images; a generation portion which generates a first and a second image signals based on a frame image signal, the first image signal rendering an image of a lower resolution than the frame image signal and including data to be written to all the pixels, the second image signal including data to be written to a part of the pixels and not including data to be written to remaining pixels other than the part of the pixels; and a liquid crystal driver which executes, after executing a first scanning operation, a second scanning operation in which scanning based on the second image signal is executed, to drive the liquid crystal panel, wherein data that has been written to the remaining pixels is held in the second scanning operation.

2 Claims, 39 Drawing Sheets

(56) References Cited

FOREIGN PATENT DOCUMENTS

| JP | 2008-293003 | 12/2008 | |
| JP | 2009-25436 | 2/2009 | |
| JP | 2009-103885 | 5/2009 | |
| JP | 2009-109849 | 5/2009 | |
| JP | 2009103885 A * | 5/2009 | |
| JP | 2010-107580 | 5/2010 | |
| JP | 2010-117437 | 5/2010 | |

* cited by examiner

FIG.4

| GATE LINE | TARGET BRIGHTNESS OF FRAME IMAGE SIGNAL (DATA LINE M) | LIQUID CRYSTAL PANEL DRIVING | | LIQUID CRYSTAL PANEL DISPLAY | |
|---|---|---|---|---|---|
| | | FIRST SCANNING OPERATION | SECOND SCANNING OPERATION | AFTER FIRST SCANNING OPERATION | AFTER SECOND SCANNING OPERATION |
| L1 | I1 | I1 | HOLD | I1 | I1 |
| L2 | I2 | | I2 | | I2 |
| L3 | I3 | I3 | HOLD | I3 | I3 |
| L4 | I4 | | I4 | | I4 |
| L5 | I5 | I5 | HOLD | I5 | I5 |
| L6 | I6 | | I6 | | I6 |
| L7 | I7 | I7 | HOLD | I7 | I7 |
| L8 | I8 | | I8 | | I8 |
| L9 | I9 | I9 | HOLD | I9 | I9 |
| L10 | I10 | | I10 | | I10 |
| L11 | I11 | I11 | HOLD | I11 | I11 |
| L12 | I12 | | I12 | | I12 |

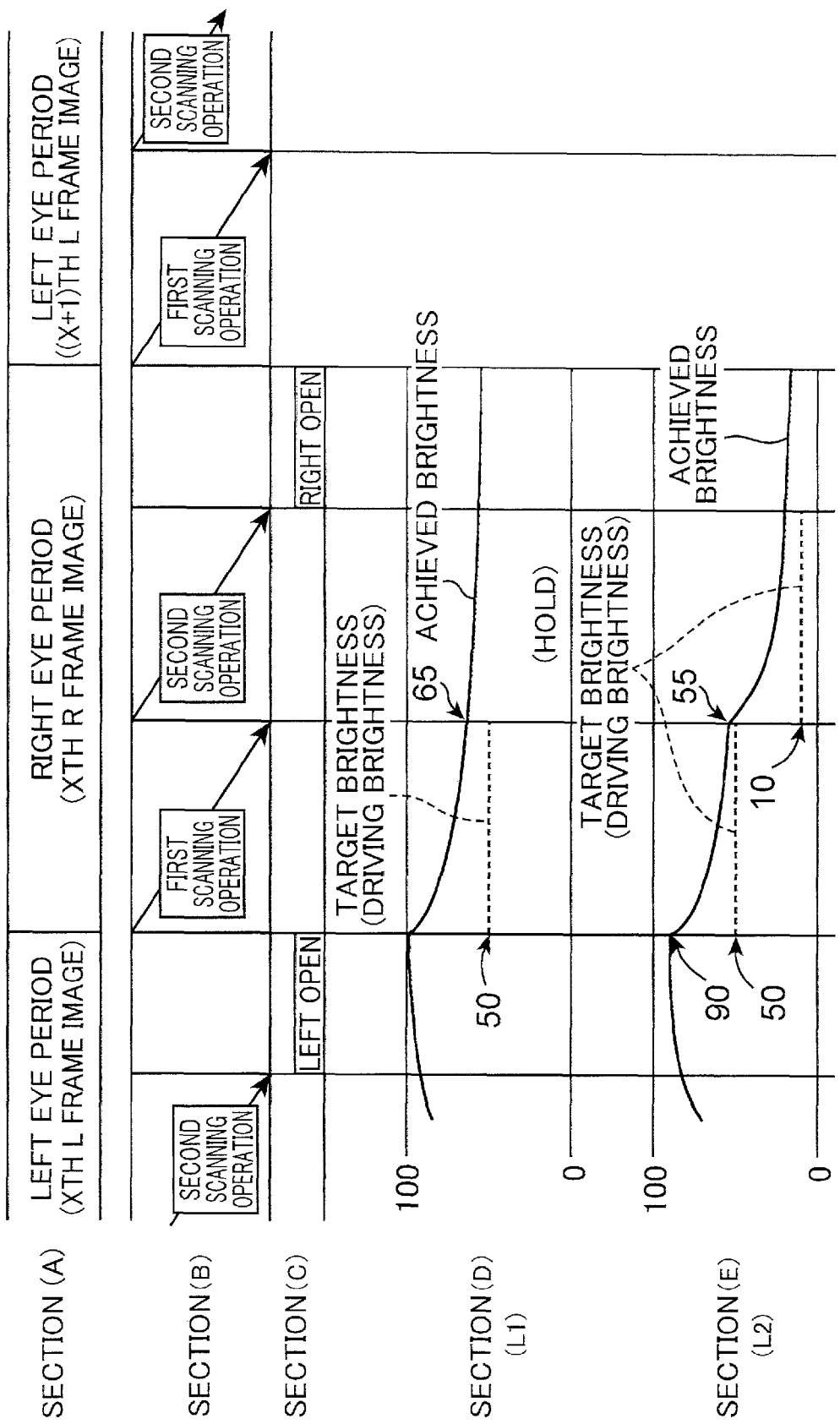

FIG.19

| GATE LINE | TARGET BRIGHTNESS OF FRAME IMAGE SIGNAL (DATA LINE M) | LIQUID CRYSTAL PANEL DRIVING | | LIQUID CRYSTAL PANEL DISPLAY | |
|---|---|---|---|---|---|
| | | FIRST SCANNING OPERATION | SECOND SCANNING OPERATION | AFTER FIRST SCANNING OPERATION | AFTER SECOND SCANNING OPERATION |
| L1 | I1 | I1 | I1 | I1 | I1 |
| L2 | I2 | | I2 | | I2 |
| L3 | I3 | I3 | I3 | I3 | I3 |
| L4 | I4 | | I4 | | I4 |
| L5 | I5 | I5 | I5 | I5 | I5 |
| L6 | I6 | | I6 | | I6 |
| L7 | I7 | I7 | I7 | I7 | I7 |
| L8 | I8 | | I8 | | I8 |
| L9 | I9 | I9 | I9 | I9 | I9 |
| L10 | I10 | | I10 | | I10 |
| L11 | I11 | I11 | I11 | I11 | I11 |
| L12 | I12 | | I12 | | I12 |

FIG.21

| GATE LINE | TARGET BRIGHTNESS OF FRAME IMAGE SIGNAL (DATA LINE M) | LIQUID CRYSTAL PANEL DRIVING | | |
|---|---|---|---|---|
| | | FIRST SCANNING OPERATION | SECOND SCANNING OPERATION | |
| | | | FIRST | SECOND |
| L1 | I1 | I1 | HOLD | HOLD |
| L2 | I2 | I1 | HOLD | I2 |
| L3 | I3 | I1 | I3 | HOLD |
| L4 | I4 | I1 | I3 | I4 |
| L5 | I5 | I5 | HOLD | HOLD |
| L6 | I6 | I5 | HOLD | I6 |
| L7 | I7 | I5 | I7 | HOLD |
| L8 | I8 | I5 | I7 | I8 |
| L9 | I9 | I9 | HOLD | HOLD |
| L10 | I10 | I9 | HOLD | I10 |
| L11 | I11 | I9 | I11 | HOLD |
| L12 | I12 | I9 | I11 | I12 |

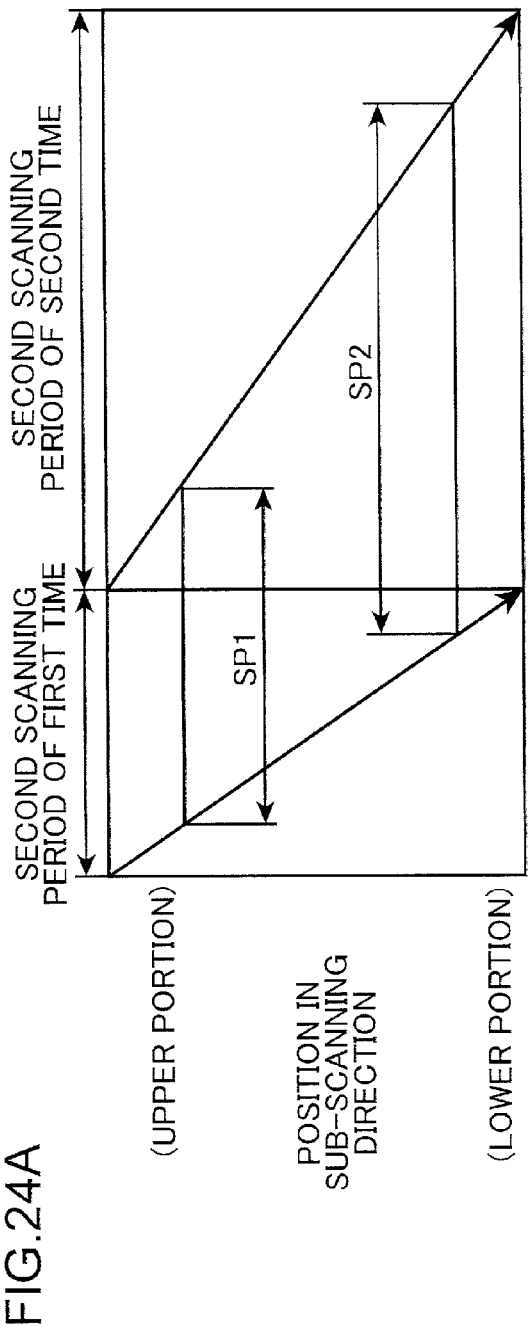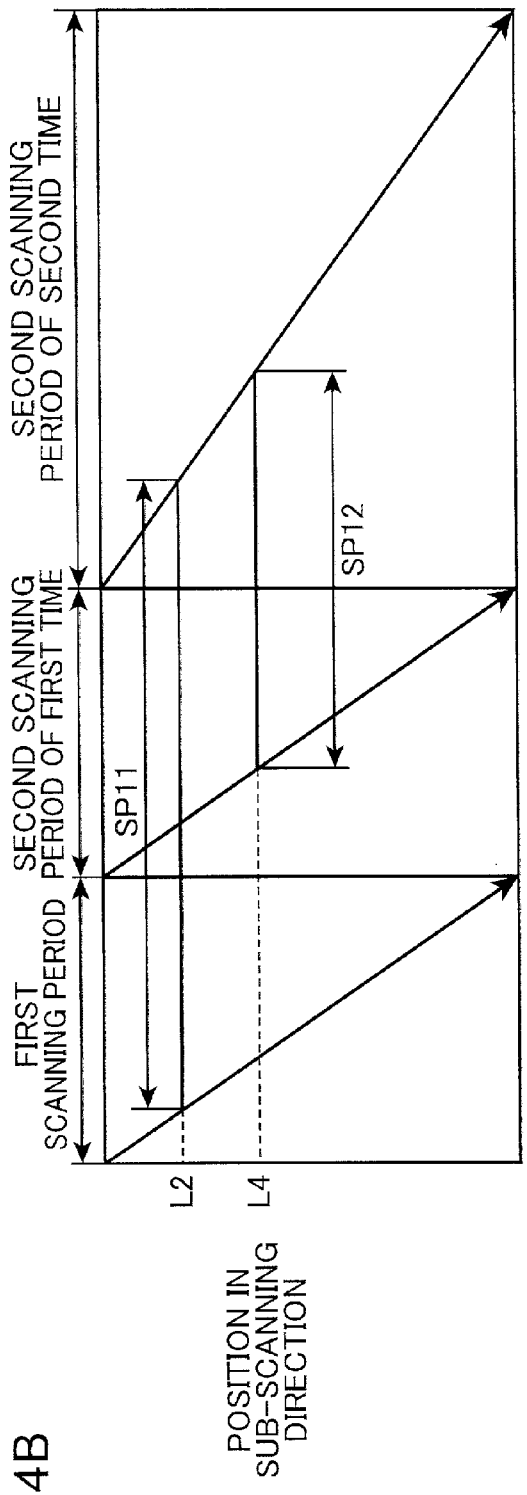

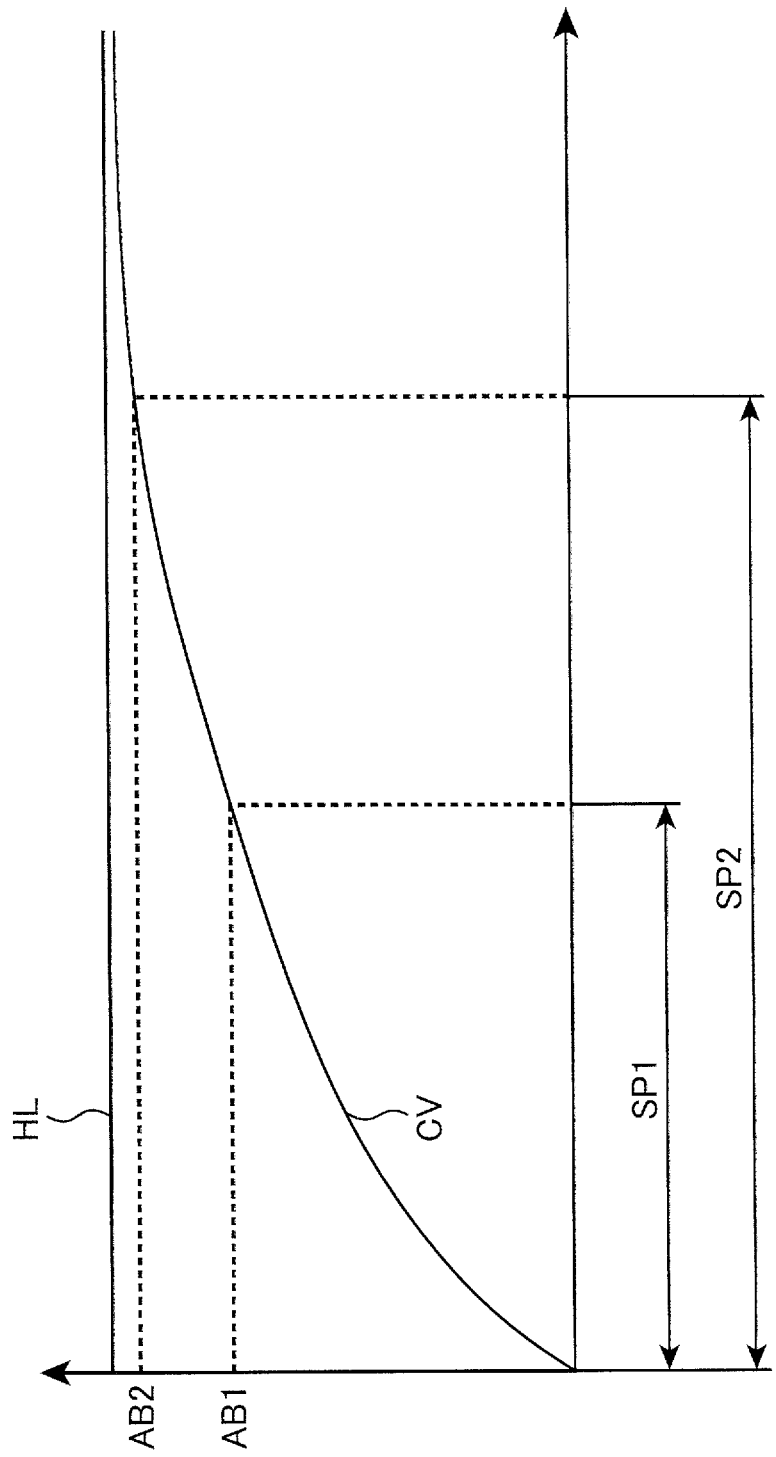

FIG.26

| GATE LINE | TARGET BRIGHTNESS OF FRAME IMAGE SIGNAL (DATA LINE M) | LIQUID CRYSTAL PANEL DRIVING ||||
|---|---|---|---|---|---|
| | | FIRST SCANNING OPERATION | SECOND SCANNING OPERATION |||
| | | | FIRST TIME | SECOND TIME | THIRD TIME |
| L1 | I1 | I1 | HOLD | HOLD | HOLD |
| L2 | I2 | | HOLD | I2 | HOLD |
| L3 | I3 | | I3 | HOLD | HOLD |
| L4 | I4 | | HOLD | HOLD | I4 |
| L5 | I5 | I5 | HOLD | HOLD | HOLD |
| L6 | I6 | | HOLD | I6 | HOLD |
| L7 | I7 | | I7 | HOLD | HOLD |
| L8 | I8 | | HOLD | HOLD | I8 |
| L9 | I9 | I9 | HOLD | HOLD | HOLD |
| L10 | I10 | | HOLD | I10 | HOLD |
| L11 | I11 | | I11 | HOLD | HOLD |
| L12 | I12 | | HOLD | HOLD | I12 |

FIG.29

| GATE LINE | TARGET BRIGHTNESS OF FRAME IMAGE SIGNAL (DATA LINE M) | LIQUID CRYSTAL PANEL DRIVING | | |
|---|---|---|---|---|
| | | FIRST SCANNING OPERATION | SECOND SCANNING OPERATION | THIRD SCANNING OPERATION |
| L1 | I1 | I1 | HOLD | I1 |
| L2 | I2 | | | I2 |
| L3 | I3 | | I3 | I3 |
| L4 | I4 | | | I4 |
| L5 | I5 | I5 | HOLD | I5 |
| L6 | I6 | | | I6 |
| L7 | I7 | | I7 | I7 |
| L8 | I8 | | | I8 |
| L9 | I9 | I9 | HOLD | I9 |
| L10 | I10 | | | I10 |
| L11 | I11 | | I11 | I11 |
| L12 | I12 | | | I12 |

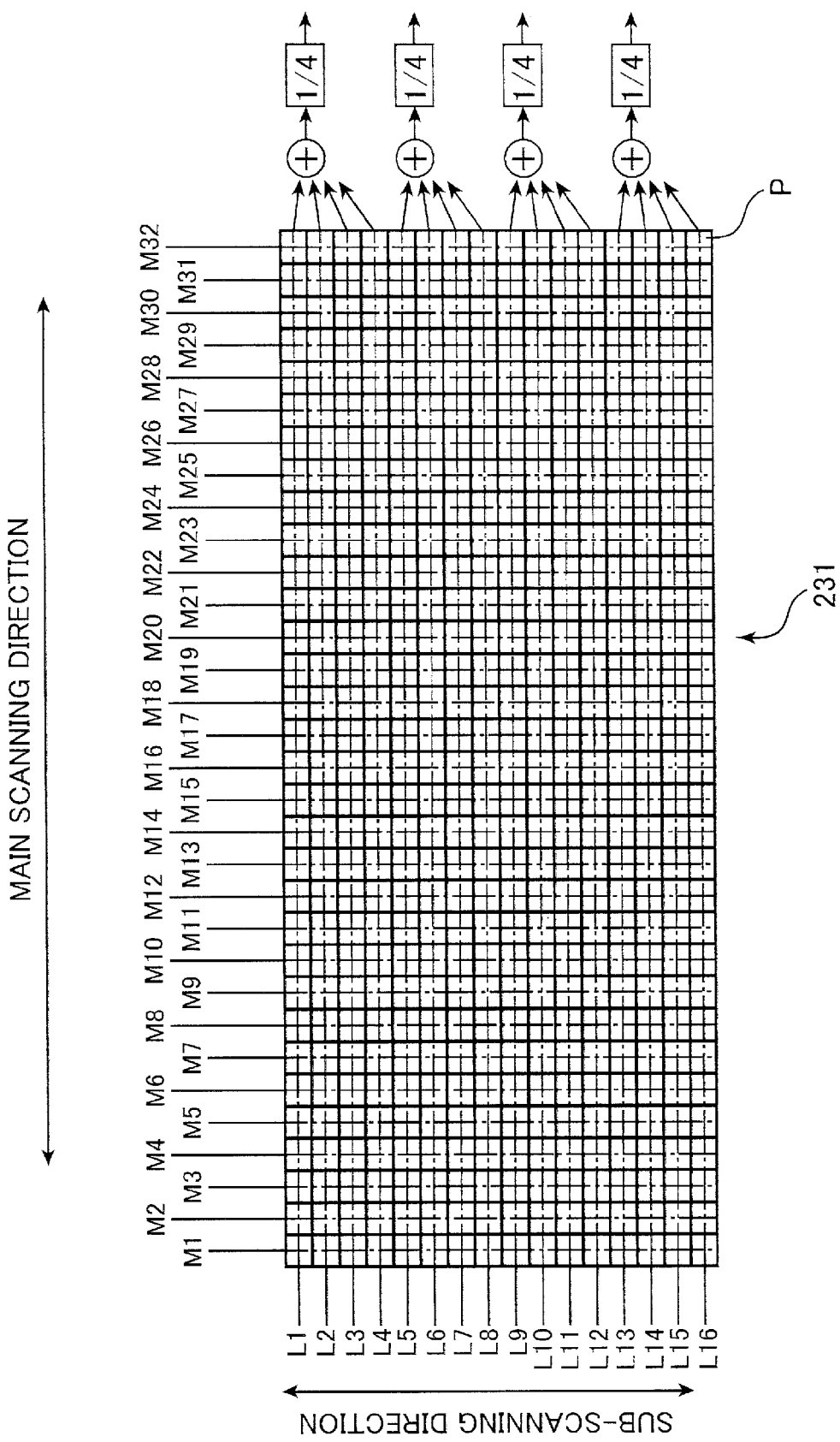

FIG.33

| GATE LINE | TARGET BRIGHTNESS OF FRAME IMAGE SIGNAL (DATA LINE M) | LIQUID CRYSTAL PANEL DRIVING | | |
|---|---|---|---|---|
| | | FIRST SCANNING OPERATION | SECOND SCANNING OPERATION | THIRD SCANNING OPERATION |
| L1 | I1 | AVERAGE OF I1 TO I4 | HOLD | I1 |
| L2 | I2 | | | I2 |
| L3 | I3 | | AVERAGE OF I3 AND I4 | I3 |
| L4 | I4 | | | I4 |
| L5 | I5 | AVERAGE OF I5 TO I8 | HOLD | I5 |
| L6 | I6 | | | I6 |
| L7 | I7 | | AVERAGE OF I7 AND I8 | I7 |
| L8 | I8 | | | I8 |
| L9 | I9 | AVERAGE OF I9 TO I12 | HOLD | I9 |
| L10 | I10 | | | I10 |
| L11 | I11 | | AVERAGE OF I11 AND I12 | I11 |
| L12 | I12 | | | I12 |

FIG.34

| GATE LINE | TARGET BRIGHTNESS OF FRAME IMAGE SIGNAL (DATA LINE M) | LIQUID CRYSTAL PANEL DRIVING | | |
|---|---|---|---|---|
| | | FIRST SCANNING OPERATION | SECOND SCANNING OPERATION | THIRD SCANNING OPERATION |
| L1 | I1 | AVERAGE OF I1 AND I2 | HOLD | I1 |
| L2 | I2 | | | I2 |
| L3 | I3 | | AVERAGE OF I3 AND I4 | I3 |
| L4 | I4 | | | I4 |
| L5 | I5 | AVERAGE OF I5 AND I6 | HOLD | I5 |
| L6 | I6 | | | I6 |
| L7 | I7 | | AVERAGE OF I7 AND I8 | I7 |
| L8 | I8 | | | I8 |
| L9 | I9 | AVERAGE OF I9 AND I10 | HOLD | I9 |
| L10 | I10 | | | I10 |
| L11 | I11 | | AVERAGE OF I11 AND I12 | I11 |
| L12 | I12 | | | I12 |

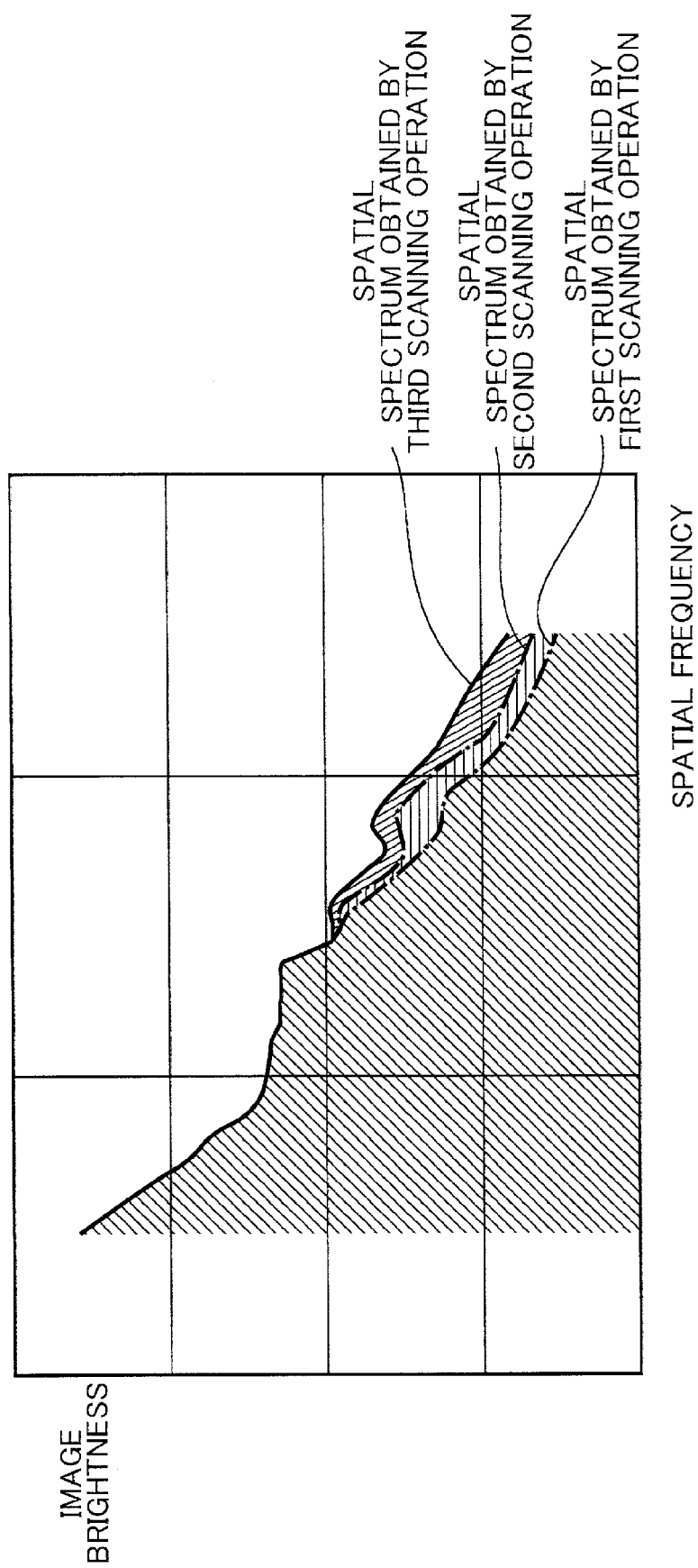

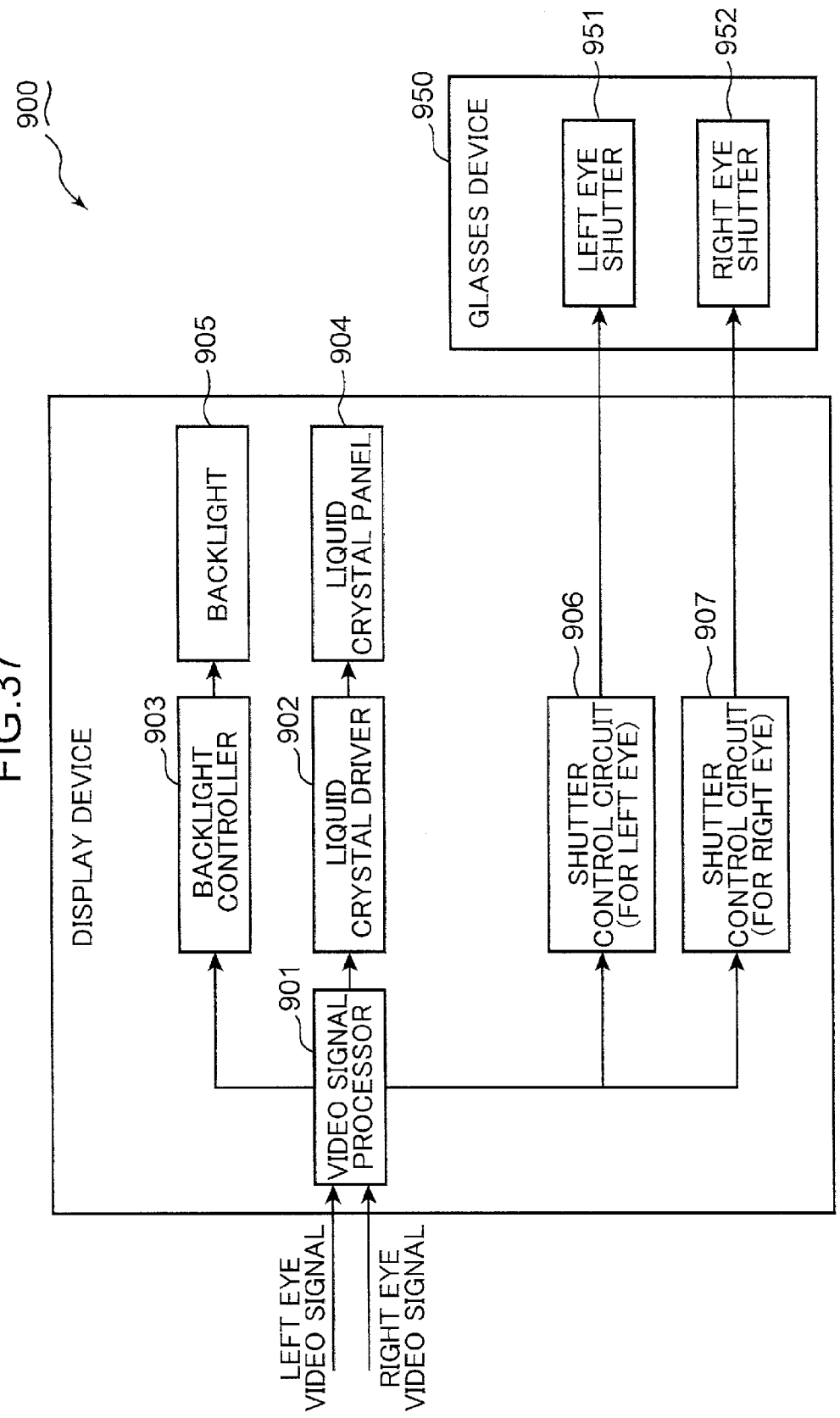

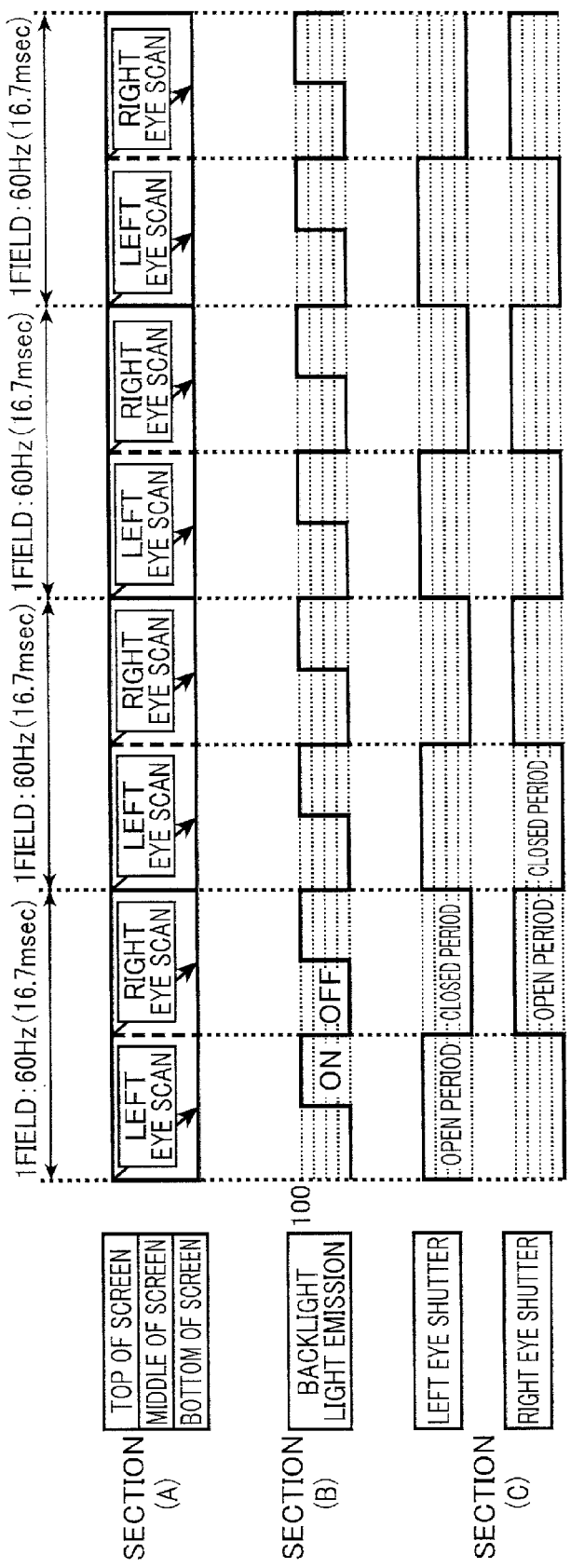

DISPLAY DEVICE AND VIDEO VIEWING SYSTEM

TECHNICAL FIELD

The present application relates to a display device and a video viewing system which display video.

BACKGROUND

In a display device which displays video, a display device which displays video that is perceived in three dimensions, for example, alternately displays, in predetermined cycles (field cycles, for example), a left eye frame image (referred to as an L frame image hereinbelow) for viewing with the left eye and a right eye frame image (referred to as an R frame image hereinbelow) for viewing with the right eye. The L frame image and the R frame image thus displayed contain content which differs only in its parallax. The viewer views the L frame image and R frame image via a glasses device which includes a liquid crystal shutter which is driven in synchronization with L frame image display cycles and R frame image display cycles (see Japanese Patent Application Publication No. S62-133891 and Japanese Patent Application Publication No. 2009-25436, for example). As a result, the viewer perceives an object, rendered by the L frame image and R frame image, in three dimensions.

FIG. 37 is a block diagram of a conventional video viewing system. Note that 60 Hz video signals (left eye video signals and right eye video signals) are input to the video viewing system shown in FIG. 37.

The video viewing system 900 includes a video signal processor 901 to which the 60 Hz video signals (left eye video signals and right eye video signals) are input. The video signal processor 901 converts the video signals thus input into 120 Hz left eye video signals and 120 Hz right eye video signals. The converted left eye video signals and right eye video signals are output to a liquid crystal driver 902 and a backlight controller 903. The liquid crystal driver 902 converts the 120 Hz left eye video signals and right-eye video signals into a format which can be displayed by a liquid crystal panel 904. The left eye video signals and right eye video signals thus converted by the liquid crystal driver 902 are output to the liquid crystal panel 904. The backlight controller 903 outputs a light emission control signal to the backlight 905. The backlight 905 radiates light from the backside of the liquid crystal panel 904 onto the liquid crystal panel 904 by the light emission control signal. As a result, L frame images and R frame images are displayed alternately on the liquid crystal panel 904 at 120 Hz.

A glasses device 950 includes a left eye shutter 951 and a right eye shutter 952. A shutter control circuit 906 for the left eye shutter 951 and a shutter control circuit 907 for the right eye shutter 952 synchronously control the left eye shutter 951 and the right eye shutter 952 by taking the 120 Hz left eye video signals and right eye video signals thus converted by the video signal processor 901 as a reference.

FIG. 38 is a control timing chart of the conventional video viewing system 900. Section (A) in FIG. 38 shows the scanning timing for the L frame images and R frame images of the liquid crystal panel 904. Section (B) in FIG. 38 shows the timing for lighting the backlight 905. Section (C) in FIG. 38 shows the timing for opening and closing the shutters 951 and 952 of the glasses device 950. The conventional video viewing system 900 is described using FIGS. 37 and 38.

Left eye video signals and right eye video signals are sequentially written to the liquid crystal panel 904. Meanwhile, the backlight 905 is always lit. The shutter control circuits 906 and 907 control the shutters 951 and 952. After the alternate left and right write scanning to the liquid crystal panel 904, the shutters 951 and 952 open and close under the control of the shutter control circuits 906 and 907 such that the open cycles of the shutters 951 and 952 are half of the respective video cycles. The L frame images and the R frame images which are viewed via the shutters 951 and 952 are viewed by the viewer's left and right eyes respectively. As a result, the viewer generates a visually stereoscopic image in the brain.

In the video viewing system which operates with the control timing shown in FIG. 38, the viewer views an L frame image or an R frame image only in those cycles in which the shutters 951 and 952 are open (cycles which are sufficient for viewing the images required for the generation of a stereoscopic image). Meanwhile, even in those cycles which are not those cycles when the shutters 951 and 952 are open, the backlight 905 is always lit. Therefore, a video viewing system which operates with the control timing shown in FIG. 38 is unfavorable from the standpoint of power savings.

FIG. 39 is another control timing chart for the conventional video viewing system 900. Section (A) of FIG. 39 shows the scanning timing for the L frame images and R frame images of the liquid crystal panel 904. Section (B) of FIG. 39 shows the timing for lighting the backlight 905. Section (C) in FIG. 39 shows the timing for opening and closing the shutters 951 and 952 of the glasses device 950. The conventional video viewing system 900 will be illustrated further using FIGS. 37 to 39.

Japanese Patent Application Publication No. 2009-25436 discloses control in which the backlight 905 is lit only in those cycles when an L frame image or an R frame image is being viewed. In the control shown in FIG. 39, unlike the control shown in FIG. 38, the backlight 905 emits light only in those cycles when an L frame image or an R frame image is being viewed. Therefore, the control as shown in FIG. 39 is superior from a power savings standpoint than the control shown in FIG. 38.

The left eye shutter 951 is opened after the liquid crystal panel 904 has displayed an L frame image which is created for viewing by the left eye, and before scanning on the basis of a right eye video signal for displaying an R frame image is executed. Similarly, the right eye shutter 952 is opened after the liquid crystal panel 904 has displayed an R frame image which is created for viewing by the right eye, and before scanning on the basis of a left eye video signal for displaying an L frame image is executed.

As shown in FIGS. 38 and 39, scanning on the basis of the left eye video signal and/or right eye video signal is/are executed starting at the upper portion of the liquid crystal panel 904. Therefore, the scanning on the basis of the left eye video signal and/or right eye video signal at the lower portion of the liquid crystal panel 904 lags the scanning at the upper portion of the liquid crystal panel 904.

The response of the liquid crystals based on the left eye video signal and/or the right eye video signal takes time depending on the type of the video displayed. For example, if there is a large difference between the brightness of pixels rendering a frame image which is displayed beforehand and the brightness of pixels rendering a frame image which is displayed subsequently, a relatively long liquid crystal response time is required.

If the left eye shutter 951 or the right eye shutter 952 is opened while waiting for the display of an L frame image or R frame image to end, the time during which the left eye shutter 951 or the right eye shutter 952 is open is short owing to the fact that the liquid crystal response time is long. As a result, the three dimensional images displayed on the liquid crystal panel 904 appear dark to the viewer.

If the left eye shutter 951 is opened without waiting for the display of the L frame image to end, the viewer views an L frame image with the effects of the R frame image displayed beforehand mixed therein. If the right eye shutter 952 is opened without waiting for the display of the R frame image to end, the viewer views the R frame image with the effects of the L frame image displayed beforehand mixed therein. Such mixing of the L frame image and the R frame image is known as crosstalk. The amount of mixing of the preceding frame image (the L frame image or R frame image) is especially substantial at the lower portion of the liquid crystal panel 904 due to the lag of the scanning on the basis of the left video signal and/or right video signal at the lower portion of the liquid crystal panel 904 and to the liquid crystal response time. Therefore, it is hard for the viewer to perceive the frame images displayed in the lower portion of the liquid crystal panel 904 in three dimensions.

The above problems are not limited to display devices which display video that is perceived in three dimensions and can also be perceived in display devices which display normal two-dimensional video. That is, when effects of a preceding frame image which is displayed beforehand are mixed in a subsequent frame image which is displayed after the preceding frame image and crosstalk is generated, there is a reduction in quality of the displayed image.

SUMMARY

An object of the present disclosure is to provide a display device and a video viewing system which are capable of suppressing crosstalk between a preceding frame image and a subsequent frame image.

According to an aspect of the present disclosure, a display device includes: a liquid crystal panel which has a display surface including a plurality of pixels arranged in a matrix in a main scanning direction and a sub-scanning direction, and displays frame images on the display surface by switching the frame images over time; a generation portion which generates a first image signal and a second image signal on a basis of a frame image signal for displaying the frame images, the first image signal rendering an image of a lower resolution than the frame image signal and including data that is to be written to all the pixels of the display surface, the second image signal including data that is to be written to a part of the pixels among the pixels of the display surface and not including data that is to be written to remaining pixels other than the part of the pixels; and a liquid crystal driver which executes, after executing a first scanning operation in which scanning across the display surface on a basis of the first image signal is executed, at least once a second scanning operation in which scanning across the display surface on a basis of the second image signal is executed, to drive the liquid crystal panel, wherein data that has been written to the remaining pixels is held in the second scanning operation.

According to an aspect of the present disclosure, a video viewing system includes: a display device which displays a left eye frame image created for viewing by a left eye and a right eye frame image created for viewing by a right eye to provide an image that is perceived in three dimensions; and a glasses device which includes a left eye filter that adjusts a light amount reaching the left eye so that the left eye frame image is viewed, and a right eye filter that adjusts a light amount reaching the right eye so that the right eye frame image is viewed, wherein the display device includes: a liquid crystal panel which has a display surface including a plurality of pixels arranged in a matrix in a main scanning direction and a sub-scanning direction, and displays an image perceived in three dimensions on the display surface by switching alternately over time between the left eye frame image created for viewing by the left eye and the right eye frame image created for viewing by the right eye; a generation portion which generates a first image signal and a second image signal on a basis of a frame image signal for displaying the left eye frame image or the right eye frame image, the first image signal rendering an image of a lower resolution than the frame image signal and including data that is to be written to all the pixels of the display surface, the second image signal including data that is to be written to a part of the pixels among the pixels of the display surface and not including data that is to be written to remaining pixels other than the part of the pixels; and a liquid crystal driver which executes, after executing a first scanning operation in which scanning across the display surface on a basis of the first image signal is executed, at least once a second scanning operation in which scanning across the display surface on a basis of the second image signal is executed, to drive the liquid crystal panel, and wherein data that has been written to the remaining pixels is held in the second scanning operation.

BRIEF DESCRIPTION OF THE DRAWINGS

FIG. 4 is a diagram schematically showing, in table format, target brightnesses which are configured in a first scanning operation and a second scanning operation and brightnesses which are displayed on the liquid crystal panel after each scanning operation, for target brightnesses which are defined by frame image signals that are input.

FIG. 6 is a schematic timing chart which shows variations in pixel brightness in a case where the target brightness is configured as a driving brightness.

FIG. 19 is a diagram which, in a comparative example, schematically shows in table format target brightnesses which are configured in first and second scanning operations, for target brightnesses which are defined in input frame image signals.

FIG. 21 is a drawing which schematically shows, in table format, target brightnesses which are configured in a first scanning operation and in two second scanning operations, for target brightnesses which are defined by frame image signals that are input, according to a second embodiment.

FIGS. 24A and 24B are schematic drawings which schematically illustrate differences in scanning operations due to pixel position and hold period.

FIG. 25 is a graph which schematically shows the effect of pixel position on pixel brightness variation.

FIG. 26 is a diagram which schematically shows, in table format, target brightnesses which are configured in a first scanning operation and three second scanning operations, for target brightnesses which are defined by frame image signals that are input, according to a third embodiment.

FIG. 29 is a diagram which schematically shows, in table format, target brightnesses which are configured in first, second, and third scanning operations, for target brightnesses which are defined by frame image signals that are input, according to a fourth embodiment.

FIG. 31 is a conceptual drawing of an averaging processing which is executed by a video signal processor of a display device according to a fifth embodiment.

FIG. 33 is a diagram which schematically shows, in table format, target brightnesses which are configured in first, second, and third scanning operations, for target brightnesses which are defined by frame image signals that are input, according to a fifth embodiment.

FIG. 34 is a diagram which schematically shows, in table format, target brightnesses which are configured in first, second, and third scanning operations, for target brightnesses which are defined by frame image signals that are input, according to a different mode of the fifth embodiment.

FIG. 35 is a graph which schematically shows spatial spectra which are obtained by a first scanning operation, a second scanning operation, and a third scanning operation.

FIG. 37 is a block diagram which schematically shows a configuration of a conventional video viewing system.

FIG. 39 is a control timing chart which represents, by way of example, control of a conventional video viewing system.

DETAILED DESCRIPTION

Figure 1:
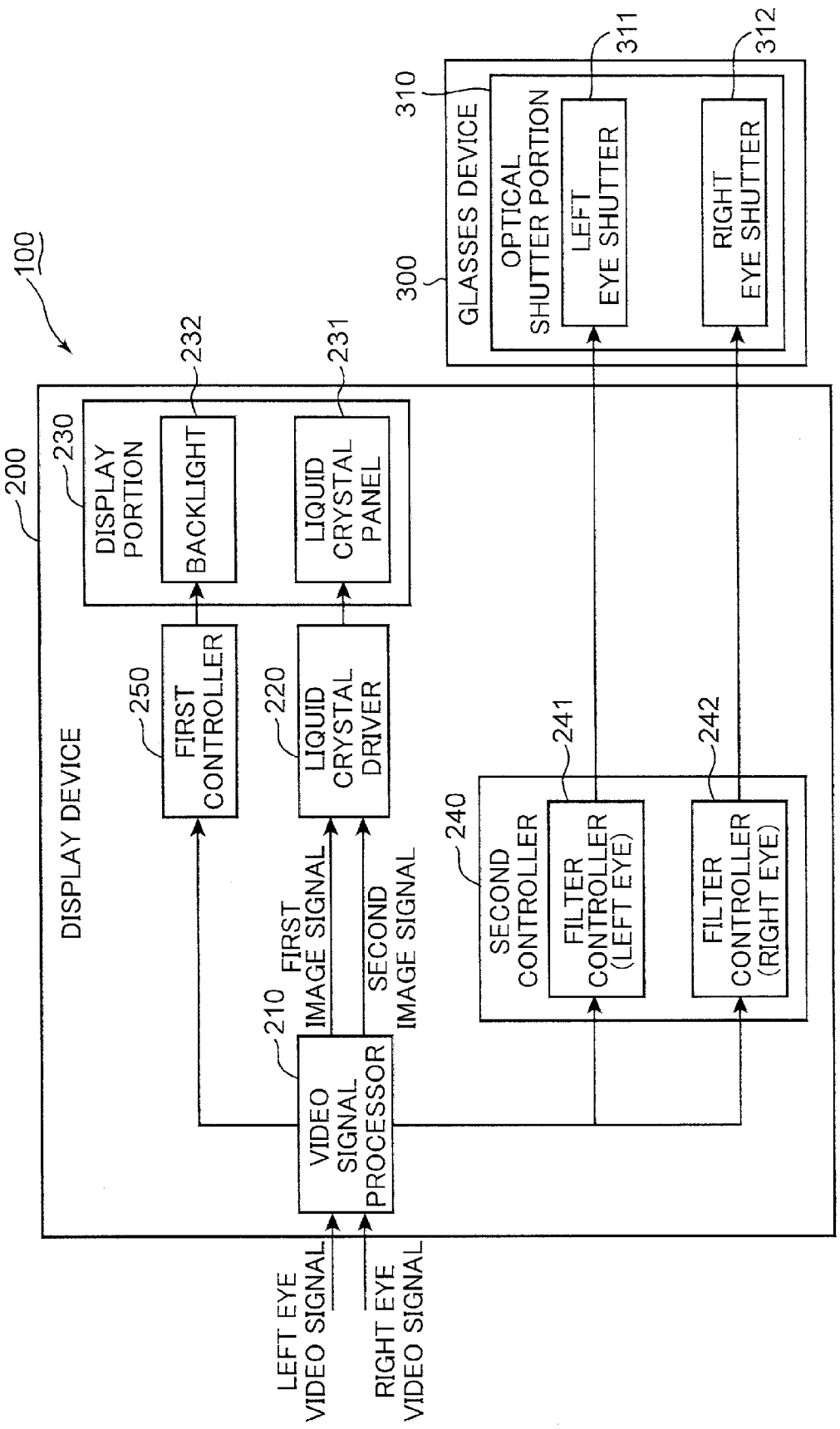
FIG. 1 is a block diagram schematically showing the configuration of a video viewing system and a display device according to a first embodiment.

The display device and video viewing system according to an embodiment of the present application will be described hereinbelow with reference to the drawings. Note that the same reference symbols have been assigned to the same constituent elements in the embodiments described hereinbelow. Further, repetitive description is omitted where necessary for the sake of clarifying the description. The configurations, arrangements, shapes shown in the drawings as well as the descriptions pertaining to the drawings are intended to facilitate a straightforward understanding of the principles behind the embodiments and the present application is not limited in any way to such configurations, arrangements, shapes, and descriptions.

First Embodiment (Configuration of Video Viewing System)

Figure 2:
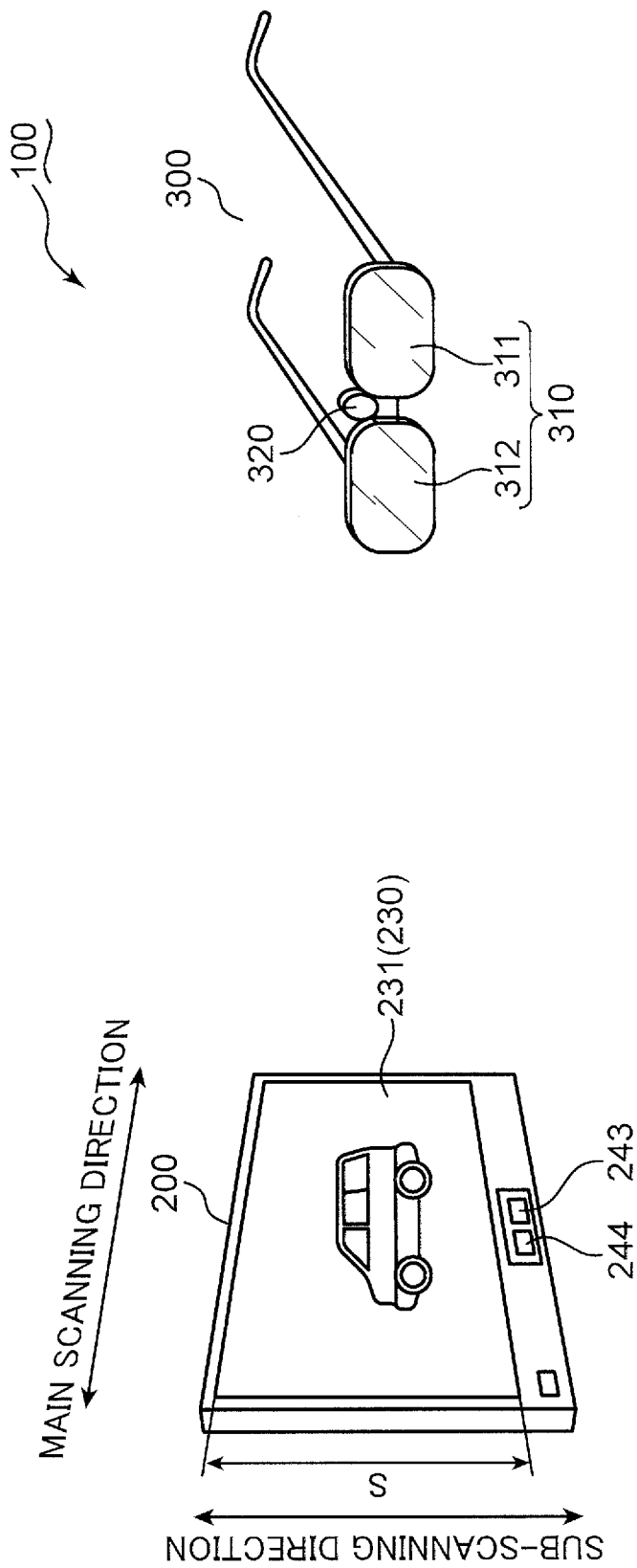
FIG. 2 is a schematic diagram schematically showing the video viewing system shown in FIG. 1.

FIG. 1 is a block diagram which schematically shows the configuration of the video viewing system according to a first embodiment. FIG. 2 is a schematic diagram which schematically shows the video viewing system shown in FIG. 1. The schematic configuration of the video viewing system is described with reference to FIGS. 1 and 2.

A video viewing system 100 comprises a display device 200 which displays frame images including a left eye frame image (hereinafter called an L frame image) which is created for viewing by the left eye and a right eye frame image (hereinafter called an R frame image) which is created for viewing by the right eye; and a glasses device 300 which supports viewing of the L frame images and R frame images which are displayed by the display device 200. The glasses device 300 performs a three-dimensional viewing support operation in synchronization with the display of the L frame images and R frame images by the display device 200 such that the viewer views L frame images with the left eye and the R frame images with the right eye. As a result, the viewer perceives the frame images (the L frame images and R frame images), displayed by the display device 200 via the glasses device 300, in three dimensions (to the viewer's perception, the objects rendered in the L frame images and R frame images appear to fly from or sink toward the display surface onto which the L frame images and R frame images are projected).

The glasses device 300 which has the same shape as glasses for vision correction, comprises an optical shutter portion 310 which comprises a left eye shutter 311 which is disposed in front of the viewer's left eye and a right eye shutter 312 which is disposed in front of the viewer's right eye. The left eye shutter 311 opens when the display device 200 displays an L frame image and closes when the display device 200 displays an R frame image. The right eye shutter 312 closes when the display device 200 displays an L frame image and opens when the display device 200 displays an R frame image. When the display device 200 displays an L frame image, the light path on which light penetrates the viewer's left eye from the L frame image is open, whereas the light path on which light penetrates the viewer's right eye from the L frame image is closed, and hence the viewer views the L frame image only with the left eye. Likewise, when the display device 200 displays an R frame image, the light path on which light penetrates the viewer's right eye from the R frame image is open, whereas the light path on which light penetrates the viewer's left eye from the R frame image is closed, and hence the viewer views the R frame image only with the right eye. According to this embodiment, the left eye shutter 311 exemplifies a left eye filter. Further, the right eye shutter 312 exemplifies a right eye filter. Another optical element with which an amount of light reaching the viewer's left eye from the video displayed by the display device 200 (hereinafter called the left eye light amount) and an amount of light reaching the viewer's right eye (hereinafter called the right eye light amount) are adjustably formed may also be used as the left eye filter and right eye filter. For example, a polarizing element which polarizes the light penetrating the viewer's left eye and right eye (a liquid crystal filter, for example) or another optical element capable of adjusting the light amount is suitably used as the left eye filter and right eye filter. The left eye filter is controlled to increase the left eye light amount in synchronization with the display of an L frame image but to reduce the left eye light amount in synchronization with the display of an R frame image. Likewise, the right eye filter is controlled to increase the right eye light amount in synchronization with the display of an R frame image but to reduce the right eye light amount in synchronization with the display of an L frame image.

The display device 200 comprises a video signal processor 210, a liquid crystal driver 220, a display portion 230, a first controller 250, and a second controller 240.

Video signals (left eye video signals and right eye video signals) having a vertical synchronization frequency serving as a base are input to the video signal processor 210. The video signal processor 210 alternately outputs a left eye video signal (called an L signal hereinbelow) and a right eye video signal (called an R signal hereinbelow), which are thus input, at a frequency of K (where K is a natural number) multiple of the base vertical synchronization frequency. In this embodiment, an input 60 Hz video signal is converted into a 120 Hz L signal and a 120 Hz R signal. The L signal and R signal which are obtained via this conversion are output to the liquid crystal driver 220. In addition, the video signal processor 210 outputs a control signal to the first controller 250 in synchronization with the output of the L signal and R signal.

The display portion 230 comprises a backlight 232. The first controller 250 controls the backlight 232 of the display portion 230 on the basis of the control signal from the video signal processor 210. The video signal processor 210 outputs a control signal for controlling the second controller 240 in synchronization with the output of the L signal and R signal. The second controller 240 controls an optical shutter portion 310 on the basis of a control signal from the video signal processor 210. The control signal which is output to the first controller 250 and/or the second controller 240 may also be the L signal and/or the R signal itself following conversion by the video signal processor 210. Alternatively, this control signal may be a 120 Hz vertical synchronization signal of the L signal and/or R signal.

In the description hereinbelow, a video signal which contains video information between one vertical synchronization signal which an L signal comprises and a subsequent vertical synchronization signal which is input after the one vertical synchronization signal is called an L frame image signal. Further, a video signal which contains video information between one vertical synchronization signal which an R signal comprises and a subsequent vertical synchronization signal which is input after the one vertical synchronization signal is called an R frame image signal, in the description hereinbelow. The L frame image signal is used to render L frame images. Likewise, the R frame image signal is used to render R frame images. In this embodiment, L frame image signals and/or R frame image signals represent examples of frame image signals.

In addition to the foregoing backlight 232, the display portion 230 comprises a liquid crystal panel 231 which uses liquid crystals to display L frame images and R frame images by alternately switching between these images over time. The liquid crystal panel 231 comprises pixels P (FIG. 3) which are arranged in a matrix shape in a lateral direction (main scanning direction) and a vertical direction (sub-scanning direction). The backlight 232 radiates light onto the liquid crystal panel 231 on the basis of the control signal from the video signal processor 210. The liquid crystal driver 220 performs scanning on the basis of frame image signals (L frame image signals or R frame image signals) in the main scanning direction and sub-scanning direction and drives liquid crystals which correspond to the pixels of the liquid crystal panel 231. As shown in FIG. 2, the lateral direction of the liquid crystal panel 231 represents an example of the main scanning direction of the frame image signal. The vertical direction of the liquid crystal panel 231 represents an example of the sub-scanning direction of the frame image signal. The liquid crystal driver 220 alternately performs scanning on the basis of the L frame image signals and R frame image signals. As a result, L frame images and R frame images are alternately displayed on the liquid crystal panel 231 over time.

The video signal processor 210 generates, for one L frame image, a first image signal and a second image signal which succeeds the first image signal, and outputs these signals to the liquid crystal driver 220. Similarly, the video signal processor 210 generates, for one R frame image, a first image signal and a second image signal which succeeds the first image signal, and outputs these signals to the liquid crystal driver 220. The first image signal renders an image of a lower resolution than the frame image signal (the L frame image signal and R frame image signal) input to the video signal processor 210, and contains brightness data which is written to all the pixels of the display surface of the liquid crystal panel 231 (that is, signals for driving all the pixels). The second image signal contains brightness data which is written to a part of the pixels among the pixels of the display surface of the liquid crystal panel 231, but does not contain brightness data which is written to the remaining pixels other than the part of the pixels. According to this embodiment, the video signal processor 210 which generates the first image signals and the second image signals on the basis of frame image signals exemplifies a generation portion.

The first image signal and second image signal are input to the liquid crystal driver 220 respectively. The liquid crystal driver 220 executes a first scanning operation to drive liquid crystals across the display surface of the liquid crystal panel 231 on the basis of the first image signal and a second scanning operation to drive liquid crystals across the display surface of the liquid crystal panel 231 on the basis of the second image signal. Note that the second scanning operation is executed after the first scanning operation. In the first scanning operation which is executed by the liquid crystal driver 220, brightness data which is contained in the first image signal is written to all the pixels of the display surface of the liquid crystal panel 231. In other words, in the first scanning operation, liquid crystals corresponding to all the pixels of the display surface of the liquid crystal panel 231 are driven on the basis of the brightness data contained in the first image signal. In the second scanning operation which is executed by the liquid crystal driver 220, brightness data is written to a part of the pixels among the pixels of the display surface of the liquid crystal panel 231, the brightness data thus written being contained in the second image signal, and brightness data is not written to the remaining pixels other than the part of the pixels, the brightness data thus written not being contained in the second image signal. Written brightness data is held for the remaining pixels. In other words, in the second scanning operation, liquid crystals corresponding to a part of the pixels among the pixels of the display surface of the liquid crystal panel 231 are driven on the basis of the brightness data contained in the second image signal, and a state is preserved where the previous scanning operation (for example, the first scanning operation) is driven without newly driving those liquid crystals which correspond to the remaining pixels other than the part of the pixels.

As described earlier, a first image signal renders images of a lower resolution than a frame image signal, and therefore the liquid crystal driver 220 is able to execute the first scanning operation in a shorter time than a scanning operation in which liquid crystals are driven across the display surface of the liquid crystal panel 231 on the basis of a frame image signal. As a result, even after the first scanning operation has been executed, a sufficiently long time is then secured for the second scanning operation which is executed before the left eye shutter 311 opens or before the right eye shutter 312 closes. Further, since the second image signal contains data which is written to a part of the pixels among the pixels of the display surface of the liquid crystal panel 231 and does not contain data which is written to the remaining pixels other than the part of the pixels, likewise the second scanning operation can be executed in a shorter time than a scanning operation to drive the liquid crystals across the display surface of the liquid crystal panel 231 on the basis of frame image signals.

The liquid crystal driver 220 converts the first image signal and second image signal into a format which can be displayed by the liquid crystal panel 231 according to a vertical synchronization signal and a horizontal synchronization signal which are contained in the first image signal and the second image signal. The liquid crystal driver 220 executes the first scanning operation and the second scanning operation by using the frame image signals of the first image signal and second image signal that have been converted for each display of the frame image on the liquid crystal panel 231.

As a result of the liquid crystals being driven by the foregoing liquid crystal driver 220, the liquid crystal panel 231 modulates the light entering from the rear surface according to the input first image signal and second image signal. As a result, the liquid crystal panel 231 alternately displays an L frame image created for viewing by the left eye and an R frame image created for viewing by the right eye. Various driving systems such as the IPS (In Plane Switching) system, the VA (Vertical Alignment) system, or the TN (Twisted Nematic) system, for example, are suitably applied to the liquid crystal panel 231.

The backlight 232 radiates light onto the display surface of the liquid crystal panel 231 from the rear surface of the liquid crystal panel 231. According to this embodiment, a plurality of light-emitting diodes (LED) (not shown) which are arranged in two dimensions for planar light emission are used as the backlight 232. Alternatively, a plurality of fluorescent tubes arranged for planar light emission may also be used as the backlight 232. The light emitting diodes and fluorescent tubes which are used as the backlight 232 may also be arranged on the edge portions of the liquid crystal panel 231 and made to perform planar light emission (edge type).

The first controller 250 outputs a light emission control signal by taking the 120 Hz control signal output from the video signal processor 210 as a reference. The backlight 232 is able to turn on and off on the basis of a light emission control signal.

The second controller 240 controls the optical shutter portion 310 of the glasses device 300 to conform to the display cycles of the L frame images and R frame images. The second controller 240 comprises a left eye filter controller 241 (hereinafter called the L filter controller 241) for controlling the left eye shutter 311 and a right eye filter controller 242 (hereinafter called the R filter controller 242) for controlling the right eye shutter 312. When the liquid crystal panel 231 alternately displays the L frame images and R frame images at 120 Hz, for example, the L filter controller 241 controls the glasses device 300 such that the left eye shutter 311 adjusts (increases or reduces) the left eye light amount in 60 Hz cycles. Similarly, the R filter controller 242 controls the glasses device 300 such that the right eye shutter 312 adjusts (increases or reduces) the right eye light amount in 60 Hz cycles.

As shown in FIG. 2, according to this embodiment, the display device 200 comprises a first transmission unit 243 which transmits a first synchronization signal for synchronization with the L frame image display and a second transmission unit 244 which transmits a second synchronization signal for synchronization with the R frame image display. Further, the glasses device 300 comprises a reception unit 320 which is disposed between the left eye shutter 311 and the right eye shutter 312. The reception unit 320 receives the first synchronization signal and the second synchronization signal. The waveform of the first synchronization signal preferably differs from the waveform of the second synchronization signal. The reception unit 320 identifies a first synchronization signal and a second synchronization signal on the basis of the waveforms of the received synchronization signals. Thus, the glasses device 300 causes the left eye shutter 311 to operate on the basis of the first synchronization signal. Further, the glasses device 300 causes the right eye shutter 312 to operate on the basis of the second synchronization signal. Other known communications technology and other known signal processing technology may also be used for the wireless communications of the synchronization signals between the display device 200 and the glasses device 300 as well as for the internal processing of the synchronization signals (the first synchronization signal and second synchronization signal) by the glasses device 300. Alternatively, the communication of the synchronization signals (the first synchronization signal and second synchronization signal) between the display device 200 and the glasses device 300 may be executed using a wired system. Further, the first transmission unit 243 which transmits the first synchronization signal for synchronization with the left eye video display and the second transmission unit 244 which transmits the second synchronization signal for synchronization with the right eye video display may be combined as one transmission unit. In this case, the left eye video display and right eye video display may also be alternately synchronized upon the rise of a common synchronization signal.

The L filter controller 241 and the R filter controller 242 determine the phase of the increase-reduction cycle of the left eye light amount by the left eye shutter 311 and the phase of the increase-reduction cycle of the right eye light amount by the right eye shutter 312 by taking a control signal from the video signal processor 210 as a reference. The L filter controller 241 and the R filter controller 242 output the first synchronization signal and the second synchronization signal according to the determined phases. The left eye shutter 311 and the right eye shutter 312 each increase and reduce the left eye light amount and the right eye light amount in synchronization with the display of the L frame image and the display of the R frame image on the basis of the first synchronization signal and the second synchronization signal.

The second controller 240 determines the length of the periods during which the left eye shutter 311 and the right eye shutter 312 increase the left eye light amount and the right eye light amount respectively (hereinafter called the light amount increase periods), as well as the timing (phases) of the light amount increase periods by considering the response characteristics of the liquid crystal panel 231 and the crosstalk (mutual interference) between the displayed L frame image and R frame image. The L filter controller 241 controls the length and timing of the light amount increase periods for the left eye light amount. The R filter controller 242 controls the length and timing of the light amount increase periods for the right eye light amount.

The first controller 250, which operates on the basis of a 120 Hz control signal of the video signal processor 210, outputs a light emission control signal which causes the backlight 232 to emit light in synchronization with the light amount adjustment operations by the left eye shutter 311 and the right eye shutter 312. The backlight 232 is able to turn on and off on the basis of the light emission control signal. Note that, according to this embodiment, the backlight 232 is always turned on under the control of the first controller 250. Therefore, the timing and length of the viewing periods during which the viewer is able to view the frame images are determined by the operation of the optical shutter portion 310 of the glasses device 300.

Alternatively, the first controller 250 may turn on the backlight 232 in some of the periods of the light amount increase periods adjusted by the second controller 240 or in periods which substantially match the light amount increase periods, and may turn off the backlight 232 in the other periods. Under the on-off control of the backlight 232 by the first controller 250, the timing and length of the viewing periods in which the viewer is able to view the frame images are determined according to the on-off operation of the backlight 232.

(Basic Scanning Operation)

Figure 3:
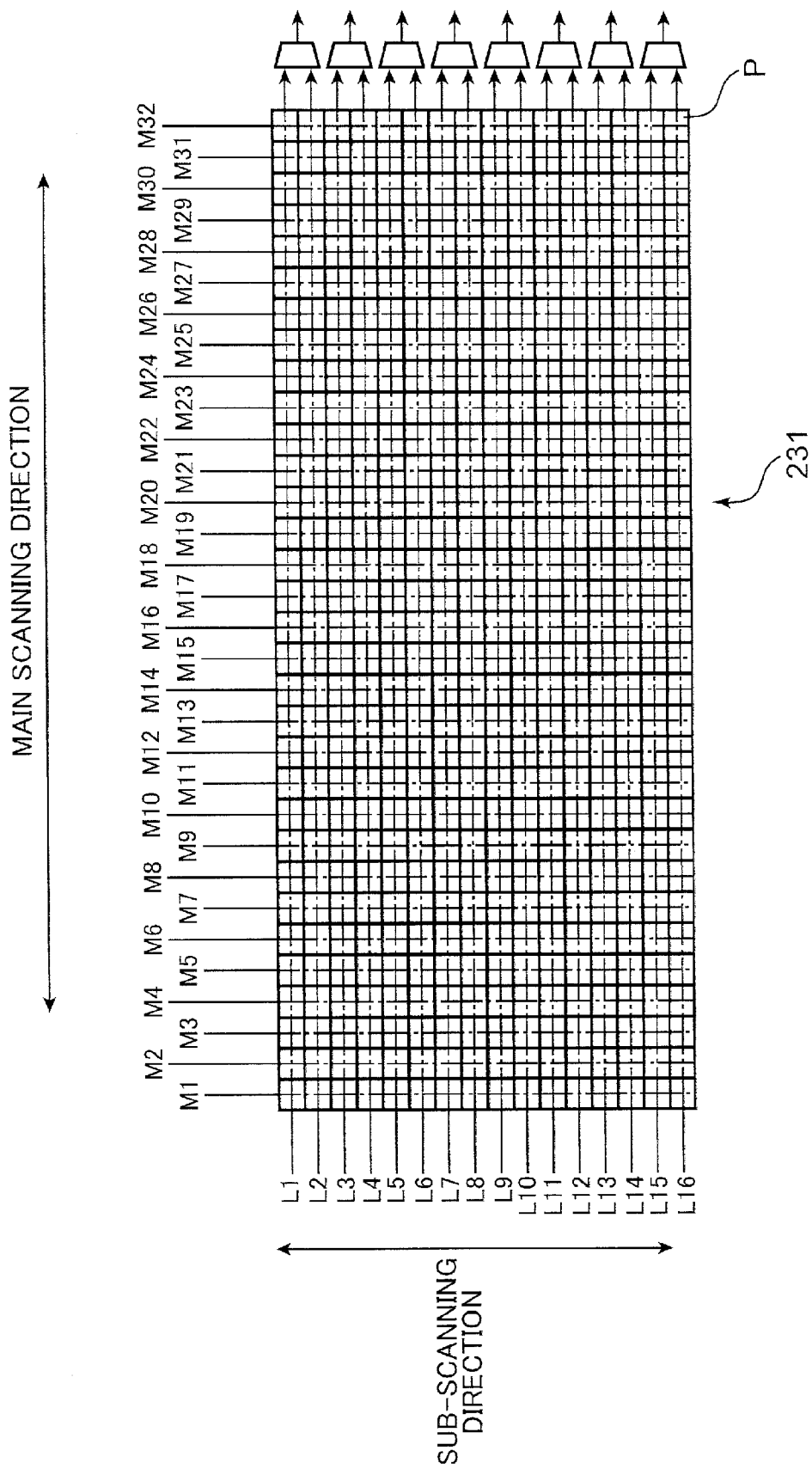
FIG. 3 is a conceptual diagram of selection processing which is executed by a video signal processor of the display device shown in FIG. 1.
Figure 5A:
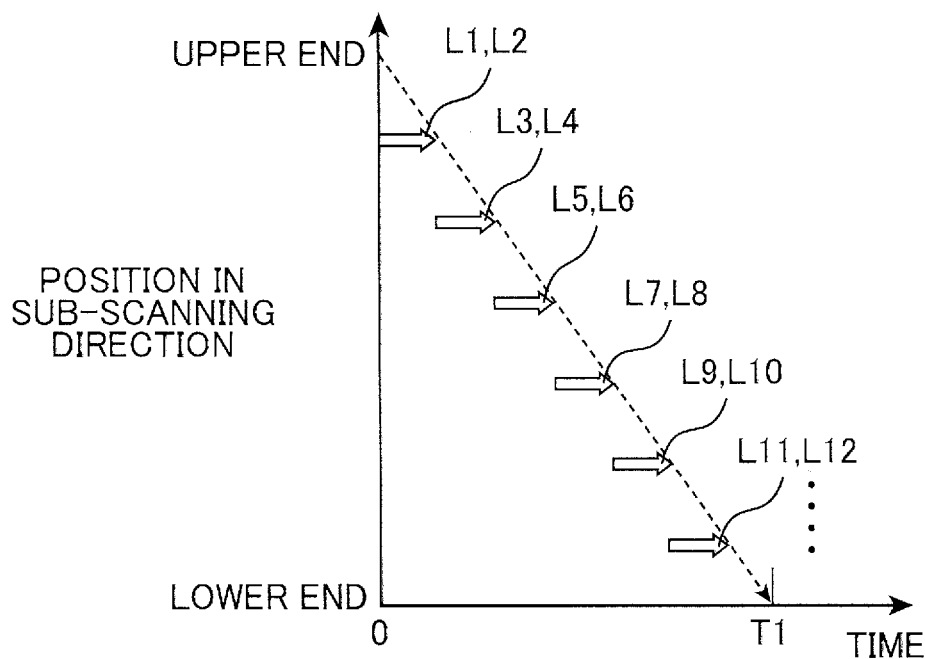
FIGS. 5A and 5B are schematic graphs showing scanning operations which are performed by a liquid crystal driver.
Figure 5B:
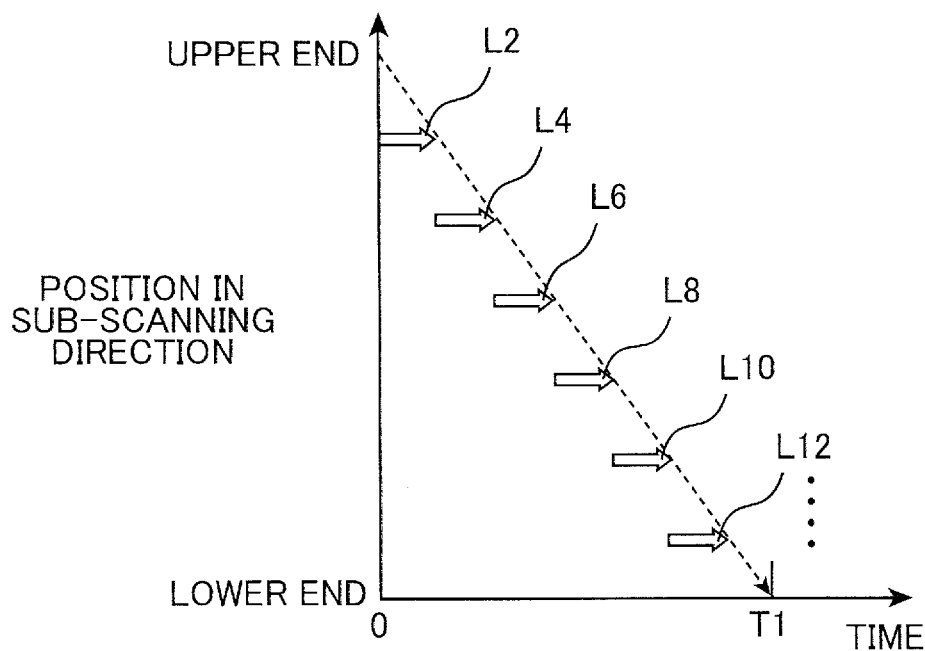

FIG. 3 is a schematic diagram which schematically shows a portion of the liquid crystal panel 231. FIG. 4 is a diagram which schematically shows, in table format, target brightnesses which are configured in a first scanning operation and a second scanning operation and brightnesses which are displayed on the liquid crystal panel after each scanning operation, for target brightnesses which are defined by frame image signals that are input. FIGS. 5A and 5B are schematic graphs showing scanning operations which are performed by the liquid crystal driver 220. FIG. 5A shows a first scanning operation on the basis of a first image signal. FIG. 5B shows a second scanning operation on the basis of a second image signal. FIGS. 5A and 5B show scanning operations from gate lines L1 to L12. The horizontal axis in FIGS. 5A and 5B is the time axis when the scanning operation is performed on gate lines L1 to L12. The vertical axis of FIGS. 5A and 5B plots the positions in the sub-scanning direction of the liquid crystal panel 231. An overview of the basic scanning operation according to the first embodiment will now be provided using FIGS. 1, 3 to 5B.

As shown in FIG. 3, the liquid crystal panel 231 comprises a plurality of gate lines which extend in the main scanning direction and a plurality of data lines which extend in the sub-scanning direction. FIG. 3 shows gate lines L1 to L16 which are arranged in the sub-scanning direction and data lines M1 to M32 which are arranged in the main scanning direction. Liquid crystals (not shown) which correspond to the pixels P are assigned respectively to the intersections between each of the gate lines L1 to L16 and each of the data lines M1 to M32. The liquid crystal driving amounts are determined according to the voltages applied to each of the gate lines L1 to L16 and to each of the data lines M1 to M32.

As shown in FIG. 4, target brightnesses I1 to I12 are defined in the frame image signals respectively for the pixels on data line M of gate lines L1 to L12. Here, in the first scanning operation, a pixel group comprising two pixels arranged adjacently in the sub-scanning direction is configured. That is, a pixel group comprising pixels corresponding to the gate lines L1 and L2 is configured, and a pixel group comprising pixels corresponding to the gate lines L11 and L12 is configured, for example.

In the first scanning operation, the video signal processor 210 generates a first image signal such that, for each pixel group, target brightnesses (selective brightnesses), which correspond to the pixels selected by selection processing which will be described subsequently, are configured as common driving brightnesses (equivalent brightnesses) of the pixels which the pixel group comprises. The liquid crystal driver 220 executes a first scanning operation on the basis of the first image signal generated by the video signal processor 210 and drives all the pixels contained in the pixel group (that is, all the pixels on the data line M). That is, the pixels corresponding to the gate lines L1 and L2, for example, are each driven on the basis of the selective brightness I1 selected from among the target brightnesses I1 and I2. In other words, the target brightness I1 of the pixel corresponding to the gate line L1 selected from among the pixels corresponding to the gate lines L1 and L2, for example, is configured as the selective brightness I1. Likewise, the pixels corresponding to the gate lines L11 and L12, for example, are each driven on the basis of the selective brightness I11 selected from among the target brightnesses I11 and I12. In other words, the target brightness I11 of the pixel corresponding to the gate line L11 selected from among the pixels corresponding to the gate lines L11 and L12, for example, is configured as the selective brightness I11. The voltage corresponding to the selective brightness I1 is applied to the pixels corresponding to the gate lines L1 and L2 and the data line M, and the liquid crystals corresponding to these pixels are driven. Further, a voltage corresponding to the selective brightness I11 is applied to the pixels corresponding to the gate lines L11 and L12 and the data line M, and the liquid crystals corresponding to these pixels are driven.

Subsequently, in the second scanning operation, the pixel group comprising two pixels is divided further, whereby subgroups comprising one pixel are configured. The video signal processor 210 generates a second image signal such that the pixel of the subgroup containing only the pixel not selected in the first scanning operation (that is, the pixel for which the selective brightness did not match the target brightness in this embodiment) is driven and such that the pixel of the subgroup containing the pixel selected in the first scanning operation (that is, the pixel for which the selective brightness matched the target brightness in this embodiment) is not driven and kept as is. According to this embodiment, since subgroups comprise only one pixel, the video signal processor 210 generates a second image signal such that the pixel that was not selected in the first scanning operation is driven and the pixel that was selected in the first scanning operation is not driven and kept as is. Further, the liquid crystal driver 220 executes a second scanning operation on the basis of a second image signal generated by the video signal processor 210 and drives pixels contained in some of the subgroups (that is, some of the pixels on data line M). According to this embodiment, some of the subgroups driven exemplify driving subgroups.

That is, since the pixel corresponding to the gate line L1, for example, is selected in the first scanning operation, in the second scanning operation, a second image signal is generated such that this pixel is not driven and is kept in the state of the first scanning operation. Meanwhile, since the pixel corresponding to the gate line L2 is not selected in the first scanning operation, a second image signal is generated such that this pixel is driven on the basis of the target brightness I2 of the frame image signal. That is, in the second scanning operation, a voltage which corresponds to the target brightness I2 is applied to the pixel corresponding to the gate line L2 and the data line M, and the liquid crystal corresponding to the pixel is driven.

As shown in FIG. 4, after the execution of the first scanning operation based on the first image signal, an image based on the target brightnesses I1, I3, . . . , I11 of the frame image signals respectively is displayed on the liquid crystal panel 231 for each pixel group. Further, after executing the second scanning operation based on the second image signal, an image based on the target brightnesses I1, I2, . . . , I12 of the frame image signals, that is, images based on the input frame image signals, is displayed on the liquid crystal panel 231 for each pixel.

The first image signal equalizes the brightnesses of the two pixels arranged adjacently in the sub-scanning direction as described earlier. According to this embodiment, the brightnesses of the pixels on gate lines $L_{2t-1}$ and $L_{2t}$ are configured equal (where t is a natural number). Therefore, the liquid crystal driver 220 is able to write the first image signal simultaneously to the gate lines $L_{2t-1}$ and $L_{2t}$. As a result, the liquid crystals corresponding to the pixels on gate lines $L_{2t-1}$ and $L_{2t}$ are driven simultaneously.

The second image signal is generated such that the pixel on gate line $L_{2t-1}$ is held without being driven and the pixel on gate line $L_{2t}$ is driven, as described above. Therefore, the liquid crystal driver 220 performs sequential writing in the order gate lines L2, L4, . . . .

As shown in FIGS. 5A and 5B, according to this embodiment, the liquid crystal driver 220 which performs the first scanning operation performs signal writing in synchronization with the set of two gate lines $L_{2t-1}$, $L_{2t}$ by means of the first image signal, and therefore the period T1 of the first scanning operation until the writing to the gate line L12 is complete is half that of a case where writing is performed sequentially to the gate lines L1 to L12. Similarly, the liquid crystal driver 220 which performs the second scanning operation performs image signal writing only to gate line $L_{2t}$ by means of the second image signal and does not perform image signal writing to the gate line $L_{2t-1}$, and the pixel corresponding to the gate line $L_{2t-1}$ retains the state of the first scanning operation, and hence the period of the second scanning operation until the writing to the gate line L12 is complete is equal to the period T1 of the first scanning operation. Since the liquid crystal driving of the liquid crystal panel 231 is executed in a short period across the whole display surface by the first scanning operation and the second scanning operation which are executed in a relatively short time, crosstalk in the lower area of the display surface is reduced.

FIG. 6 is a schematic timing chart which shows variations in pixel brightness by means of the basic scanning operation. The variations in pixel brightness will be described using FIGS. 1, 5A, 5B and 6.

Section (A) in FIG. 6 shows a left eye period for displaying an Xth L frame image, a right eye period for displaying an Xth R frame image, and a left eye period for displaying an (X+1)th L frame image. In the following description, variations in pixel brightness in the right eye period will be described.

Section (B) in FIG. 6 shows a first scanning operation and a second scanning operation. In a first scanning period of the right eye period, the liquid crystal driver 220 uses a first image signal to execute the first scanning operation. As has been described with reference to FIGS. 5A and 5B, the liquid crystal driver 220 simultaneously drives the liquid crystal of a pixel corresponding to one odd numbered gate line and the liquid crystal of a pixel corresponding to one even numbered gate line as one set. As a result, the first image signal is sequentially written to a gate line ($L_1$, $L_2$) set, a gate line ($L_3$, $L_4$) set, and to a gate line ($L_{2t-1}$, $L_{2t}$) set. In the second scanning period of the right eye period, the liquid crystal driver 220 executes the second scanning operation by using the second image signal. As has been described with reference to FIGS. 5A and 5B, the liquid crystal driver 220 writes brightness data of the second image signal sequentially to pixels which correspond to the gate lines $L_2$, $L_4$, . . . , $L_{2t}$. As has bee described with reference to FIGS. 5A and 5B, the first scanning period and second scanning period have the same length.

Section (C) in FIG. 6 shows the opening and closing operations of the optical shutter portion 310. The left eye shutter 311 is open in the period after the second scanning operation is complete and up until before the right eye period starts. Further, the right eye shutter 312 is open in the period after the second scanning operation is complete and up until before the left eye period starts.

Section (D) of FIG. 6 shows the variations in brightness of pixels disposed at the intersections between the gate line L1 and data line M. Section (E) of FIG. 6 shows variations in brightness of pixels disposed at the intersections between the gate line L2 and data line M.

Here, suppose that the L frame image signal used in the display of the L frame image in the preceding left eye period defines the target brightness "100" for the pixels corresponding to the gate line L1 and defines the target brightness "90" for the pixels corresponding to the gate line L2. Therefore, as shown in FIG. 6, in the first scanning operation of the right eye period, the pixel brightness shown in section (D) starts to shift from "100" and the pixel brightness shown in section (E) starts to shift from "90". Further, suppose that the R frame image signal which is used in the display of the R frame image in the right eye period defines the target brightness "50" for the pixels corresponding to the gate line L1 and defines the target brightness "10" for the pixels corresponding to the gate line L2. That is, in FIG. 4, I1=50, I2=10.

When the first scanning operation is started, the pixel brightness shown in section (D) starts to shift from the brightness "100" toward the target brightness (driving brightness) "50", and right before the second scanning operation is started, reaches the brightness "65", for example. The pixel shown in section (D) is held without being driven in the second scanning operation and hence the shift in brightness of the first scanning operation is continued.

When the first scanning operation is started, the pixel brightness shown in section (E) starts to shift from the brightness "90" toward the target brightness (driving brightness) "50", and right before the second scanning operation is started, reaches the brightness "55", for example.

When the second scanning operation is started, the pixel brightness shown in section (E) starts to shift from the brightness "55" toward the target brightness "10" and approaches the target brightness "10".

(Different Scanning Operation)

As has been described using FIGS. 1, 3 to 6, according to the first embodiment, a basic scanning operation in which target brightnesses are configured as driving brightnesses is executed. Alternatively, in the first embodiment, a scanning operation in which different brightnesses from the target brightnesses are configured as the driving brightnesses may also be performed. A case will be described hereinbelow in which a scanning operation which differs from the foregoing basic scanning operation is executed in the first embodiment.

(Video Signal Processor)

Figure 7:
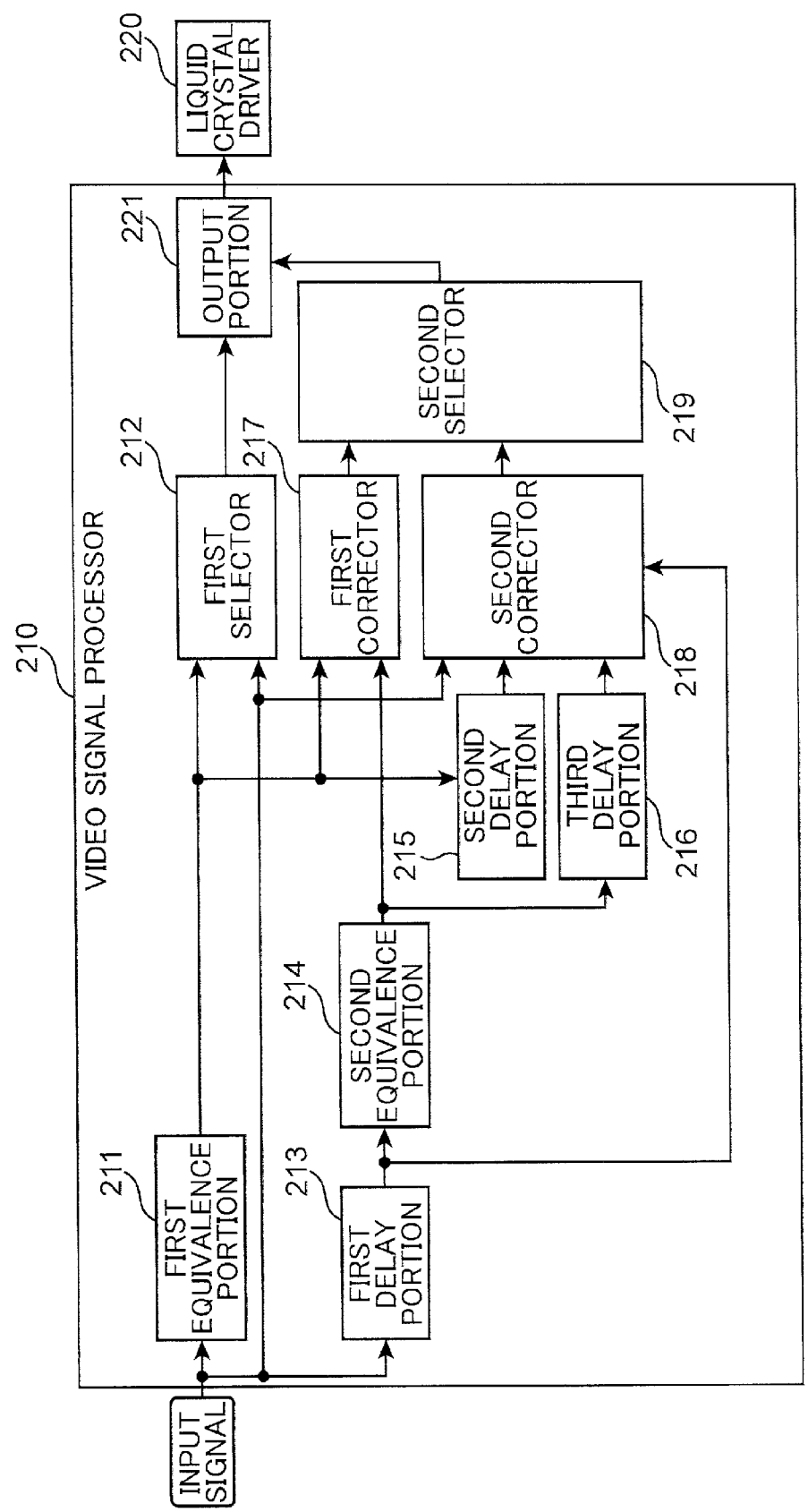
FIG. 7 is a block diagram which schematically shows a functional configuration of a video signal processor of a display device according to this embodiment.

FIG. 7 is a block diagram which schematically shows a functional configuration of the video signal processor 210 of the display device 200 according to this embodiment. The video signal processor 210 will be described using FIGS. 1 and 7.

The video signal processor 210 comprises a first equivalence portion 211, a first selector 212, a first delay portion 213, a second equivalence portion 214, a second delay portion 215, a third delay portion 216, a first corrector 217, a second corrector 218, a second selector 219, and an output portion 221.

The first equivalence portion 211 and the second equivalence portion 214 perform equivalence processing which will be described subsequently. The liquid crystal driver 220 performs scanning on the basis of the first image signal, which is obtained via the equivalence processing, over the display surface of the liquid crystal panel 231 in a relatively short period as described above. The first delay portion 213, the second delay portion 215, and the third delay portion 216 respectively output the input signal by adding a lag thereto. The first corrector 217 and the second corrector 218 perform overdrive processing which is described subsequently. As a result of the overdrive processing, pixel brightness varies in comparatively short periods. The first selector 212 and the second selector 219 selectively output a plurality of input signals in accordance with scanning periods (a first scanning period in which scanning on the basis of the first image signal is executed and a second scanning period in which scanning on the basis of a second image signal is executed). The output portion 221 outputs the first image signal and the second image signal to the liquid crystal driver 220.

(Equivalence Processing (Selection Processing))

Figure 8A:
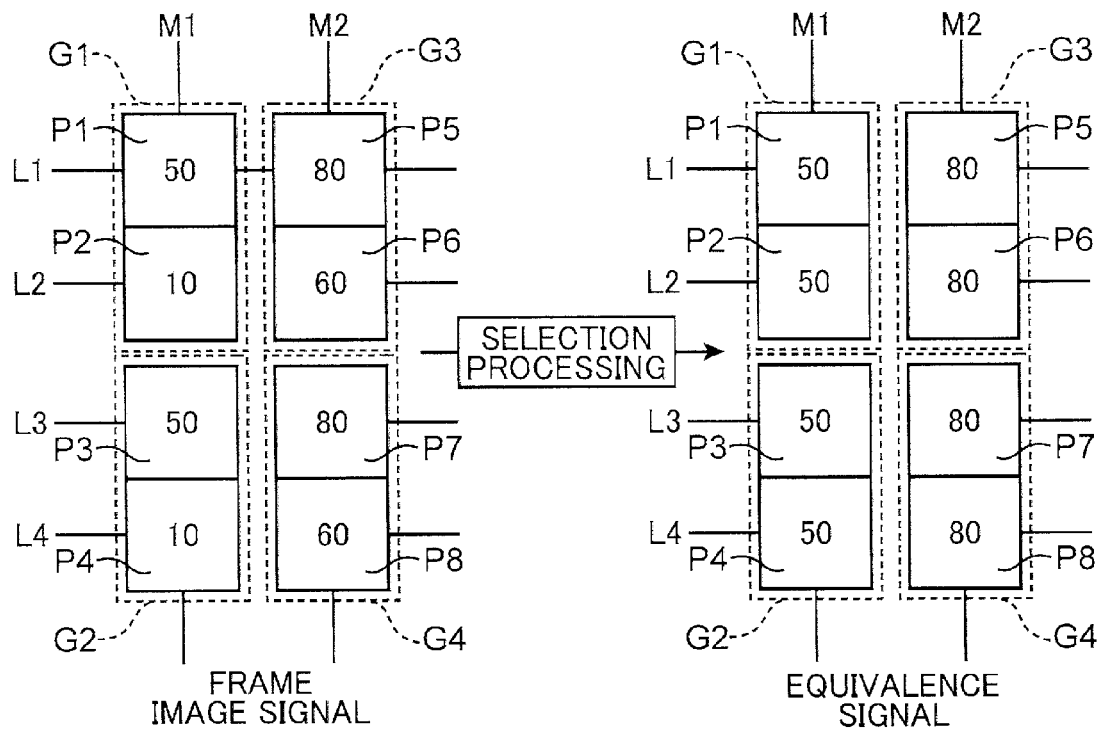
FIGS. 8A and 8B are diagrams which show variations in pixel brightness which is configured via selection processing which is exemplified as equalization processing.
Figure 8B:
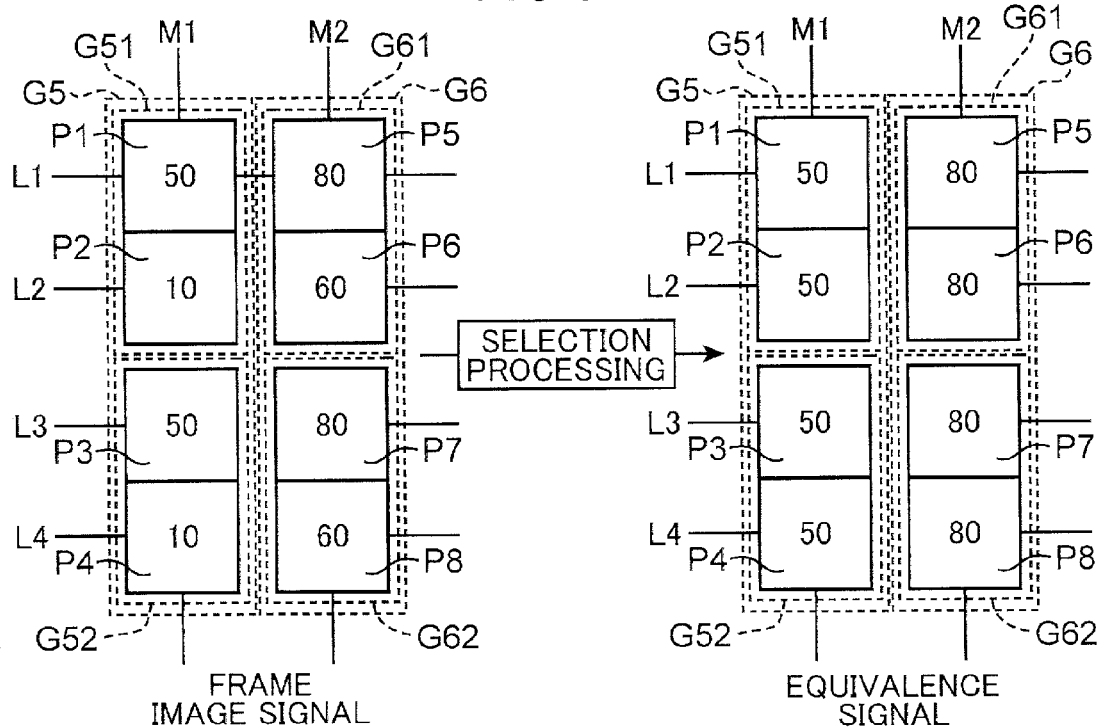

FIGS. 8A and 8B are diagrams which show variations in pixel brightness which are configured via selection processing which exemplifies equivalence processing. Selection processing will be described by using FIGS. 1, 3, 7, and 8.

Pixels P1 to P8 which correspond to intersections between the gate lines L1 to L4 and data lines M1 and M2 respectively are shown in FIGS. 8A and 8B. As shown in FIG. 7, frame image signals (L frame image signal and R frame image signal) are directly input to the first equivalence portion 211. Further, the frame image signals are input to the second equivalence portion 214 via the first delay portion 213. The first equivalence portion 211 and the second equivalence portion 214 configures pixel groups (sets of pixels circled with a dotted line in FIGS. 8A and 8B) which contain a plurality of pixels arranged adjacently in the sub-scanning direction. FIG. 8A shows a pixel group G1 which comprises a set of pixels P1 and P2 arranged adjacently on data line M1, a pixel group G2 which comprises a set of pixels P3 and P4 arranged adjacently on data line M1, a pixel group G3 which comprises a set of pixels P5 and P6 arranged adjacently on data line M2, and a pixel group G4 which comprises a set of pixels P7 and P8 arranged adjacently on data line M2. FIG. 8B shows a pixel group G5 which comprises a set of pixels P1, P2, P3, and P4 arranged adjacently on data line M1, a pixel group G51 which comprises a set of pixels P1 and P2, and a pixel group G52 which comprises a set of pixels P3 and P4, a pixel group G6 which comprises a set of pixels P5, P6, P7, and P8 arranged adjacently on data line M2, a pixel group G61 which comprises a set of pixels P5 and P6, and a pixel group G62 which comprises a set of pixels P7 and P8.

According to this embodiment, as shown in FIG. 8A, the foregoing selection processing is performed on the sets of two pixels arranged adjacently in the sub-scanning direction. Alternatively, the foregoing selection processing may also be performed on the sets of more than two pixels (for example, four as shown in FIG. 8B) which are arranged adjacently in the sub-scanning direction. This embodiment will be described subsequently.

The numerical values shown in each of the pixels in FIG. 8A represent a brightness which is assigned to the pixels. The frame image signals define, for example, a brightness "50" to the pixels P1 and P3, a brightness "10" to the pixels P2 and P4, a brightness "80" to the pixels P5 and P7, and a brightness "60" to the pixels P6 and P8. The first equivalence portion 211 and the second equivalence portion 214 select the brightnesses in each of the pixel groups G1, G2, G3, and G4. The first equivalence portion 211 and the second equivalence portion 214 select the brightnesses defined for the pixels P1, P3, P5, and P7 on the odd-numbered gate lines, and assign these brightnesses to the other pixels P2, P4, P6, and P8 respectively in the pixel groups G1, G2, G3, and G4. In other words, the first equivalence portion 211 and the second equivalence portion 214 select the pixel P1 from among the plurality of pixels P1 and P2 contained in the pixel group G1, and select the brightness which the frame image signal has defined for the selected pixel P1. Therefore, the brightnesses of the pixels P1 and P2 in the pixel group G1 and of the pixels P3 and P4 in the pixel group G2 are configured as "50". Further, the brightnesses of the pixels P5 and P6 in the pixel group G3 and of the pixels P7 and P8 in the pixel group G4 are configured as "80".

Alternatively, the first equivalence portion 211 and the second equivalence portion 214 may select the brightnesses defined for the pixels P2, P4, P6, and P8 on the even-numbered gate lines and assign these brightnesses to each of the other pixels P1, P3, P5, and P7 in the pixel groups G1, G2, G3, and G4. Further, alternatively, the first equivalence portion 211 and the second equivalence portion 214 may select a larger or smaller brightness from among the brightnesses which the frame image signals have defined for the pixels in the pixel group. Alternatively, the first equivalence portion 211 and the second equivalence portion 214 may select brightnesses for generating the first image signal on the basis of another suitable reference. As shown in FIG. 3, the foregoing selection processing is executed for all the pixels P which correspond to the intersections between the gate lines L1 to L16 and each of the data lines M1 to M32. According to this embodiment, the brightnesses which the frame image signals have defined for each of the pixels P exemplify the target brightnesses. According to this embodiment, the brightnesses selected by the first equivalence portion 211 and the second equivalence portion 214 exemplify the selected brightnesses. According to this embodiment, the pixel P1 which is selected among the plurality of pixels P1 and P2 contained in the pixel group G1, for example, exemplifies a specific pixel.

The first scanning operation for performing scanning on the basis of the first image signal and the second scanning operation for performing scanning on the basis of the second image signal will be further described hereinbelow.

The first equivalence portion 211 and the second equivalence portion 214 perform the foregoing selection processing on the frame image signals and output a selection signal.

As shown in FIG. 7, the selection signal is input to the first selector 212, the first corrector 217 and the second corrector 218. The first corrector 217 outputs a correction signal which defines a correction value for the selected brightness to the second selector 219. The second corrector 218 outputs a correction signal which defines a correction value for the target brightness defined by the frame image signal to the second selector 219.

Figure 9A:
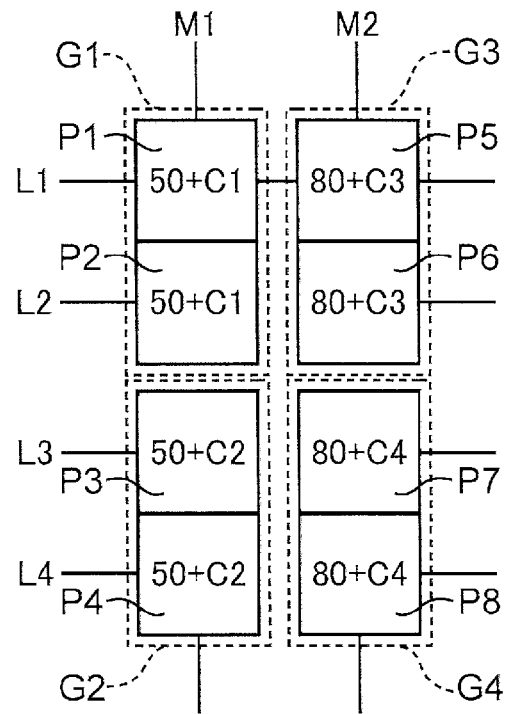
FIGS. 9A and 9B are diagrams which schematically show the processing of an output portion.
Figure 9B:
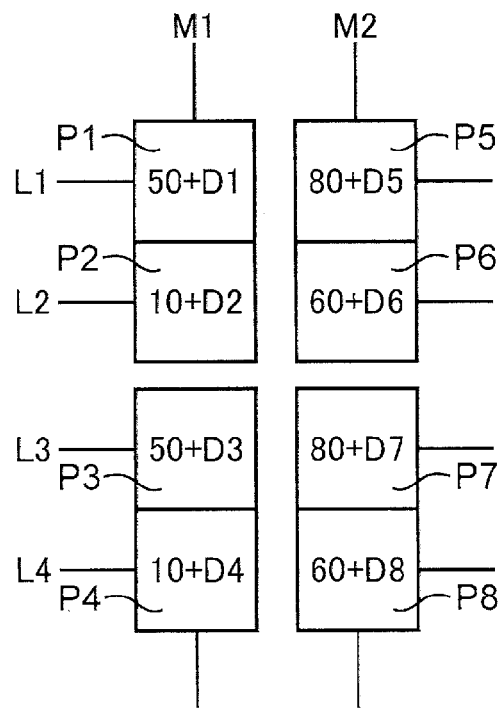

FIGS. 9A and 9B are diagrams which schematically show the processing of the output portion 221. The processing of the output portion 221 will be described using FIGS. 7, 9A and 9B. FIGS. 9A and 9B show the processing of the output portion 221 on the selection signal which is generated by the selection processing described with reference to FIG. 8.

FIG. 9A shows the processing of the output portion 221 which outputs the first image signal. FIG. 9B shows the processing of the output portion 221 which outputs the second image signal.

In the first scanning period in which the scanning on the basis of the first image signal is performed, the first selector 212 outputs the selection signal to the output portion 221 and the second selector 219 outputs the correction signal generated by the first corrector 217 to the output portion 221. The output portion 221 adds the selected brightness defined by the selection signal to the correction value defined by the correction signal generated by the first corrector 217.

As shown in FIG. 9A, the correction signal generated by the first corrector 217 defines equal correction values for the pixels in the pixel groups G1, G2, G3, and G4. In FIG. 9A, the correction value "C1" is defined for the pixels P1 and P2 in the pixel group G1. A correction value "C2" is defined for the pixels P3 and P4 in the pixel group G2. A correction value "C3" is defined for the pixels P5 and P6 in the pixel group G3. A correction value "C4" is defined for the pixels P7 and P8 in the pixel group G4. Thus, the output portion 221 generates a first image signal which defines an equivalent brightness common to the pixels in the pixel groups G1, G2, G3, and G4. According to this embodiment, the brightness defined by the addition of the selected brightness to the correction value defined by the correction signal generated by the first corrector 217 exemplifies the equivalent brightness.

As shown in FIG. 7, a frame image signal is input to the first selector 212 and the second corrector 218. In the second scanning period in which the scanning on the basis of the second image signal is performed, the first selector 212 outputs the frame image signal to the output portion 221. The second corrector 218 configures correction values individually for each pixel. As shown in FIG. 9B, correction values D1 to D8 are defined for each of the pixels P1 to P8. The correction values D1 to D8 may each be different brightness values. The second corrector 218 outputs correction signals defining the correction values D1 to D8 to the second selector 219.

The second selector 219 outputs the correction signals generated by the second corrector 218 to the output portion 221. The output portion 221 adds target brightnesses defined by the frame image signals to the correction values defined by the correction signals generated by the first corrector 217. Therefore, unlike the first image signal, the second image signal may define a different brightness for each pixel. However, as has been described with reference to FIGS. 3 to 5B, in the second scanning period, the output portion 221 does not output signals for the pixels on the gate lines L1, L3, . . . and outputs only signals for the pixels on the gate lines L2, L4, . . . . The brightness values shown on the pixels P1 to P8 shown in FIGS. 9A and 9B respectively exemplify the driving brightnesses in the first scanning period and the second scanning period.

(Signal Output)

Figure 10:
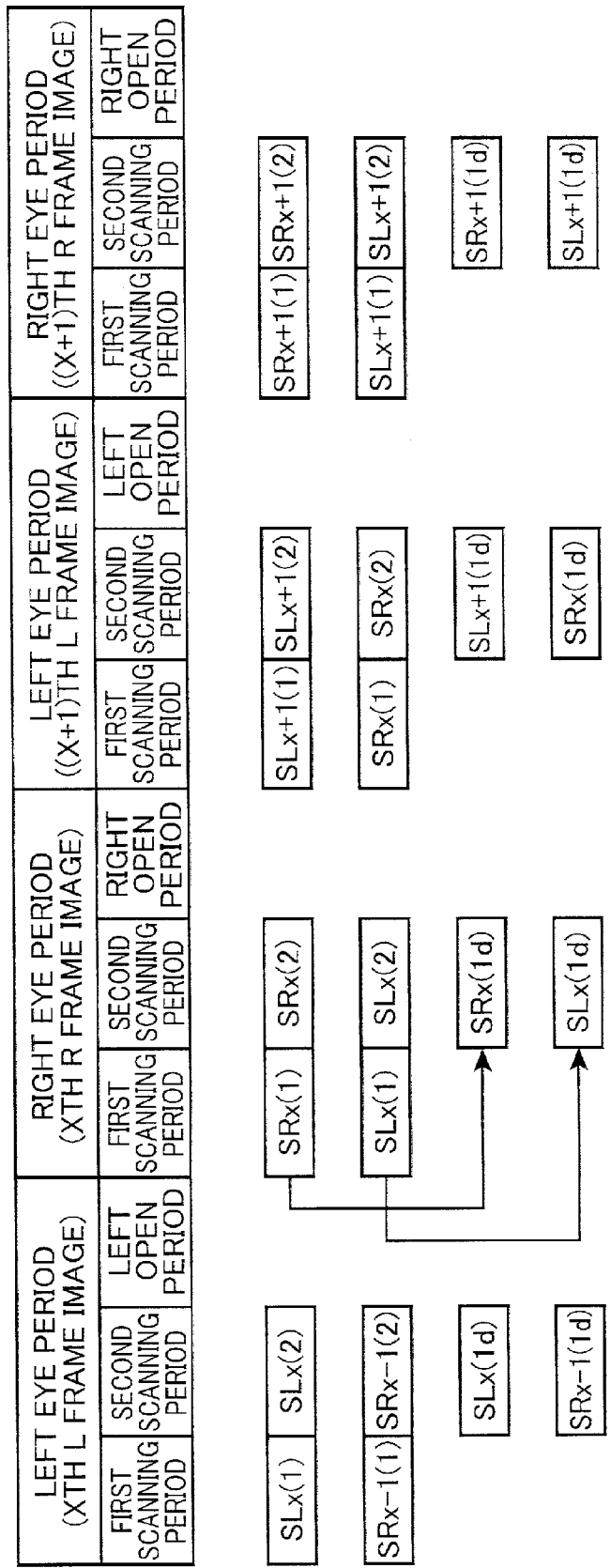
FIG. 10 is a diagram showing signal output in the video signal processor.
Figure 11:
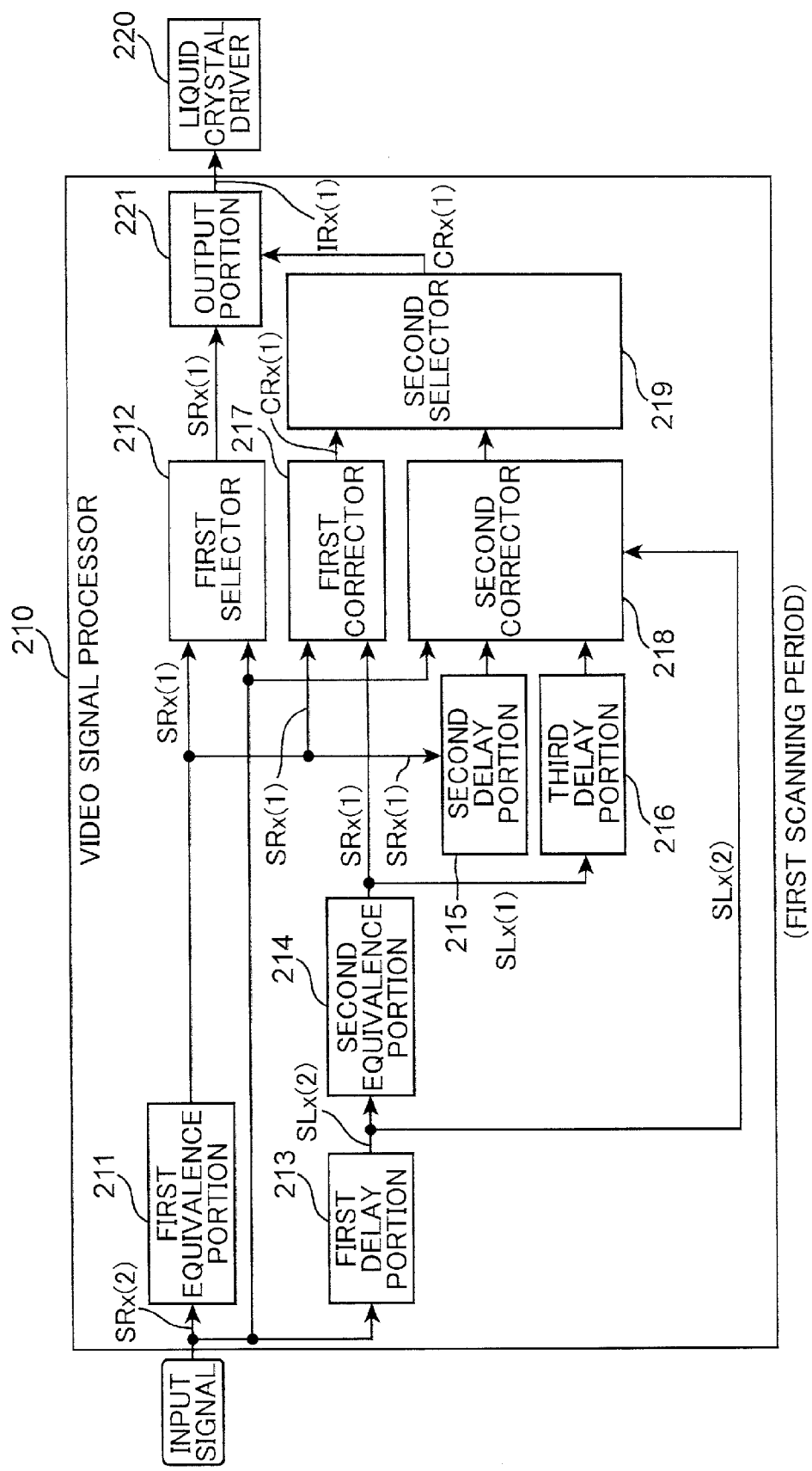
FIG. 11 is a schematic block diagram showing the output of signals in the video image processor in a first scanning cycle.
Figure 12:
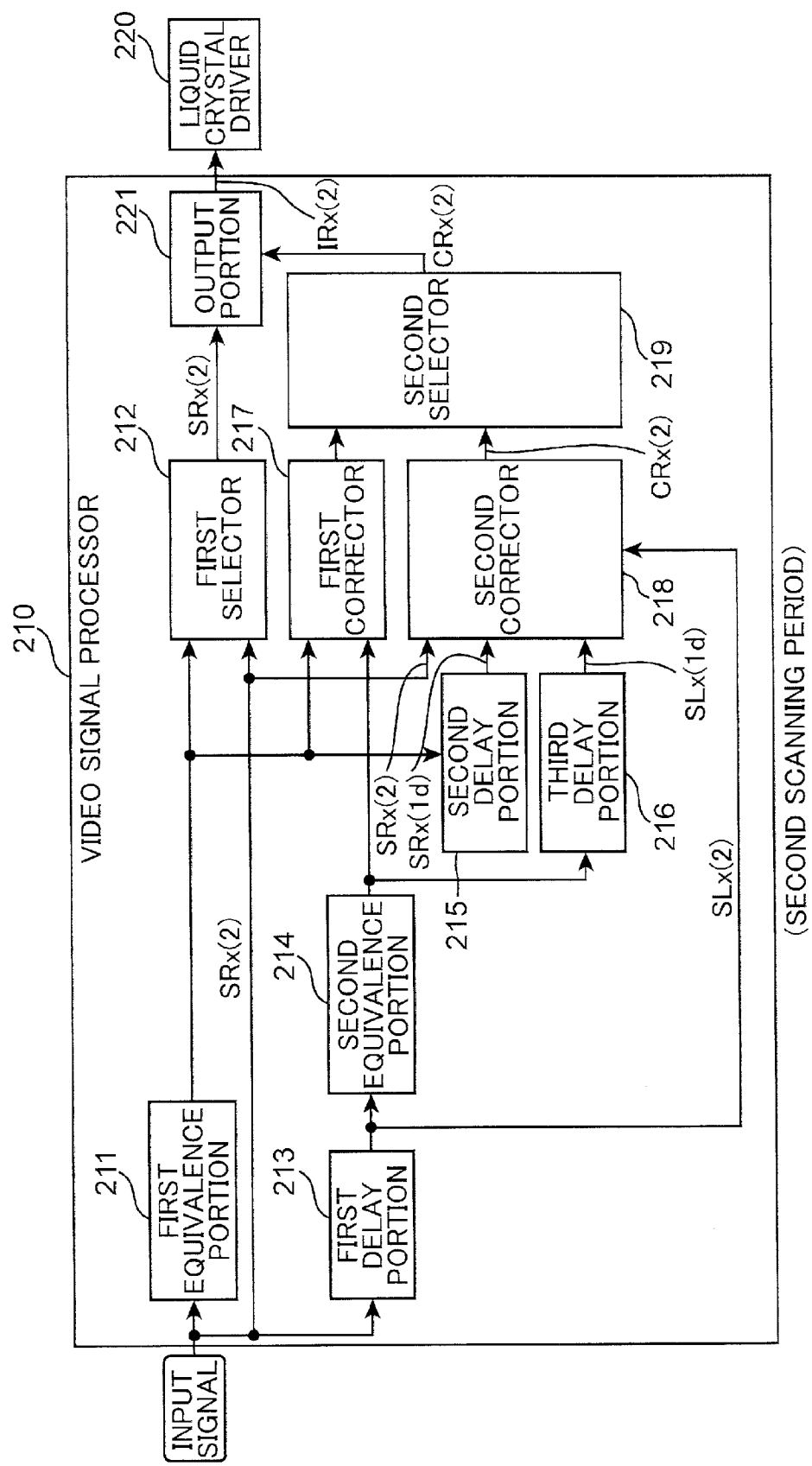
FIG. 12 is a schematic block diagram showing the output of signals in the video signal processor in a second scanning cycle.

FIG. 10 is an output diagram for the signals in the video signal processor 210. FIG. 11 is a schematic block diagram which shows the outputs of the signals in the video signal processor 210 in the first scanning period. FIG. 12 is a schematic block diagram which shows the outputs of the signals in the video signal processor 210 in the second scanning period. The outputs of the signals in the video signal processor 210 will be described by using FIGS. 3 and 8A to 12.

FIG. 10 illustrates a left eye period for displaying the Xth L frame image, a right eye period for displaying the Xth R frame image, a left eye period for displaying the (X+1)th L frame image, and a right eye period for displaying the (X+1)th R frame image. In the following description, the output of signals in the right eye period for displaying the Xth R frame image will be described. Note that, so too in other periods, the principles governing the output of signals in the right eye period for displaying the Xth R frame image likewise applies. In the following description, the Xth L frame image exemplifies a preceding frame image. Further, the Xth R frame image exemplifies a subsequent frame image.

As shown in FIG. 11, when an Xth R frame image signal SRx(2) is input to the video signal processor 210, in the first scanning period, the first equivalence portion 211 executes selection processing which has been described with reference to FIGS. 3, 8A and 8B and generates and outputs a selection signal SRx(1). The selection signal SRx(1) is input to the first selector 212, the first corrector 217, and the second delay portion 215. In the description pertaining to FIGS. 10 to 12, the first equivalence portion 211 and the second equivalence portion 214 perform selection processing which has been described with reference to FIGS. 3, 8A and 8B.

The first delay portion 213 obtains an Xth L frame image signal SLx(2) in the left eye period for displaying the previous Xth L frame image. The first delay portion 213 delays the L frame image signal SLx(2) and outputs same to the second equivalence portion 214 and the second corrector 218 in the first scanning period of the right eye period for displaying the next Xth R frame image. According to this embodiment, the L frame image signal SLx(2) for displaying the Xth L frame image exemplifies the preceding frame image signal. The R frame image signal SRx(2) for displaying the Xth R frame image exemplifies the subsequent frame image signal.

The second equivalence portion 214 executes the selection processing which has been described with reference to FIGS. 3, 8A and 8B and generates and outputs the selection signal SLx(1). The selection signal SLx(1) is input to the first corrector 217 and the third delay portion 216.

The first corrector 217 generates a first correction signal CRx(1) on the basis of the selection signal SRx(1) and the selection signal SLx(1). As has been described with reference to FIGS. 9A and 9B, the first correction signal CRx(1) has equal correction values defining the pixels in the pixel groups. The correction signal CRx(1) is output to the second selector 219.

The first selector 212 and the second selector 219 synchronously output the selection signal SRx(1) and the first correction signal CRx(1) respectively to the output portion 221. As has been described with reference to FIGS. 9A and 9B, the output portion 221 adds the selected brightness defined by the selection signal SRx(1) to the correction value defined by the first correction signal CRx(1) and generates the first image signal IRx(1). The first image signal IRx(1) is output to the liquid crystal driver 220.

As shown in FIG. 12, the Xth R frame image signal SRx(2) is input not only to the first equivalence portion 211 but also to the first selector 212. In the second scanning period, the first selector 212 outputs the R frame image signal SRx(2).

The Xth R frame image signal SRx(2) is also input to the second corrector 218. The second delay portion 215 delays the selection signal SRx(1) obtained in the first scanning period and, in the second scanning period, outputs this signal to the second corrector 218 as a delayed selection signal SRx(1d). The third delay portion 216 delays the selection signal SLx(1) obtained in the first scanning period and, in the second scanning period, outputs this signal to the second corrector 218 as a delayed selection signal SLx(1d). An L frame image signal SLx(2) is further input from the first delay portion 213 to the second corrector 218. The second corrector 218 determines the correction value described with reference to FIGS. 9A and 9B by using the R frame image signal SRx(2), the L frame image signal SLx(2), the selection signal SRx(1d), and the selection signal SLx(1d), and outputs a second correction signal CRx(2) to the second selector 219.

The first selector 212 and the second selector 219 synchronously output the R frame image signal SRx(2) and the second correction signal CRx(2) to the output portion 221. As has been described with reference to FIGS. 9A and 9B, the output portion 221 adds the target brightness defined by the R frame image signal SRx(2) to the correction value defined by the second correction signal CRx(2), and generates the second image signal IRx(2). The second image signal IRx(2) is output to the liquid crystal driver 220. According to this embodiment, the signals for each of the pixels contained in the first image signal IRx(1) and the second image signal IRx(2) exemplify the write data. Further, as has been described with reference to FIGS. 3 to 5B, the second image signal IRx(2) does not contain brightness data which is written to the pixels on the gate lines L1, L3, . . . and contains brightness data which is written to the pixels on the gate lines L2, L4, . . . .

(Overdrive Processing)

The calculation of the correction values by the first corrector 217 and the second corrector 218 and the addition processing by the output portion 221 exemplify overdrive processing. As described with reference to FIG. 11, the first corrector 217 contributes to overdrive processing in the first scanning period in which scanning on the basis of the first image signal IRx(1) is performed. As described with reference to FIG. 12, the second corrector 218 contributes to overdrive processing in the second scanning period in which scanning on the basis of the second image signal IRx(2) is performed.

(First Corrector)

Figure 13:
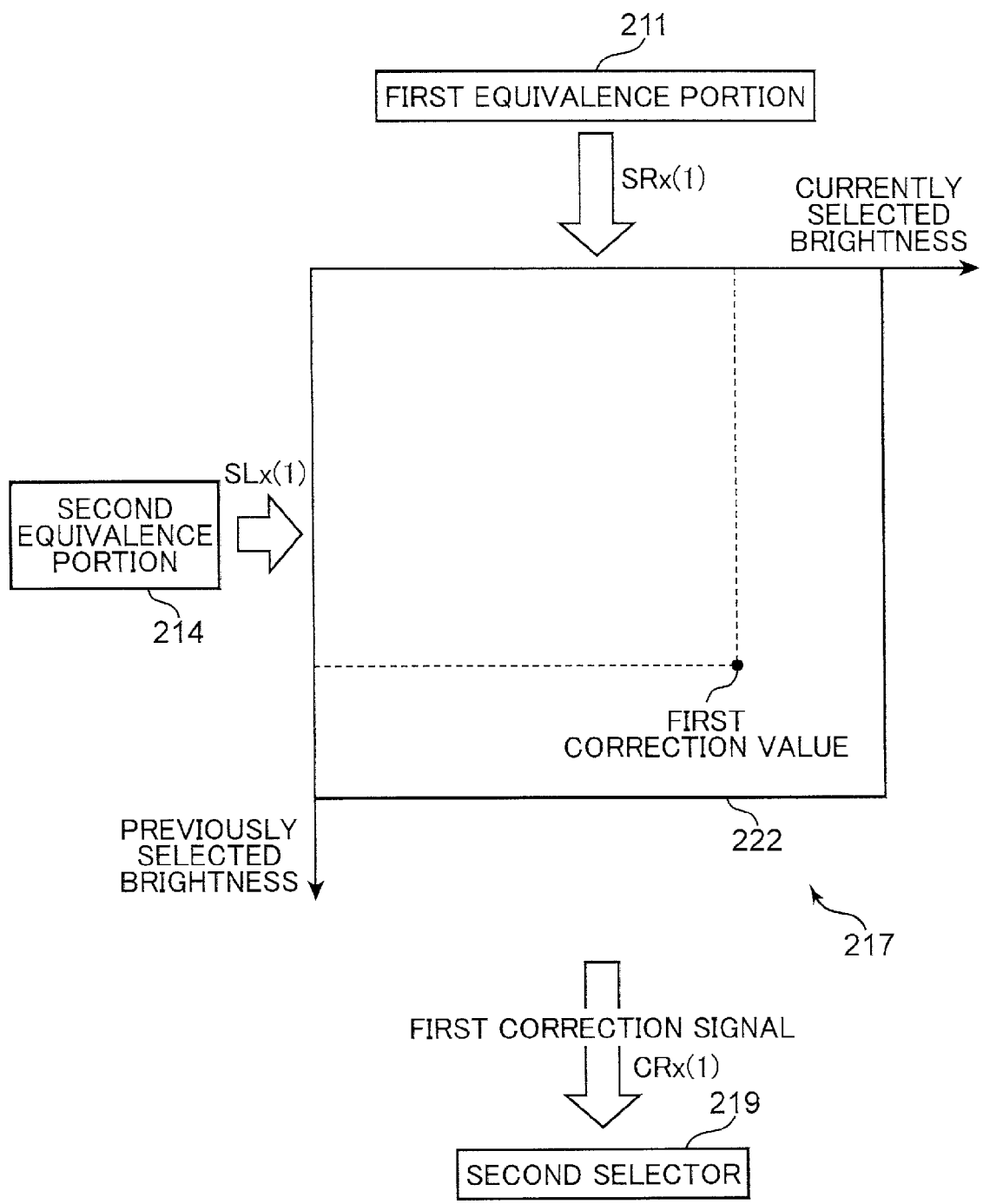
FIG. 13 is a conceptual drawing of a first correction table which is stored in a first corrector.

FIG. 13 is a conceptual diagram of a first correction table which is stored in the first corrector 217. The first corrector 217 will be described using FIGS. 1, 8A, 8B, 9A, 9B, 11, and 13.

The first corrector 217 stores a first correction table 222 for generating the first correction signal. As described earlier, the selection signal SRx(1) from the first equivalence portion 211 and the selection signal SLx(1) from the second equivalence portion 214 are input to the first corrector 217. As described earlier, the second equivalence portion 214 outputs the selection signal SLx(1) on the basis of the frame image signal delayed by the first delay portion 213. The coordinate axis corresponding to the input from the first equivalence portion 211 in the first correction table 222 shown in FIG. 13 represents the currently selected brightness defined by the selection signal SRx(1) from the first equivalence portion 211. The coordinate axis corresponding to the input from the second equivalence portion 214 in the first correction table 222 represents the previously selected brightness defined by the selection signal SLx(1) from the second equivalence portion 214.

The first corrector 217 determines a first correction value for each of the pixels P1 to P8 on the basis of the currently selected brightness defined in the selection signal SRx(1) from the first equivalence portion 211 and the previously selected brightness SLx(1) defined in the selection signal from the second equivalence portion 214, and outputs the first correction signal CRx(1) containing the information of the first correction value to the second selector 219. Note that, as has been described with reference to FIGS. 9A and 9B, the first corrector 217 defines a first correction value of equal value for the pixels in the pixel groups G1, G2, G3, and G4. The greater the difference between the currently selected brightness and the preceding selected brightness, for example, the greater the absolute value of the first correction value that is configured. Further, if the currently selected brightness is greater than the preceding selected brightness, the first correction value is configured as a positive value. If the currently selected brightness is less than the preceding selected brightness, the first correction value is configured as a negative value. As will be described subsequently, the brightness of the pixels P1 to P8 achieved in the first scanning period shifts according to the selected first correction value.

As shown in FIG. 11, in the first scanning period, the selection signal SRx(1) generated by the first equivalence portion 211 and the first correction signal CRx(1) generated by the first corrector 217 are input to the output portion 221.

The output portion 221 adds the currently selected brightness defined by the selection signal SRx(1) generated by the first equivalence portion 211 to the first correction value defined by the first correction signal CRx(1). As described earlier, if the currently selected brightness is greater than the preceding selected brightness, the first correction value is configured as a positive value, and hence the addition value calculated by the output portion 221 is greater than the currently selected brightness. If the currently selected brightness is less than the preceding selected brightness, the first correction value is configured as a negative value, and hence the addition value calculated by the output portion 221 is smaller than the currently selected brightness. As described earlier, the first equivalence portion 211 defines a currently selected brightness of equal value for the pixels in the pixel groups G1, G2, G3, and G4. Further, the first corrector 217 defines a first correction value of equal value for the pixels in the pixel groups G1, G2, G3, and G4. Therefore, the addition values obtained by adding the currently selected brightnesses in the pixel groups G1, G2, G3, and G4 to the first correction value are equal values. In the first scanning period in which the first scanning operation is performed, the output portion 221 outputs the first image signal IRx(1) containing information of the calculated addition value to the liquid crystal driver 220. According to this embodiment, the addition value obtained by adding the currently selected brightnesses to the first correction value exemplifies the driving brightness in the first scanning period.

The liquid crystal driver 220 drives the liquid crystals of the liquid crystal panel 231 on the basis of the first image signal IRx(1). As described earlier, the first image signal IRx(1) has an equal value for the driving brightnesses defined for the pixels in the pixel groups G1, G2, G3, and G4. In the first scanning period, the liquid crystal driver 220 simultaneously drives the liquid crystals corresponding to each of the pixels P1 and P2 toward the driving brightnesses which are configured to be equal in the pixel group G1. Further, the liquid crystal driver 220 simultaneously drives the liquid crystals corresponding to each of the pixels P5 and P6 toward the driving brightnesses which are configured to be equal in the pixel group G3. The driving of the liquid crystals of the pixels corresponding to the gate lines L1 and L2 is started on the basis of horizontal synchronization signals which correspond to the gate lines L1 and L2. As a result, the liquid crystal driver 220 simultaneously drives the liquid crystals corresponding to each of the pixels P3 and P4 toward the driving brightnesses which are configured to be equal in the pixel group G2. Further, the liquid crystal driver 220 simultaneously drives the liquid crystals corresponding to each of the pixels P7 and P8 toward the driving brightnesses which are configured to be equal in the pixel group G4. According to this embodiment, the driving brightnesses determined on the basis of the first correction value and the currently selected brightness exemplify an equivalent brightness.

(Second Corrector)

Figure 14:
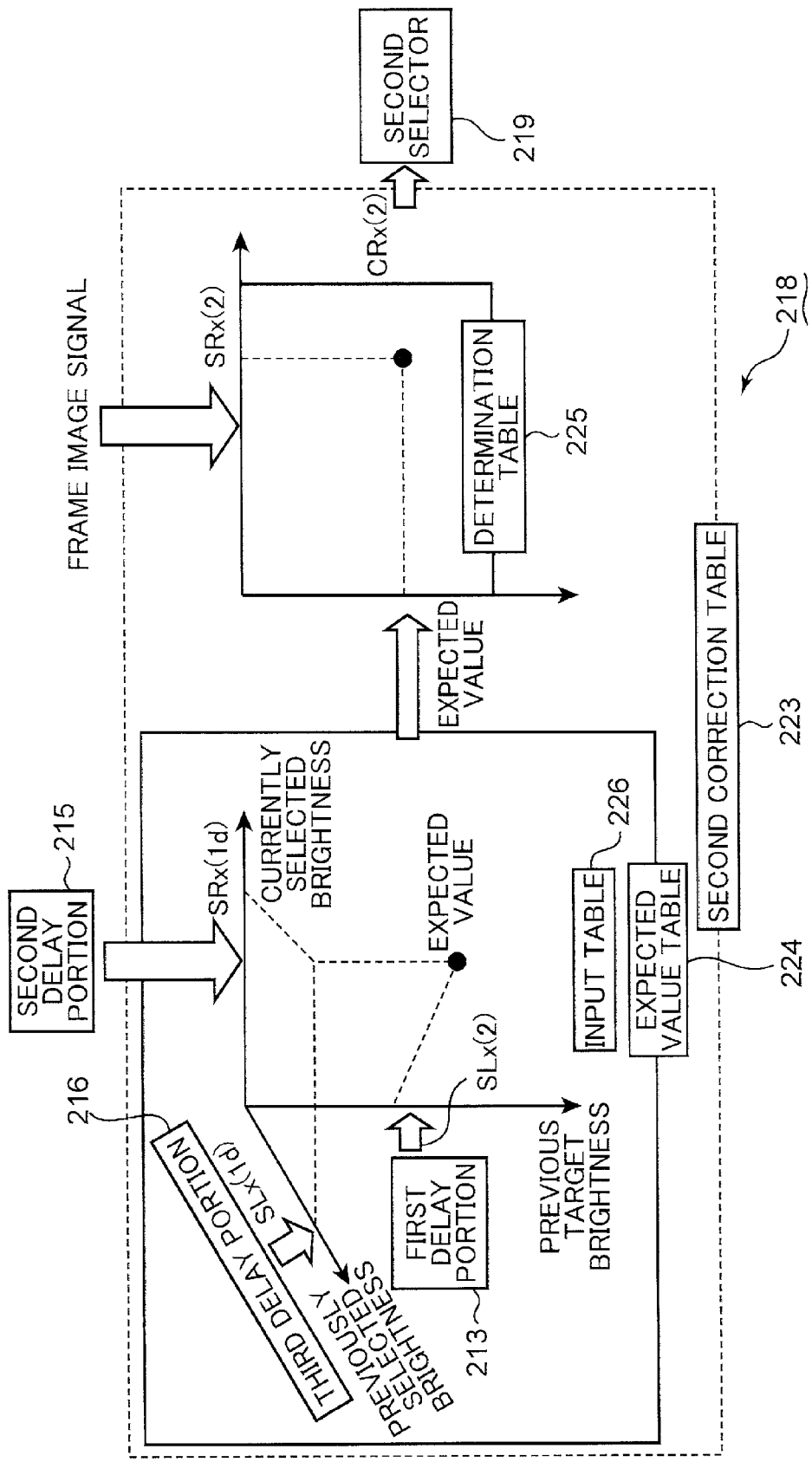
FIG. 14 is a conceptual drawing of a second correction table which is stored in a second corrector.

FIG. 14 is a conceptual diagram of the second correction table which is stored in the second corrector 218. The second corrector 218 will be described using FIG. 1 and FIGS. 12 to 14.

The second corrector 218 stores the second correction table 223 for generating the second correction signal. The second correction table 223 comprises an expected value table 224 for determining expected values for the brightnesses achieved by the pixels when the second scanning operation is started and a determination table 225 for determining the driving brightnesses when the second scanning operation is performed on the basis of the expected values and the frame image signals. According to this embodiment, the liquid crystal driver 220 performs two scanning operations which are the first scanning operation and the second scanning operation. Therefore, the expected value table 224 stores expected value data pertaining to the expected values for the brightnesses achieved by pixels when the second scanning operation which is the second scanning operation is started.

As per an embodiment that will be described subsequently, in a case where the liquid crystal driver performs two or more second scanning operations, the expected value table may store expected value data pertaining to the expected values for the brightnesses achieved by the pixels when each scanning operation is performed. Further, as per an embodiment that will be described subsequently, in a case where the liquid crystal driver performs a third scanning operation after the second scanning operation has been executed, the expected value table may also store expected value data pertaining to expected values for the brightnesses achieved by the pixels when the third scanning operation is performed. Further the second corrector 218 may comprise an arithmetic expression or function instead of a table and may calculate the expected values by means of the arithmetic expression or function.

The expected value table 224 comprises an input table 226 to which the L frame image signal SLx(2) from the first delay portion 213, the selection signal SRx(1d) from the second delay portion 215, and the selection signal SLx(1d) from the third delay portion 216 are input.

As described above, the L frame image signal SLx(2) from the first delay portion 213, the selection signal SRx(1d) from the second delay portion 215, and the selection signal SLx(1d) from the third delay portion 216 are input to the input table 226. The coordinate axis corresponding to the input from the second delay portion 215 in the input table 226 shown in FIG. 14 represents the currently selected brightness defined by the selection signal SRx(1d) from the second delay portion 215. The coordinate axis corresponding to the input from the third delay portion 216 in the input table 226 represents the preceding selected brightness defined by the selection signal SLx(1d) from the third delay portion 216. Note that the currently selected brightness defined by the selection signal SRx(1d) from the second delay portion 215 and the preceding selected brightness defined by the selection signal SLx(1d) from the third delay portion 216 are equal values to the currently selected brightness and the preceding selected brightness described with reference to FIG. 13.

Figure 15:
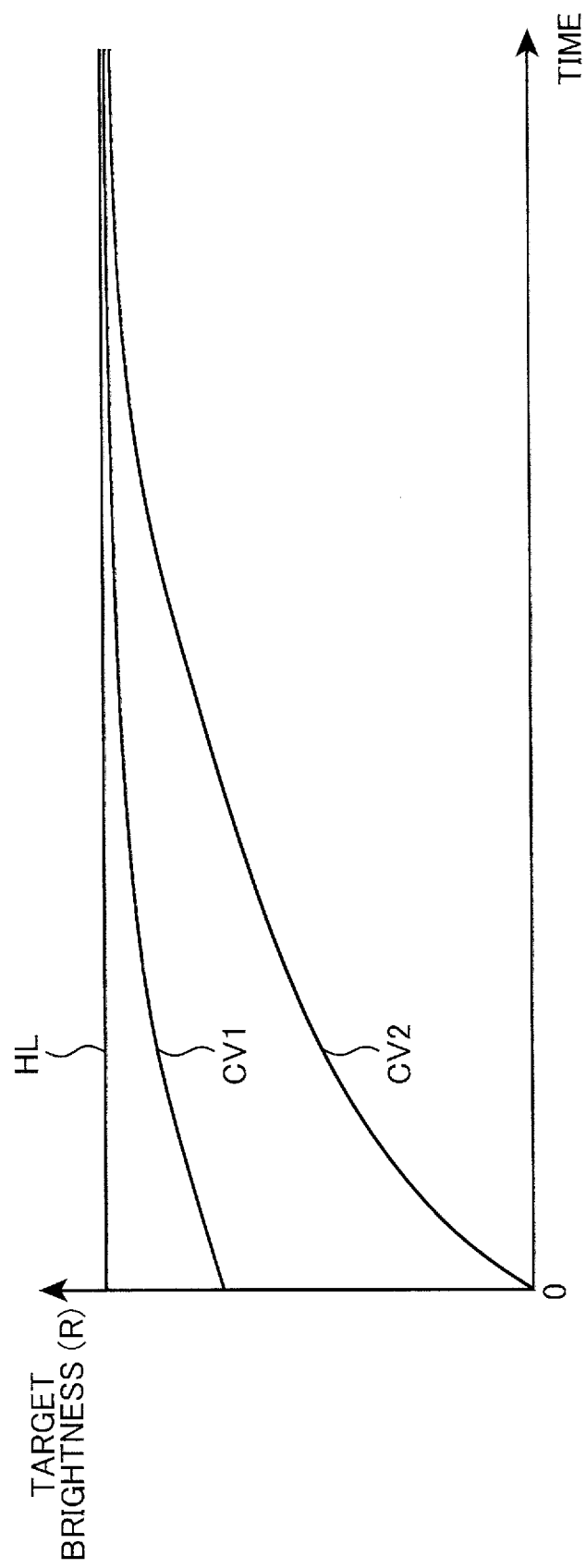
FIG. 15 is a graph which schematically shows the effect on the variation in pixel brightness due to the difference between the target brightness defined by a preceding L frame image signal and the target brightness defined by a subsequent R frame image signal.

FIG. 15 is a graph which schematically shows the effect on the variation in pixel brightness due to the difference between the target brightness defined by the preceding L frame image signal SLx(2) and the target brightness defined by the subsequent R frame image signal SRx(2). The input table 226 will be further described using FIGS. 8A, 8B, 14, and 15.

The horizontal line HL which extends in a horizontal direction in FIG. 15 represents the target brightness which is defined by the R frame image signal SRx(2). The curved line CV1 in FIG. 15 represents the variation in pixel brightness when the difference is small between the target brightness defined by the preceding L frame image signal SLx(2) and the target brightness defined by the subsequent R frame image signal SRx(2). The curved line CV2 in FIG. 15 represents the variation in pixel brightness when the difference is large between the target brightness defined by the preceding L frame image signal SLx(2) and the target brightness defined by the subsequent R frame image signal SRx(2). Note that the values of the curved lines CV1 and CV2 at time "0" are each equivalent to the target brightnesses defined by the preceding L frame image signal SLx(2). As shown in FIG. 15, when the difference is small between the target brightness defined by the preceding L frame image signal SLx(2) and the target brightness defined by the subsequent R frame image signal SRx(2), the pixel brightness reaches the target brightness defined by the R frame image signal SRx(2) relatively promptly. If, on the other hand, the difference is large between the target brightness defined by the preceding L frame image signal SLx(2) and the target brightness defined by the subsequent R frame image signal SRx(2), it takes a long time for the pixel brightness to reach the target brightness of the R frame image signal SRx(2).

As shown in FIG. 14, the input table 226 comprises a coordinate axis which corresponds to the target brightness defined by the preceding L frame image signal SLx(2) input from the first delay portion 213.

The second corrector 218 determines expected values for each of the pixels P1 to P8 on the basis of the target brightness defined by the L frame image signal SLx(2) input from the first delay portion 213, the currently selected brightness defined by the selection signal SRx(1d) from the second delay portion 215, and the preceding selected brightness defined by the selection signal SLx(1d) from the third delay portion 216.

The determination table 225 stores the second correction value data which is output in the second scanning period. The coordinate axis which corresponds to the input of the frame image signal (the R frame image signal SRx(2)) in the determination table 225 represents the target brightness defined by the frame image signal (the R frame image signal SRx(2)). The coordinate axis which corresponds to the input from the expected value table 224 in the determination table 225 represents the expected value for the brightness extracted from the expected value table 224 (that is, the brightness that the pixel is expected to achieve in the first scanning period). The second corrector 218 determines a second correction value for each of the pixels P1 to P8 on the basis of the target brightness and the expected value for the brightness and outputs the second correction signal CRx(2) which contains information of the second correction value to the second selector 219.

As shown in FIG. 12, in the second scanning period, the R frame image signal SRx(2) and the second correction signal CRx(2) generated by the second corrector 218 are input to the output portion 221.

The output portion 221 adds the target brightness defined by the R frame image signal SRx(2) to the second correction value defined by the second correction signal CRx(2) and determines the driving brightness used in the second scanning period. In the second scanning period in which the second scanning operation is performed, the output portion 221 outputs a second image signal IRx(2) which contains information of the calculated driving brightness to the liquid crystal driver 220. However, as has been described with reference to FIGS. 3 to 5B, the second image signal IRx(2) does not contain information on the driving brightnesses for the pixels on the gate lines L1, L3, . . . and contains only information on the driving brightnesses for the pixels on the gate lines L2, L4, . . . .

The liquid crystal driver 220 drives the liquid crystals of the liquid crystal panel 231 on the basis of the second image signal IRx(2). As a result of the liquid crystal driving on the basis of the second image signal IRx(2), the brightnesses of the pixels P2, P4, P6, and P8 shift toward the driving brightnesses.

(Changes in Brightness Data)

Figure 16:
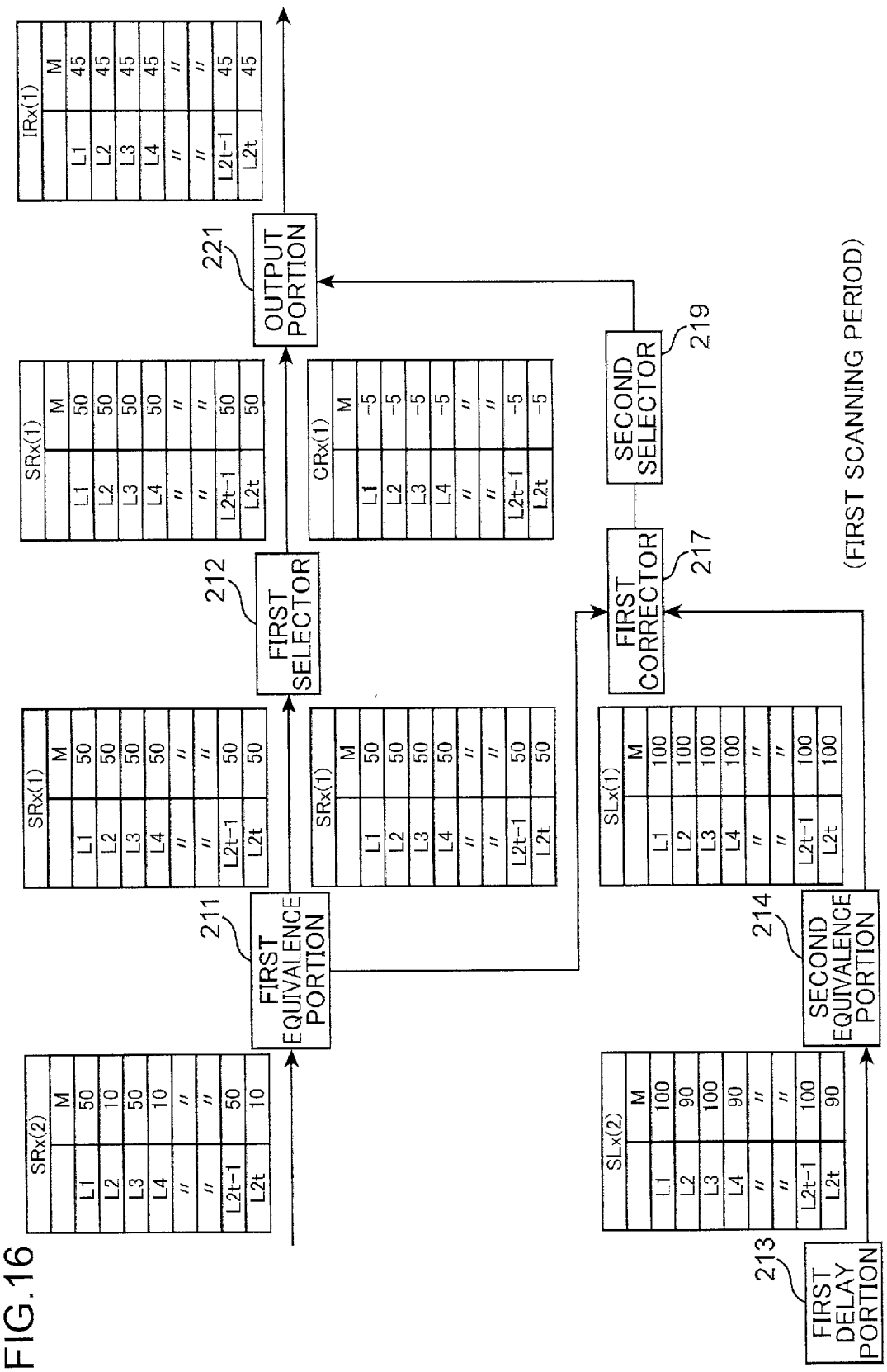
FIG. 16 shows data of the brightness contained in the signal which is output in the first scanning cycle.

FIG. 16 shows brightness data contained in the signals output in the first scanning period. Changes in the brightness data during the first scanning period will be described using FIGS. 8A, 8B, 13, and 16. The tables in FIG. 16 show the brightnesses of pixels arranged along the data line M. Note that, in the following description, the first equivalence portion 211 and the second equivalence portion 214 perform selection processing.

The Xth R frame image signal SRx(2) which is input to the first equivalence portion 211 indicates a brightness "50" for the pixels corresponding to the odd-numbered gate lines $L_1, L_3, \ldots, L_{2t-1}$. Further, the R frame image signal SRx(2) indicates a brightness "10" for the pixels corresponding to the even-numbered gate lines $L_2, L_4, \ldots, L_{2t}$.

The first equivalence portion 211 performs selection processing which has been described with reference to FIGS. 8A and 8B by taking the brightness of pixels corresponding to the odd-numbered gate lines $L_1, L_3, \ldots, L_{2t-1}$ as a reference, and generates a selection signal SRx(1). That is, in this embodiment, the first equivalence portion 211 selects the pixels corresponding to the odd-numbered gate lines $L_1, L_3, \ldots, L_{2t-1}$ as specific pixels. As a result, the selection signal SRx(1) indicates the brightness "50" for both those pixels corresponding to the odd-numbered gate lines $L_1, L_3, \ldots, L_{2t-1}$ and also those pixels corresponding to the even-numbered gate lines $L_2, L_4, \ldots, L_{2t}$. The selection signal SRx(1) is output to the first selector 212 and the first corrector 217. The first selector 212 outputs the selection signal SRx(1) to the output portion 221.

In the first scanning period of the right eye period for displaying the Xth R frame image, the first delay portion 213 outputs the L frame image signal SLx(2) which is acquired in the left eye period for displaying the previous Xth L frame image. The L frame image signal SLx(2) indicates a brightness "100" for the pixels corresponding to the odd-numbered gate lines $L_1, L_3, \ldots, L_{2t-1}$. Further, the L frame image signal SLx(2) indicates a brightness "90" for the pixels corresponding to the even-numbered gate lines $L_2, L_4, \ldots, L_{2t}$. The L frame image signal SLx(2) is input to the second equivalence portion 214.

The second equivalence portion 214 performs the selection processing which has been described with reference to FIGS. 8A and 8B by taking the brightness of the pixels corresponding to the odd-numbered gate lines $L_1, L_3, \ldots, L_{2t-1}$ as a reference, and generates the selection signal SLx(1). As a result, the selection signal SLx(1) outputs the brightness "100" to both those pixels corresponding to the odd-numbered gate lines $L_1, L_3, \ldots, L_{2t-1}$ and also those pixels corresponding to the even-numbered gate lines $L_2, L_4, \ldots, L_{2t}$. The selection signal SLx(1) is output to the first corrector 217.

As described with reference to FIG. 13, the first corrector 217 uses the first correction table 222 to generate the first correction signal CRx(1) on the basis of the selection signals SRx(1) and SLx(1). The first corrector 217 determines a first correction value for each pixel on the basis of the currently selected brightness indicated by the selection signal SRx(1)

and the preceding selected brightness indicated by the equivalence signal SLx(1). The selection signal SRx(1) shown in FIG. 16 indicates a currently selected brightness "50" for all the pixels along the data line M, and the selection signal SLx(1) indicates a preceding selected brightness "100" for all the pixels along the data line M, and therefore the first corrector 217 determines a first correction value of "−5" for all the pixels along the data line M and generates the first correction signal CRx(1). The first correction signal CRx(1) is then output to the output portion 221 via the second selector 219.

The output portion 221 adds the brightness indicated by the selection signal SRx(1) to the first correction value indicated by the first correction signal CRx(1) for each of the pixels. The selection signal SRx(1) shown in FIG. 16 indicates a brightness "50" for all the pixels along the data line M and the first correction signal CRx(1) indicates a first correction value of "−5" for all the pixels along the data line M, and therefore the first image signal IRx(1) which is output from the output portion 221 defines a driving brightness "45" to all the pixels along the data line M.

Figure 17:
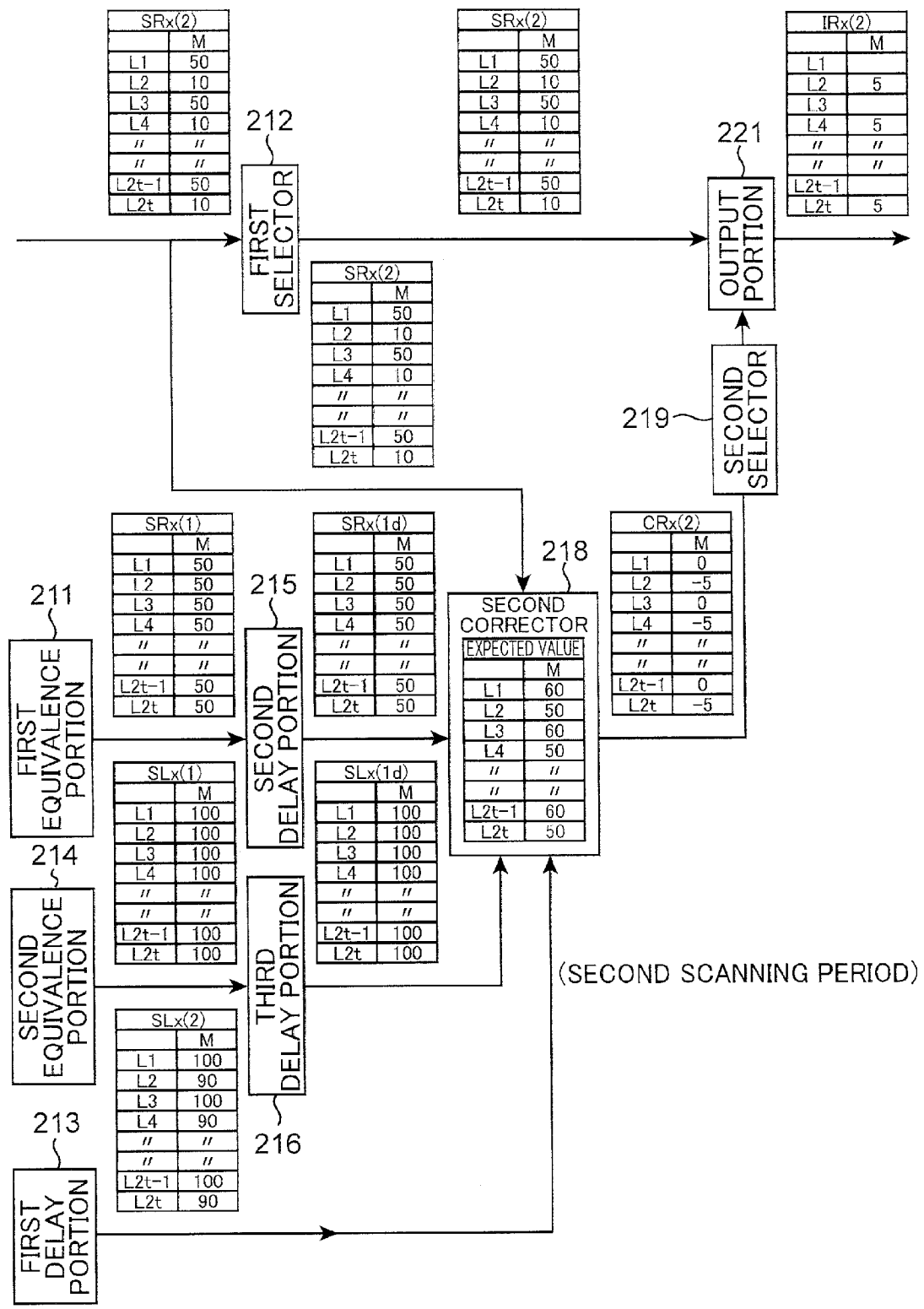
FIG. 17 shows data of the brightness contained in the signal which is output in the second scanning cycle.

FIG. 17 shows brightness data which is contained in the signals output in the second scanning period. Changes in brightness data during the second scanning period will be described using FIGS. 1 and 17. The tables in FIG. 17 show the brightnesses of pixels which are arranged along the data line M.

The Xth R frame image signal SRx(2) is input to the first selector 212 and the second corrector 218. The first selector 212 outputs the R frame image signal SRx(2) to the output portion 221 in the second scanning period.

In the first scanning period, the selection signal SRx(1) which is output by the first equivalence portion 211 is input to the second delay portion 215. The second delay portion 215 delays the selection signal SRx(1) and, in the second scanning period, outputs this signal as the selection signal SRx(1d). Note that the brightnesses defined by the selection signal SRx(1) for each of the pixels and the brightnesses defined by the selection signal SRx(1d) for each of the pixels are equal.

In the first scanning period, the selection signal SLx(1) which is output by the second equivalence portion 214 is input to the third delay portion 216. The third delay portion 216 delays the selection signal SLx(1) and, in the second scanning period, outputs this signal as the selection signal SLx(1d). Note that the brightnesses defined by the selection signal SLx(1) for each of the pixels and the brightnesses defined by the selection signal SLx(1d) for each of the pixels are equal.

The second delay portion 215 outputs the selection signal SRx(1d) to the second corrector 218. The selection signal SRx(1d) indicates the brightness "50" for the pixels corresponding to the odd-numbered gate lines $L_1, L_3, \ldots, L_{2t-1}$ and the pixels corresponding to the even-numbered gate lines $L_2, L_4, \ldots, L_{2t}$ respectively.

The third delay portion 216 outputs the selection signal SLx(1d) to the second corrector 218. The selection signal SLx(1d) indicates the brightness "100" to the pixels corresponding to the odd-numbered gate lines $L_1, L_3, \ldots, L_{2t-1}$ and the pixels corresponding to the even-numbered gate lines $L_2, L_4, \ldots, L_{2t}$.

As described above, in the second scanning period, the first delay portion 213 outputs the Xth L frame image signal SLx(2) to the second corrector 218. The L frame image signal SLx(2) defines a brightness "100" for the pixels on the odd-numbered gate lines $L_1, L_3, \ldots, L_{2t-1}$ (where t is a natural number), and defines a brightness "90" for the pixels on the even-numbered gate lines $L_2, L_4, \ldots, L_{2t}$ (where t is a natural number).

As has been described with reference to FIG. 14, the second corrector 218 determines expected values on the basis of the selected brightness defined by the first equivalence portion 211 and the second equivalence portion 214 and the target brightness defined by the preceding frame image signal. The brightnesses which the L frame image signal SLx(2) defines for the pixels on the even-numbered gate lines $L_2, L_4, \ldots, L_{2t}$ (t is a natural number) are less than the brightnesses defined for the pixels on the odd-numbered gate lines $L_1, L_3, \ldots, L_{2t-1}$ (t is natural number), and hence the brightnesses achieved, at the start of the second scanning operation, by the pixels on the even-numbered gate lines $L_2, L_4, \ldots, L_{2t}$ (t is a natural number) can be expected to be lower than the brightness achieved, at the start of the second scanning operation, by the pixels on the odd-numbered gate lines $L_1, L_3, \ldots, L_{2t-1}$ (t is a natural number). Therefore, the second corrector 218 determines smaller expected values for the pixels on the even-numbered gate lines $L_2, L_4, \ldots, L_{2t}$ (t is a natural number) than the expected values determined for the pixels on the odd-numbered gate lines $L_1, L_3, \ldots, L_{2t-1}$ (t is a natural number).

As described earlier, the R frame image signal SRx(2) defines a brightness "10" for the pixels on the even-numbered gate lines $L_2, L_4, \ldots, L_{2t}$ (t is a natural number). Further, the second corrector 218 configures an expected value "50" for the pixels on the even-numbered gate lines $L_2, L_4, \ldots, L_{2t}$ (t is a natural number). Therefore, the second corrector 218 compares the brightness "10" with the expected value "50" and determines a second correction value of "−5" for the pixels on the even-numbered gate lines $L_2, L_4, \ldots, L_{2t}$ (t is a natural number).

As described earlier, the second corrector 218 outputs the second correction signal CRx(2) containing information on the second correction value to the output portion 221 via the second selector 219. The output portion 221 adds the brightness indicated by the R frame image signal SRx(2) to the second correction value indicated by the second correction signal CRx(2) for each of the pixels, and generates and outputs the second image signal IRx(2). The generated second image signal IRx(2) does not define a driving brightness for the pixels on the odd-numbered gate lines $L_1, L_3, \ldots, L_{2t-1}$ (t is a natural number). Further, the second image signal IRx(2) defines a driving brightness "5" for the pixels on the even-numbered gate lines $L_2, L_4, \ldots, L_{2t}$ (t is a natural number).

Figure 18:
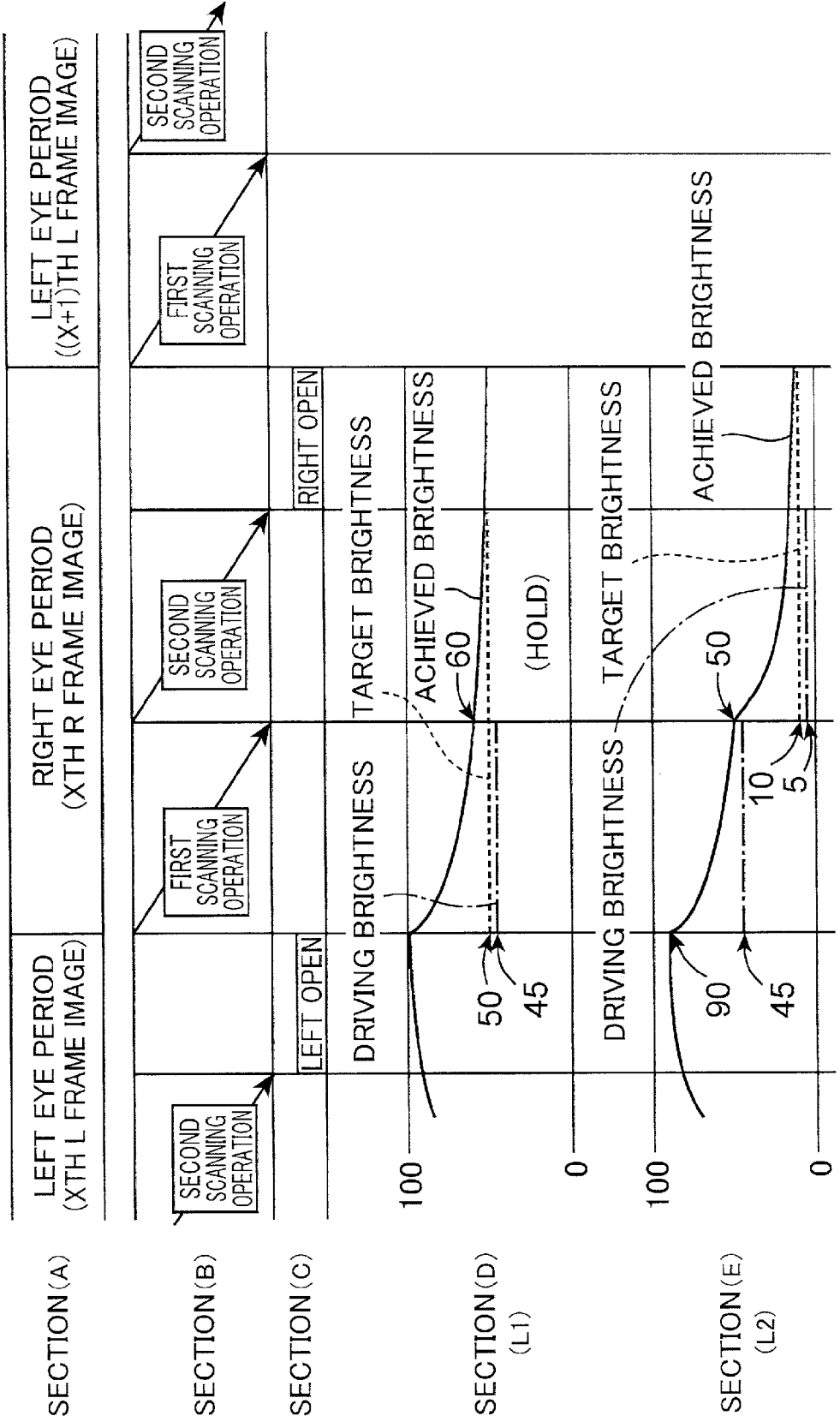
FIG. 18 is a schematic timing chart showing variations in pixel brightness based on signal processing which will be described with reference to FIGS. 16 and 17.

FIG. 18 is a schematic timing chart showing variations in pixel brightness on the basis of the signal processing described with reference to FIGS. 16 and 17. These pixel brightness variations will be described using FIGS. 1, 5A, 5B, 8A, 8B, 9A, 9B, and 16 to 18.

Section (A) in FIG. 18 shows a left eye period for displaying the Xth L frame image, a right eye period for displaying the Xth R frame image, and a left eye period for displaying the (X+1)th L frame image. In the following description, variations in pixel brightness in the right eye period will be described.

Section (B) in FIG. 18 shows a first scanning operation and a second scanning operation. In the first scanning period in the right eye period, the liquid crystal driver 220 uses the first image signal IRx(1) to execute the first scanning operation. As described with reference to FIGS. 5A and 5B, the liquid crystal driver 220 simultaneously drives, as one set, the liquid crystals of a pixel corresponding to one odd-numbered gate line and a pixel which corresponds to one even-numbered gate line. As a result, the first image signal IRx(1) is sequentially written to a set of gate lines ($L_1$, $L_2$), a set of gate lines ($L_3$, $L_4$), . . . , and a set of gate lines ($L_{2t-1}$, $L_{2t}$). In the second scanning period of the right eye period, the liquid crystal driver 220 uses the second image signal IRx(2) to execute the second scanning operation. As described with reference to FIGS. 5A and 5B, the liquid crystal driver 220 writes brightness data of the second image signal IRx(2) sequentially to the pixels corresponding to the gate lines $L_2$, $L_4$, . . . , $L_{2t}$. As described with reference to FIGS. 5A and 5B, the first scanning period and second scanning period are the same length.

Section (C) in FIG. 18 shows the opening and closing operations of the optical shutter portion 310. The left eye shutter 311 is open in the period after the second scanning operation is complete and up until before the right eye period starts. Further, the right eye shutter 312 is open in the period after the second scanning operation is complete and up until before the left eye period starts.

Section (D) of FIG. 18 shows the variations in brightness of pixels disposed at the intersections between the gate line $L_1$ and data line M. Section (E) of FIG. 18 shows variations in brightness of pixels disposed at the intersections between the gate line $L_2$ and data line M.

As described with reference to FIGS. 16 and 17, the L frame image signal SLx(2) which is used in the display of the L frame image in the previous left eye period defines a target brightness "100" for the pixels corresponding to the odd-numbered gate lines $L_1$, $L_3$, . . . , $L_{2t-1}$. Therefore, the brightness of the pixel shown in section (D) starts to shift from "100". The L frame image signal SLx(2) defines a brightness "90" for the pixels corresponding to the even-numbered gate lines $L_2$, $L_4$, . . . , $L_{2t}$. Hence, the brightness of the pixel shown in section (E) starts to shift from "90".

As described with reference to FIG. 16, the first image signal IRx(1) configures a driving brightness "45" for all the pixels along the data line M. Therefore, when the first scanning operation is performed, the brightness of the pixels along the data line M starts to shift toward the driving brightness "45".

As a result of the first scanning operation, immediately before the second scanning operation is started, the brightness of the pixels corresponding to the odd-numbered gate lines $L_1$, $L_3$, . . . , $L_{2t-1}$ reaches the expected value for the brightness of "60" determined using the determination table 225 of the second corrector 218, or approaches the expected value for the brightness "60". Similarly, as a result of the first scanning operation, immediately before the second scanning operation is started, the brightness of the pixels corresponding to the even-numbered gate lines $L_2$, $L_4$, . . . , $L_{2t}$ reaches the expected value for the brightness "50" determined using the determination table 225 of the second corrector 218, or approaches the expected value for the brightness "50".

As described with reference to FIGS. 3 to 5B, the second image signal IRx(2) does not configure the driving brightness for the pixels corresponding to the odd-numbered gate lines $L_1$, $L_3$, . . . , $L_{2t-1}$. Therefore, when the second scanning operation is performed, for the pixels corresponding to the odd-numbered gate lines $L_1$, $L_3$, . . . , $L_{2t-1}$, the brightness variation in the first scanning operation continues, approaches the target brightness "50" while the second scanning operation is being executed, and reaches the target brightness when the right eye shutter 312 is open.

The second image signal IRx(2) defines the driving brightness "5" for the pixels corresponding to the even-numbered gate lines $L_2$, $L_4$, . . . , $L_{2t}$. Therefore, when the second scanning operation is performed, the pixels corresponding to the even-numbered gate lines $L_2$, $L_4$, . . . , $L_{2t}$ start to shift toward the driving brightness "5". The driving brightness "5" is less than the target brightness "10" defined by the R frame image signal SRx(2) and hence the liquid crystals of the pixels corresponding to the even-numbered gate lines $L_2$, $L_4$, . . . , $L_{2t}$ are driven with a relatively large driving force. Therefore, when the right eye shutter 312 is open, the brightness is sufficiently close to the target brightness "10" defined by the R frame image signal SRx(2).

As indicated in section (E) of FIG. 18, the pixels corresponding to the gate line $L_2$ almost reach the target brightness "10" when the right eye shutter 312 is open.

Thus, in the scanning operation shown in FIG. 18, because overdrive processing is performed by configuring the brightness to a driving brightness which differs from the target brightness, pixel brightness can be made to approach the target brightness sooner than in the basic scanning operation shown in FIG. 6. Therefore, crosstalk of the display surface of the liquid crystal panel 231 can be further reduced, and hence the scanning operation shown in FIG. 18 is more preferable than the basic scanning operation shown in FIG. 6.

Note that further crosstalk improvement can also be achieved by means of open-close control of the optical shutter portion 310 of the glasses device 300 and/or by means of lighting control of the backlight 232. For example, the amount of crosstalk is reduced as a result of delaying the timing for opening the left eye shutter 311 of the glasses device 300 and the timing for opening the right eye shutter 312. The delaying of the timing for opening the left eye shutter 311 and of the timing for opening the right eye shutter 312 consequently shortens the left eye shutter 311 and the right eye shutter 312, and also reduces the amount of light seen by the viewer. Increasing the light amount of the backlight 232 thus compensates for the reduced amount of light seen by the viewer due to the shortening of the left eye shutter 311 and right eye shutter 312. Thus a further reduction in crosstalk is suitably achieved.

(Effect of the First Embodiment)

Figure 20A:
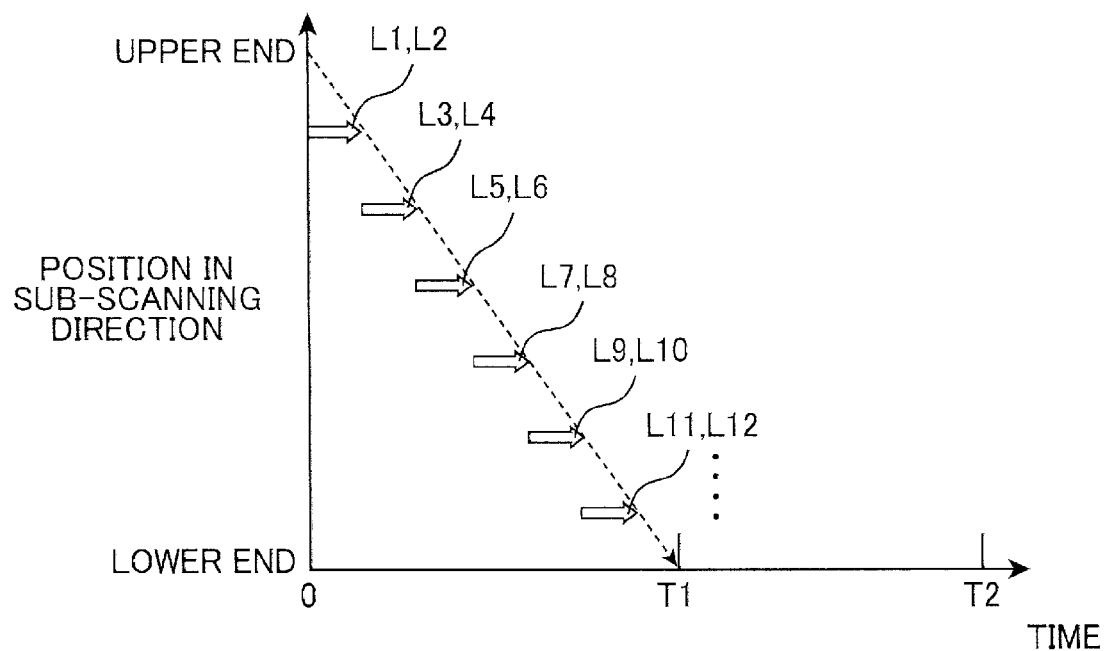
FIGS. 20A and 20B are schematic graphs showing scanning operations which are executed in the comparative example shown in FIG. 19.
Figure 20B:
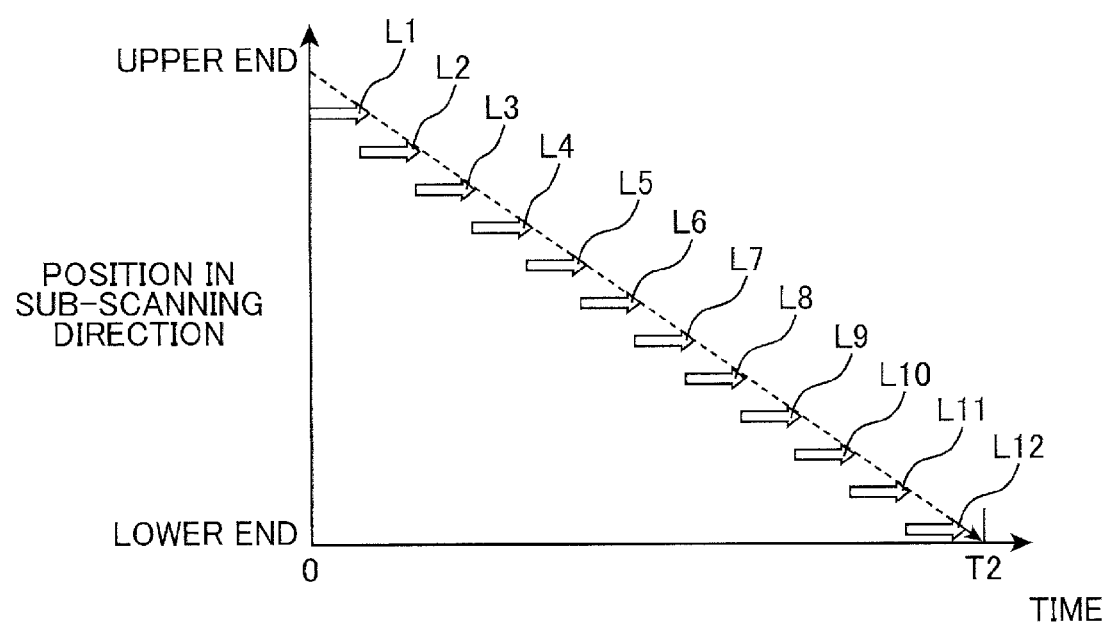

FIG. 19 is a drawing which schematically shows, in table format, the target brightnesses configured in the first and second scanning operations for the target brightnesses defined in the frame image signals which are input, in a comparative example. As in FIG. 4, FIG. 19 shows the target brightnesses of the gate lines L1 to L12. FIGS. 20A and 20B are schematic graphs showing scanning operations which are executed in the comparative example shown in FIG. 19. FIG. 20A shows a first scanning operation in the comparative example shown in FIG. 19. FIG. 20B shows a second scanning operation in the comparative example shown in FIG. 19. FIGS. 20A and 20B show scanning operations for the gate lines L1 to L12 as per FIGS. 5A and 5B. The horizontal axes in FIGS. 20A and 20B represent the time axis on which the scanning operation is performed on gate lines L1 to L12. The vertical axes in FIGS. 20A and 20B show the position in the sub-scanning direction of the liquid crystal panel. The effects of the first embodiment in comparison with the comparative example will be described using FIGS. 4, 5A, 5B, 19, 20A, and 20B.

In the comparative example shown in FIG. 19, the target brightness defined by the frame image signal is the same as that of the first embodiment shown in FIG. 4. That is, as shown in FIG. 19, the respective target brightnesses I1 to I12 are defined by the frame image signal for the pixels on the data line M of gate lines L1 to L12. Further, in the comparative example shown in FIG. 19, the first scanning operation is the same as that in the first embodiment shown in FIG. 4. That is, as shown in FIG. 19, in the first scanning operation, the target brightnesses of the pixels on the gate lines $L_{2t-1}$ and $L_{2t}$ are configured equal (t is a natural number). Therefore, even in the comparative example shown in FIG. 19, simultaneous signal writing is performed on the gate lines $L_{2t-1}$ and $L_{2t}$ by the liquid crystal driver. As a result, the liquid crystals corresponding to the pixels on the gate lines $L_{2t-1}$ and $L_{2t}$ are simultaneously driven.

Therefore, as can be seen when comparing FIGS. 5A and 20A, in the first scanning operation, in both the first embodiment and also the comparative example, since simultaneous signal writing is performed to the set of two gate lines $L_{2t-1}$ and $L_{2t}$ by the liquid crystal driver, the period T1 of the first scanning operation until the writing of gate lines L1 to L12 is completed remains the same.

Meanwhile, in the second scanning operation, the comparative example shown in FIG. 19 differs from that of the first embodiment shown in FIG. 4. That is, in the comparative example shown in FIG. 19, in the second scanning operation, the pixels on all the gate lines L1, L2, . . . are driven on the basis of the frame image signals (the L frame image signals and R frame image signals). Therefore, writing is performed sequentially to the gate lines L1, L2, . . . . Hence, in the comparative example, as can be seen from FIG. 20B, period T2 of the second scanning operation is longer than period T1 of the first scanning operation.

As shown in FIGS. 4 and 19, in both the first embodiment and also the comparative example, the images displayed on the liquid crystal panel after the second scanning operation correspond to the target brightnesses I1, I2, . . . which are defined by the frame image signals. However, the period of the second scanning operation differs greatly between the first embodiment and the comparative example. That is, as described with reference to FIG. 5B, in the first embodiment, the period of the second scanning operation is T1 which is the same as the period of the first scanning operation, whereas in the comparative example the number of pixels being driven is two times the number driven in the first embodiment, and hence the period T2 of the second scanning operation is two times the period T1 of the first scanning operation. Therefore, according to the first embodiment, the second scanning operation ends sooner than the comparative example shown in FIG. 19, and hence the crosstalk in the lower area of the display surface of the liquid crystal panel 231 can be reduced in comparison with the comparative example.

(Further Remarks)

Note that, in the first embodiment, in the second image signal IRx(2) which is output from the output portion 221, the output portion 221 is designed not to configure the driving brightness for the pixels corresponding to the odd-numbered gate lines $L_1, L_3, \ldots, L_{2t-1}$. Further, upstream of the output portion 221, for example in the second corrector 218, the expected values for the brightness are determined by using the determination table 225 for the pixels corresponding to the odd-numbered gate lines $L_1, L_3, \ldots, L_{2t-1}$ held in the second scanning operation. Alternatively, for example for the pixels held in the second scanning operation, the determination of the expected values for the brightness may be omitted. This also applies to the following embodiments. That is, for those pixels which are held in the scanning operation which is performed next, the determination of the expected values for the brightness achieved in the previously performed scanning operation may be omitted.

Second Embodiment

According to the first embodiment hereinabove, the liquid crystal driver 220 executes one second scanning operation but is not limited to one scanning operation, rather, the liquid crystal driver 220 may execute N (where N is an integer of two or more) second scanning operations. In the second embodiment described hereinbelow, the liquid crystal driver 220 executes two (N=2) second scanning operations. In a case where the liquid crystal driver 220 executes N second scanning operations, the video signal processor 210 may generate N second scanning operations. Here, the liquid crystal driver 220 may execute N second scanning operations, for scanning N second image signals respectively across the display surface of the liquid crystal panel 231, sequentially from the first second image signal to the Nth second image signal. In addition, in a Jth (where J is an integer of not less than two and not more than N) second scanning operation, the liquid crystal driver 220 may be designed to write brightness data to driving pixels which are a part of the pixels for which brightness data of the second image signal has not been written in a (J−1)th second scanning operation, and not to write brightness data to pixels other than the driving pixels.

Note that, in the second embodiment and subsequent embodiments, either the basic scanning operation shown in FIG. 6, for example, or the scanning operation which uses the overdrive processing shown in FIG. 18, for example, may be executed. However, since, as described in the first embodiment above, crosstalk at the display surface of the liquid crystal panel 231 can be reduced further, the scanning operation shown in FIG. 18 is preferable to the basic scanning operation shown in FIG. 6.

Figure 22A:
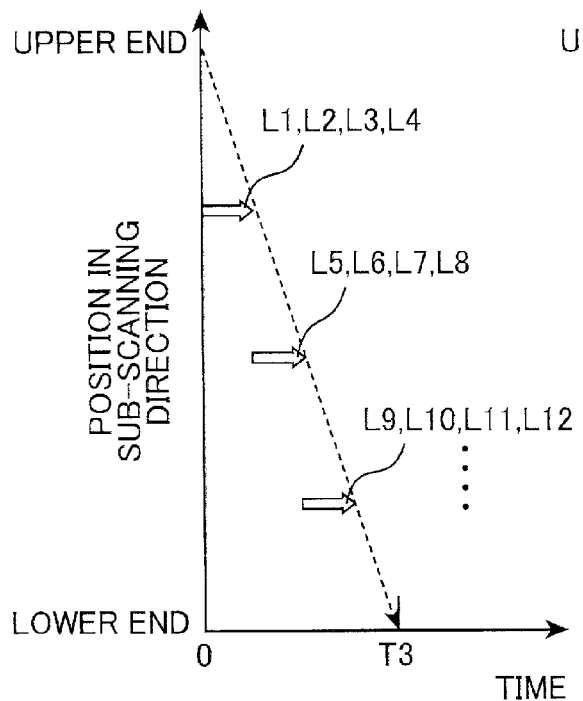
FIGS. 22A, 22B and 22C are schematic graphs which show scanning operations performed by the liquid crystal driver according to the second embodiment.
Figure 22B:
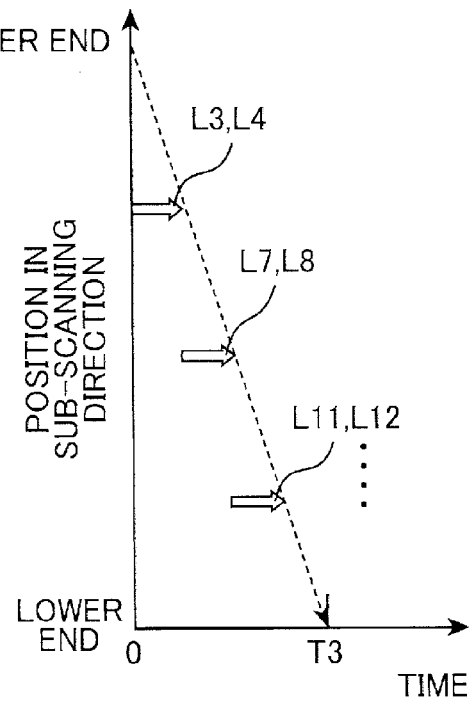
Figure 22C:
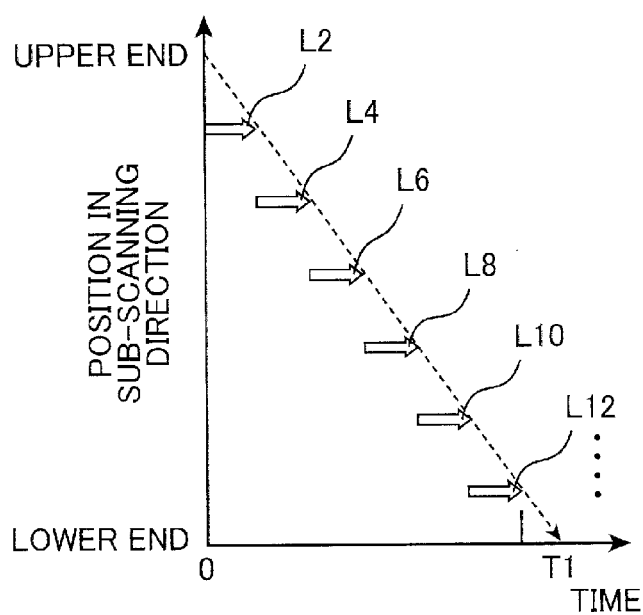

FIG. 21 is a diagram which schematically shows, in table format, target brightnesses which are configured in a first scanning operation and in two second scanning operations, for target brightnesses which are defined by frame image signals that are input, according to a second embodiment. FIGS. 22A, 22B and 22C are schematic graphs showing scanning operations which are performed by the liquid crystal driver 220. FIG. 22A shows a first scanning operation based on the first image signal. FIG. 22B shows a first second scanning operation based on a second image signal. FIG. 22C shows a second second scanning operation based on a different second image signal. FIGS. 22A to 22C show scanning operations of gate lines L1 to L12. The horizontal axis in FIGS. 22A to 22C is a time axis on which the scanning operation of gate lines L1 to L12 is performed. The vertical axis in FIGS. 22A to 22C represents the position, in the sub-scanning direction, of the liquid crystal panel 231. The same reference numerals have been assigned to the same elements as the first embodiment. The descriptions of the first embodiment are suitably called upon for those elements for which no description is provided hereinbelow. The first scanning operation and second scanning operation according to the second embodiment are described by using FIGS. 1, 8B, 21, and 22A to 22C.

As shown in FIG. 21, as per the first embodiment, the target brightnesses I1 to I12 respectively are defined by the frame image signals for the pixels on the data line M of the gate lines L1 to L12. In the first scanning operation, unlike the first embodiment, pixel groups containing four pixels arranged adjacently in the sub-scanning direction are configured. That is, as shown in FIG. 8B, for example, a pixel group G5 which comprises pixels P1, P2, P3, and P4 corresponding to the gate lines L1, L2, L3, and L4 is configured.

In the first scanning operation, the video signal processor 210 generates, for each pixel group, a first image signal so that the selected brightness selected by the selection processing described with reference to FIG. 8A is configured as a target brightness common to the pixels contained in the pixel group. The liquid crystal driver 220 executes a first scanning operation on the basis of the first image signal generated by the video signal processor 210 and drives all the pixels contained in the pixel group (that is, all the pixels on the data line M). That is, the pixels corresponding to the gate lines L1, L2, L3, and L4, for example (the pixels contained in the pixel group G5 in FIG. 8B, for example) are each driven on the basis of the selected brightness I1 which is selected from among the target brightnesses I1, I2, I3, and I4. In other words, the selected brightness I1 is the target brightness defined by the frame image signal for the selected pixel corresponding to the gate line L1 among the four pixels contained in the set of pixels corresponding to the gate lines L1, L2, L3, and L4 (the pixel group G5 in FIG. 8B, for example). Similarly, the pixels which correspond to the gate lines L9, L10, L11, and L12, for example, are each driven on the basis of the selected brightness I9 that is selected from among the target brightnesses I9, I10, I11, and I12. In other words, the selected brightness I9 is the target brightness defined by the frame image signal for the selected pixel corresponding to the gate line L9 among the four pixels contained in the set of pixels corresponding to the gate lines L9, L10, L11, and L12.

Subsequently, in the first second scanning operation, the pixel groups which comprise four pixels are further divided, whereby subgroups comprising two pixels are configured. That is, as shown in FIG. 8B, for example, the pixel group G5 is further divided, whereby a subgroup G51 which comprises pixels P1 and P2 corresponding to the gate lines L1 and L2 and a subgroup G52 which comprises pixels P3 and P4 corresponding to the gate lines L3 and L4 are configured.

In the first second scanning operation, the video signal processor 210 generates a first second image signal such that the pixel of the subgroup containing only the pixel not selected in the first scanning operation is driven and such that the pixel of the subgroup containing the pixel selected in the first scanning operation is not driven and kept as is. The liquid crystal driver 220 executes a first second scanning operation on the basis of a first second image signal generated by the video signal processor 210 and drives pixels contained in some of the subgroups (that is, some of the pixels on data line M).

That is, the pixels corresponding to the gate line L1 among the pixels corresponding to the gate lines L1, L2, L3 and L4, for example, are driven in the first scanning operation on the basis of the selected brightness I1 which matches the target brightness I1 of the frame image signal. Therefore, in the first second scanning operation, the video signal processor 210 generates a first second image signal so that the set of pixels corresponding to the gate lines L1 and L2 comprising the pixel (selected pixel) corresponding to gate line L1 are not driven, and these pixels are kept in a state where the first scanning operation is executed. Meanwhile, the pixels which correspond to the gate lines L3 and L4 are not selected in the first scanning operation and are each driven on the basis of the selected brightness I1 which differs from the target brightnesses I3 and I4. Therefore, in the first second scanning operation, the video signal processor 210 generates a first second image signal so that the pixels which correspond to the gate lines L3 and L4 are each driven on the basis of the selected brightness I3 selected from among the target brightnesses I3 and I4.

Subsequently, in a second second scanning operation, the subgroups comprising two pixels are further divided, whereby subgroups comprising one pixel are configured.

The video signal processor 210 generates a second second image signal such that the pixels of subgroups which contain only those pixels not selected in the first scanning operation and in the first second scanning operation are driven and such that the pixels of the subgroups containing the pixels selected in the first scanning operation or the first second scanning operation are not driven and kept as is. In a second second scanning operation, the subgroups comprise only one pixel as per the second scanning operation of the above first embodiment. That is, the second second image signal is generated in the same way as the second image signal according to the first embodiment and the second second scanning operation is executed in the same way as the second scanning operation according to the first embodiment.

For example, the pixel corresponding to the gate line L1 is selected in the first scanning operation and is driven on the basis of the selected brightness I1 which matches the target brightness I1 of the frame image signal, and therefore a second second image signal is generated so that the pixel is not driven, and remains as is in succession to the first second scanning operation. However, the pixel which corresponds to the gate line L2 is not selected in the first scanning operation and is driven on the basis of the selected brightness I1 which does not match the target brightness I2 of the frame image signal, and is held without being driven in the first second scanning operation, and is therefore not selected at all. That is, the pixel is not driven on the basis of the target brightness I2 of the frame image signal. Therefore, a second second image signal is generated such that the pixel which corresponds to the gate line L2 is driven on the basis of the target brightness I2 of the frame image signal. According to this embodiment, some of the subgroups which are driven are examples of driven subgroups.

As described earlier, the first image signal equalizes the brightnesses of the pixels arranged adjacently in the sub-scanning direction. According to this embodiment, the brightnesses of the pixels on the gate lines $L_{4t-3}$, $L_{4t-2}$, $L_{4t-1}$, and $L_{4t}$ are configured equal (t is a natural number). Therefore, the liquid crystal driver 220 is able to simultaneously write the first image signal to the gate lines $L_{4t-3}$, $L_{4t-2}$, $L_{4t-1}$, and $L_{4t}$. As a result, the liquid crystals which correspond to the pixels on the gate lines $L_{4t-3}$, $L_{4t-2}$, $L_{4t-1}$, and $L_{4t}$ are driven simultaneously.

As described earlier, the first second image signal is generated such that the pixels on the gate lines $L_{4t-3}$ and $L_{4t-2}$ are held without being driven and the pixels on the gate lines $L_{4t-1}$ and $L_{4t}$ are driven with equal brightness. Therefore, the liquid crystal driver 220 is able to simultaneously write a first second image signal to the pixels on the gate lines $L_{4t-1}$ and $L_{4t}$.

As described earlier, the second second image signal is generated such that the pixel on gate line $L_{2t-1}$ is held without being driven and the pixel on gate line $L_{2t}$ is driven. Therefore, the liquid crystal driver 220 sequentially writes the second second image signal in order on the gate lines L2, L4, . . . .

As shown in FIG. 22, according to this embodiment, the liquid crystal driver 220 which performs the first scanning operation performs simultaneous signal writing to the set of four gate lines $L_{4t-3}$, $L_{4t-2}$, $L_{4t-1}$, and $L_{4t}$ by means of the first image signal. Therefore, the period T3 of the first scanning operation is ¼ of the period in the case where the signals are written sequentially to all the gate lines $L_1$, $L_2$, . . . (that is, the period T2 of the second scanning operation in the comparative example shown in FIG. 19). That is, the period T3 is half the period T1 of the first scanning operation according to the first embodiment.

The liquid crystal driver 220 which performs the first second scanning operation performs simultaneous signal writing to the set of two gate lines $L_{4t-1}$ and $L_{4t}$ by means of the first second image signal and does not drive the set of two gate lines $L_{4t-3}$ and $L_{4t-2}$. Hence, the period of the first second scanning operation is T3, which is the same as the period of the first scanning operation.

However, the liquid crystal driver 220 which performs the second second scanning operation sequentially writes a second second image signal in order starting with gate line $L_2$, $L_4$, . . . . Therefore, the period T1 of the second second scanning operation is ½ the period in a case where signals are sequentially written to all the gate lines $L_1$, $L_2$, . . . (that is, the period T2 of the second scanning operation in the comparative example shown in FIG. 19). That is, this period is the same as the period T1 of the first and second scanning operations of the first embodiment. Since the driving of the liquid crystals of the liquid crystal panel 231 is executed in a short period across the whole display surface by the first scanning operation and the two second scanning operations which are executed in a relatively short time, crosstalk in the lower area of the display surface is reduced.

(Second Corrector)

In the above first embodiment, as described earlier, the first and second scanning periods have the same length. However, according to the second embodiment, as described with reference to FIG. 22, this period is T3 which is the same as the first scanning period and the first second scanning period, but the second second scanning period T1 is T1>T3 and longer than the first second scanning period. For this reason, in the second corrector 218, adjustment of the pixel position is required as described subsequently in order to determine the expected value for the brightness that the pixel can achieve.

Further, as described with reference to FIG. 21, with the second embodiment, when pixels are driven in the second second scanning operation, there is a difference in whether these pixels are held in the first second scanning operation after being driven in the first scanning operation in which all pixels are driven. In other words, the pixels which correspond to the gate line L2, for example, are driven on the basis of a selected brightness I1 which does not match the target brightness I2 of the frame image signal in the first scanning operation and subsequently are held without being driven in the first second scanning operation and are driven on the basis of the target brightness I2 in the second second scanning operation. Meanwhile, the pixels which correspond to the gate line L4 are driven on the basis of a selected brightness I3 which does not match the target brightness I4 of the frame image signal in the first second scanning operation and are subsequently driven on the basis of the target brightness I4 in the subsequent second second scanning operation. For this reason, in the second corrector 218, adjustment of the hold period is also required as described subsequently in order to determine the expected value for the brightness that the pixel can achieve.

Figure 23:
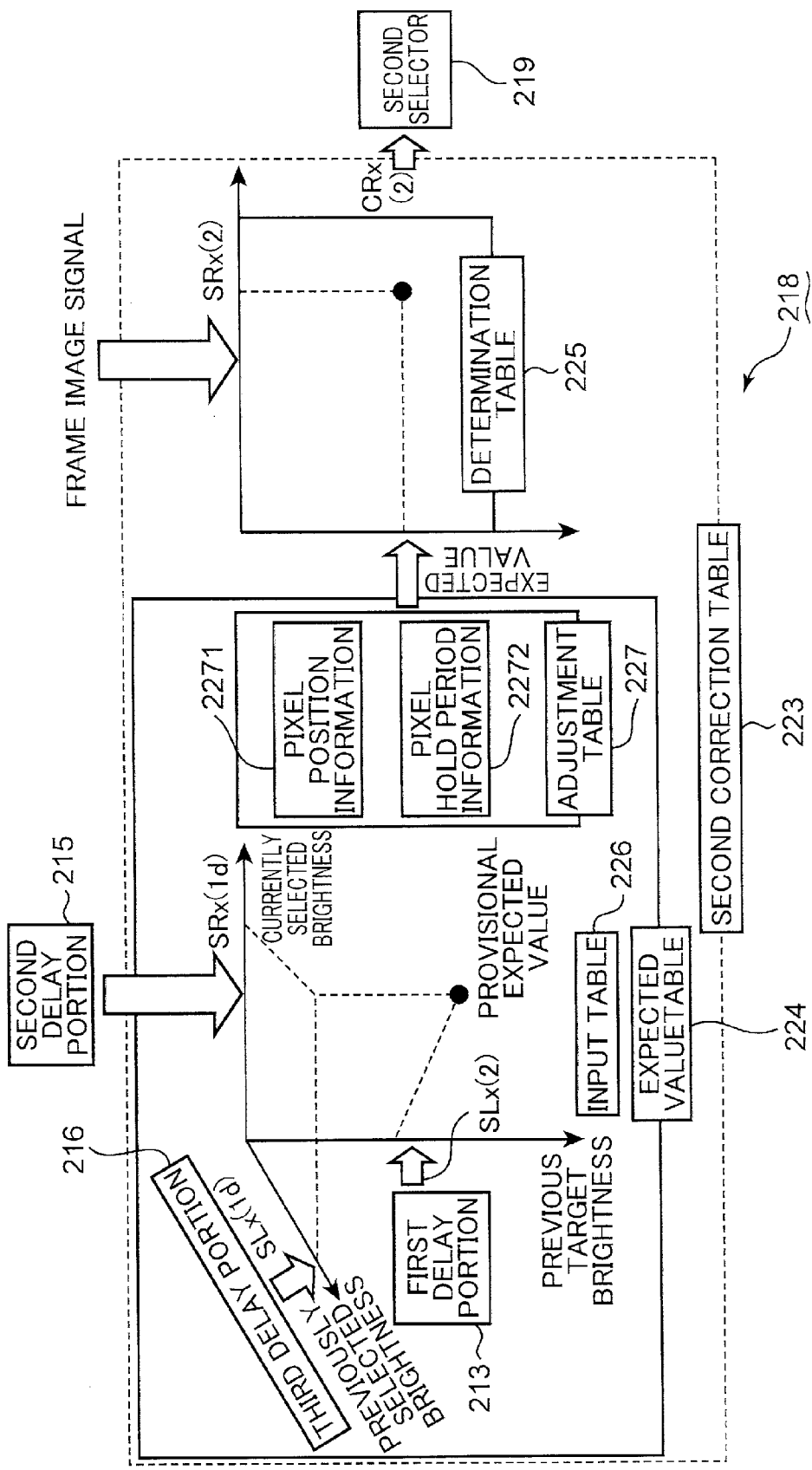
FIG. 23 is a conceptual drawing of a second correction table which is stored in a second corrector according to the second embodiment.

FIG. 23 is a conceptual diagram of a second correction table which is stored in the second corrector 218, according to the second embodiment. The second corrector 218 will be described using FIGS. 1 and 23 with an emphasis on the differences from the first embodiment.

The expected value table 224 of the second corrector 218 according to the second embodiment comprises, in addition to the input table 226, an adjustment table 227 for adjusting the output value from the input table 226 on the basis of the hold period and the position, in the sub-scanning direction, of the pixel for which the driving brightness is to be determined.

According to the second embodiment, the second corrector 218 takes the expected value retrieved from the input table 226 as a provisional expected value. The second corrector 218 determines the expected value by adjusting the provisional expected value retrieved from the input table 226 by means of the adjustment table 227.

FIG. 24A is a schematic diagram which illustrates the difference in the scanning operation due to pixel position and FIG. 24B is a schematic diagram which schematically illustrates the difference in the scanning operation due to the hold period. The difference in the scanning operation due to the pixel position and hold period will be described by using FIGS. 1, 12, 14, 17, 22A to 22C, 24A and 24B.

As described with reference to FIGS. 22A to 22C, with the second embodiment, the first scanning operation and the first second scanning operation are performed in a shorter period than the second second scanning operation. In the period after the first second scanning operation until the second second scanning operation is started, the liquid crystals are driven toward the driving brightness described with reference to FIGS. 12, 14, and 17.

FIG. 24A shows periods SP1 and SP2 in which the liquid crystals are driven toward the driving brightnesses. The period SP1 indicates the period in which the upper liquid crystals of the liquid crystal panel 231 which are driven relatively early are driven toward the driving brightness. The period SP2 shows a period in which the lower liquid crystals of the liquid crystal panel 231 which are driven relatively late are driven toward the driving brightness. As shown in FIG. 24A, the period SP2 is longer than the period SP1.

FIG. 24B shows periods SP11 and SP12 in which liquid crystals are driven toward the driving brightness. As described with reference to FIG. 21, the pixel which corresponds to the gate line L2 is driven in the first scanning period and subsequently held without being driven in the first second scanning operation and driven in the second second scanning operation. That is, the period SP11 represents the period in which the pixels are driven by the first scanning operation and includes a hold period (second scanning period). Meanwhile, as described with reference to FIG. 21, the pixels corresponding to the gate line L4 are driven in the first scanning operation and subsequently also driven in the first second scanning operation and in the second second scanning operation. In other words, the period SP12 represents a period in which the pixels are driven by the first second scanning operation and does not include a hold period. As shown in FIG. 24B, the period SP11 is longer than the period SP12. Note that, as can be seen from the description pertaining to FIG. 24A, the effect of the difference in pixel position is small since, although the period SP12 is longer than the period SP11, the gate lines L2 and L4 are close to each other.

FIG. 25 is a graph which schematically shows the effect of pixel position on pixel brightness variation. The input table 226 will be described further using FIGS. 1, 9A, 9B, 12, 14, 17, and 23 to 25.

In FIG. 25, the horizontal line HL which extends in a horizontal direction represents the driving brightness. The curved line CV in FIG. 25 represents the pixel brightness which shifts toward the driving brightness described with reference to FIGS. 12, 14, and 17. As described earlier, the upper liquid crystals of the liquid crystal panel 231 are driven toward the driving brightness during the period SP1. As a result, the upper pixels of the liquid crystal panel 231 achieve a brightness "AB1". Meanwhile, the lower liquid crystals of the liquid crystal panel 231 are driven toward the driving brightness during the period SP2. As a result, the lower pixels of the liquid crystal panel 231 achieve a brightness "AB2". The lower pixels of the liquid crystal panel 231 have values which are closer to the driving brightness than the upper pixels of the liquid crystal panel 231. The difference between the periods SP11 and SP12 due to the hold period can be considered in the same way as the periods SP1 and SP2 described with reference to FIG. 25.

As shown in FIG. 23, the expected value table 224 comprises an adjustment table 227. The adjustment table 227 comprises pixel position information 2271 and pixel hold period information 2272. The pixel position information 2271 contains information representing the position in the sub-scanning direction of a pixel for which the driving brightness is to be determined. The pixel hold period information 2272 contains information representing the hold period for a pixel for which the driving brightness is to be determined. The second corrector 218 uses the pixel position information 2271 and the pixel hold period information 2272 in the adjustment table 227 to adjust the provisional expected value so as to reduce the difference in the achieved brightness due to the pixel position and hold period described with reference to FIG. 25, and to determine the expected value. In this embodiment, the second corrector 218 determines the expected value on the basis of the selected brightness defined by the first equivalence portion 211 and the second equivalence portion 214, the target brightness defined by the preceding frame image signal, and the position and hold period of the pixel. Alternatively, the second corrector 218 may also determine the expected value on the basis of other factors affecting pixel brightness (for example, the temperature distribution of the liquid crystal panel 231) instead of or in addition to the selected brightness.

As a result, the second corrector 218 configures the expected value of the gate line $L_{2f}$ in FIG. 17, for example, at "40", for example, instead of "50" and configures the correction value of the gate line $L_{2f}$ of the second correction signal CRx(2) at "0", for example, instead of "−5". That is, the second corrector 218 changes the driving brightness according to the position, in the sub-scanning direction, of the pixel and the pixel hold period. Accordingly, the pixel brightness can be more suitably brought close to a desired brightness.

According to the second embodiment, the video signal processor 210 generates a second image signal such that a pixel selected in the first scanning operation is not driven in the second scanning operation and retains the state of the first scanning operation. In this embodiment, the pixels selected in the first scanning operation exemplify specific pixels.

Furthermore, according to the second embodiment, the liquid crystal driver 220 executes two (N=2) second scanning operations but the Jth (J is an integer of not less than two and not more than N) second image signal executed by the second scanning operation for the Jth time does not contain data for driving the pixels selected in the first to (J−1)th second scanning operation. For these pixels, in the Jth second scanning operation, the state of the last-driven scanning operation is held. In this embodiment, the pixels which are selected in the first to (J−1)th second scanning operations exemplify specific pixels.

Third Embodiment

According to the above second embodiment, the liquid crystal driver 220 executes two (N=2) second scanning operations but, in a third embodiment, the liquid crystal driver 220 executes three (N=3) second scanning operations. A third embodiment will be described hereinbelow with an emphasis on the differences from the first and second embodiments.

Figure 27A:
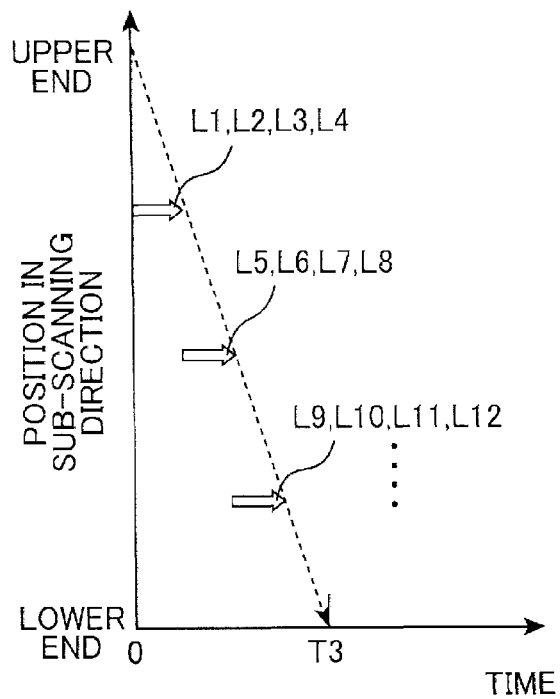
FIGS. 27A to 27D are schematic graphs which show scanning operations which are performed by a liquid crystal driver according to the third embodiment.
Figure 27B:
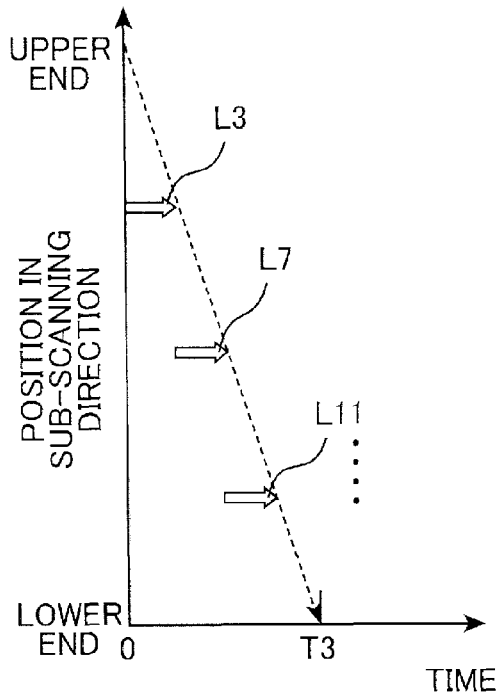
Figure 27C:
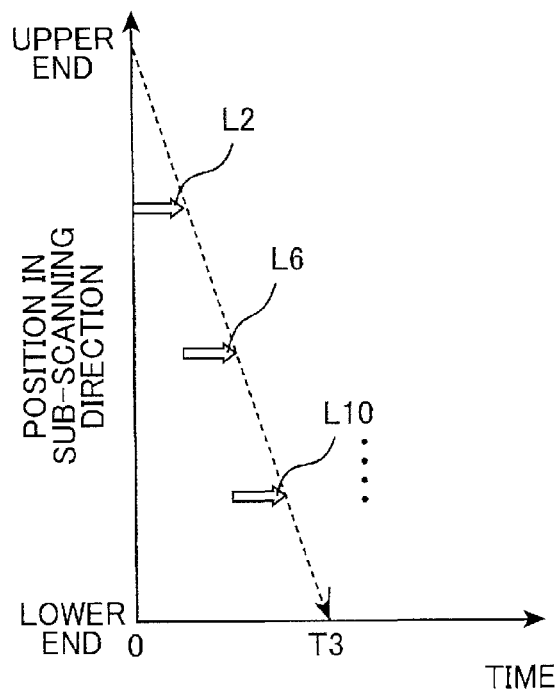
Figure 27D:
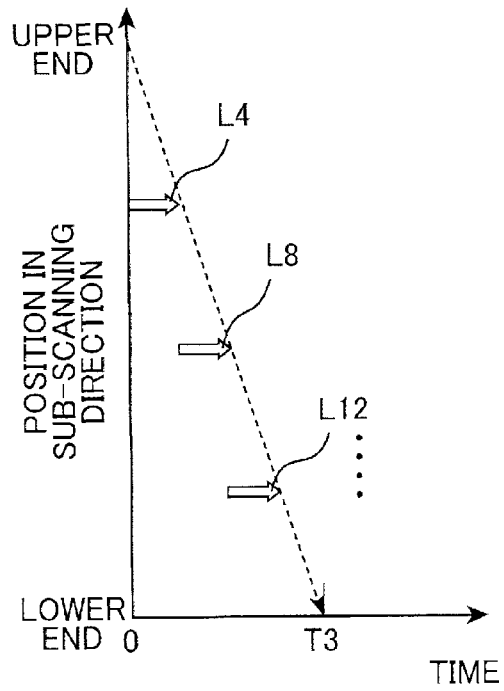

FIG. 26 is a diagram which schematically shows, in table form, target brightnesses which are configured in a first scanning operation and three second scanning operations for the target brightnesses defined by frame image signals which are input, according to a third embodiment. FIGS. 27A to 27D are schematic graphs which show scanning operations which are performed by the liquid crystal driver 220. FIG. 27A shows a first scanning operation based on a first image signal. FIG. 27B shows a first second scanning operation based on a first second image signal. FIG. 27C shows a second second scanning operation based on a second second image signal. FIG. 27D shows a third second scanning operation based on a third second image signal. FIGS. 27A to 27D show scanning operations on gate lines L1 to L12. The horizontal axis in FIGS. 27A to 27D is the time axis on which the scanning operations on gate lines L1 to L12 are performed. The vertical axis in FIGS. 27A to 27D represents the position, in the sub-scanning direction, of the liquid crystal panel 231. An overview of the first scanning operation and the second scanning operations according to the third embodiment will be provided by using FIGS. 1, 26, and 27A to 27D.

As shown in FIG. 26, target brightnesses I1 to I12 respectively are defined by the frame image signal for the pixels on the data line M of the gate lines L1 to L12. The first scanning operation is executed in the same way as in the second embodiment, and hence the descriptions according to the second embodiment pertaining to FIGS. 21 and 22A to 22C are suitably called upon.

The video signal processor 210 generates first to third second image signals such that, subsequently in the first to third second scanning operations, three pixels which were not selected in the first scanning operation among the four pixels in the pixel group are sequentially selected and driven one by one, and the remaining unselected pixel is not driven and held as is. The liquid crystal driver 220 executes the first to third second scanning operations on the basis of the first to third second image signals generated by the video signal processor 210 and drives some of the pixels on the data line M.

In other words, in the first scanning operation, the pixel corresponding to the gate line L1 among the pixels which correspond to the set of gate lines L1, L2, L3, and L4, for example, is selected and driven on the basis of a selected brightness I1 which matches the target brightness I1 of the frame image signal. Therefore, in the first second scanning operation, the video signal processor 210 generates a first second image signal such that a pixel corresponding to the gate line L3 among the pixels which correspond to the gate lines L2, L3, and L4 other than the gate line L1 is selected and driven on the basis of a target brightness I3, and the pixels other than the pixels on gate line L3 are not driven. The pixels which are not driven in the first second scanning operation are held as is in the state of the first scanning operation.

Subsequently, in the second second scanning operation, the video signal processor 210 generates a second second image signal such that one pixel among the pixels which were not selected at all up to the first second scanning operation is selected and driven, and the remaining pixels are not driven and held as is. Further, the liquid crystal driver 220 executes a second second scanning operation on the basis of the second second image signal which is generated by the video signal processor 210 and drives some of the pixels on the data line M.

In other words, the pixel which corresponds to the gate line L1 among the pixels corresponding to the set of gate lines L1, L2, L3, and L4, for example, is selected in the first scanning operation and driven on the basis of the target brightness I1, and the pixel which corresponds to the gate line L3 is selected in the first second scanning operation and driven on the basis of the target brightness I3. Therefore, in the second second scanning operation, the video signal processor 210 generates a second second image signal such that the pixel corresponding to the gate line L2 is selected and driven on the basis of the target brightness I2 and the pixels on gate lines other than gate line L2 are not driven. The pixels which are not driven in the second second scanning operation are held in the state of the scanning operation that was last performed.

Subsequently in the third second scanning operation, the video signal processor 210 generates a third second image signal such that a pixel that has not been selected at all up until the second second scanning operation is selected and driven and the other pixels are not driven and held as is. Further, the liquid crystal driver 220 executes a third second scanning operation on the basis of the third second image signal generated by the video signal processor 210 and drives some of the pixels on the data line M.

In other words, the pixel which corresponds to the gate line L1 among the pixels corresponding to the set of gate lines L1, L2, L3, and L4, for example, is selected in the first scanning operation and driven on the basis of the target brightness I1, the pixel which corresponds to the gate line L3 is selected in the first second scanning operation and driven on the basis of the target brightness I3, and the pixel which corresponds to the gate line L2 is selected in the second second scanning operation and driven on the basis of the target brightness I2. Therefore, in the third second scanning operation, the video signal processor 210 generates a third second image signal such that the remaining pixel which corresponds to the gate line L4 is selected and driven on the basis of the target brightness I4 and the pixels other than the pixels on the gate line L4 are not driven. The pixels which are not driven in the third second scanning operation are held in the state of the scanning operation that was last executed. As shown in FIG. 26, similarly for the other sets of gate lines such as the gate lines L5, L6, L7, and L8, the first scanning operation and the three second scanning operations are executed. Note that the order of the pixels which are driven in the first to third second scanning operations is not limited to the order shown in FIG. 26.

As described earlier, the first image signal equalizes the brightness of the pixels arranged adjacently in the sub-scanning direction. According to this embodiment, the brightnesses of the pixels on the gate lines $L_{4t-3}$, $L_{4t-2}$, $L_{4t-1}$, and $L_{4t}$ are configured equal (t is a natural number). Therefore, the liquid crystal driver 220 is able to write the first image signal simultaneously to the gate lines $L_{4t-3}$, $L_{4t-2}$, $L_{4t-1}$, and $L_{4t}$. As a result, the liquid crystals which correspond to the pixels on the gate lines $L_{4t-3}$, $L_{4t-2}$, $L_{4t-1}$, and $L_{4t}$ are driven simultaneously.

As described earlier, the first second image signal is generated such that the pixels on the gate lines $L_{4t-3}$, $L_{4t-2}$, and $L_{4t}$ are held without being driven and only the pixel on the gate line $L_{4t-1}$ is driven. Therefore, the liquid crystal driver 220 sequentially writes the first second image signal in the order of the gate lines $L_3$, $L_7$, . . . .

As described earlier, the second second image signal is generated such that the pixels on the gate lines $L_{4t-3}$, $L_{4t-1}$, and $L_{4t}$ are held without being driven and only the pixel on the gate line $L_{4t-2}$ is driven. Therefore, the liquid crystal driver 220 sequentially writes the second second image signal in the order of the gate lines $L_2$, $L_6$, . . . .

As described earlier, the third second image signal is generated such that the pixels on the gate lines $L_{4t-3}$, $L_{4t-2}$, and $L_{4t-1}$ are held without being driven and only the pixel on the gate line $L_{4t}$ is driven. Therefore, the liquid crystal driver 220 sequentially writes the third second image signal in the order of the gate lines $L_4$, $L_8$, . . . .

As shown in FIGS. 27A to 27D, according to this embodiment, the liquid crystal driver 220 which performs the first scanning operation performs simultaneous signal writing to the pixels which correspond to the four gate lines $L_{4t-3}$, $L_{4t-2}$, $L_{4t-1}$, and $L_{4t}$ by means of the first image signal. Therefore, the period T3 of the first scanning operation is ¼ of the period in a case where sequential signal writing is performed to all the gate lines $L_1$, $L_2$, . . . (that is, the period T2 of the second scanning operation in the comparative example shown in FIG. 19). That is, the period T3 is half the period T1 of the first scanning operation of the first embodiment.

The liquid crystal driver 220 which performs the first second scanning operation performs sequential signal writing to the pixel corresponding to the gate line $L_{4t-1}$ by means of the first second image signal and does not drive the pixels corresponding to the three gate lines $L_{4t-3}$, $L_{4t-2}$, and $L_{4t}$. Therefore, the period of the first second scanning operation is T3 which is the same as the period of the first scanning operation.

The liquid crystal driver 220 which performs a second second scanning operation performs sequential signal writing to the pixel which corresponds to the gate line $L_{4t-2}$ by means of a second second image signal and does not drive the pixels which correspond to the three gate lines $L_{4t-3}$, $L_{4t-1}$, and $L_{4t}$. Therefore, the period of the second second scanning operation is T3 which is the same as the period of the first scanning operation.

The liquid crystal driver 220 which performs a third second scanning operation performs sequential signal writing to the pixel which corresponds to the gate line $L_{4t}$ by means of a third second image signal and does not drive the pixels which correspond to the three gate lines $L_{4t-3}$, $L_{4t-2}$, and $L_{4t-1}$. Therefore, the period of the third second scanning operation is T3 which is the same as the period of the first scanning operation.

Accordingly, according to the third embodiment, the driving of the liquid crystals of the liquid crystal panel 231 is executed in a short time across the whole display surface by means of the first scanning operation and the three second scanning operations which are performed in a short time, and hence the crosstalk in the lower area of the display is reduced.

(Second Correction Table)

According to the third embodiment, as described with reference to FIGS. 27A to 27D, the first scanning period and the three second scanning periods are all T3 and the same. Therefore, adjustment of the pixel position, as described with reference to the second embodiment, by the second corrector 218 of the third embodiment is not necessary.

Meanwhile, as described with reference to FIG. 26, according to the third embodiment, when the pixels are driven by the first to third second scanning operations, there is a difference in the hold period of these pixels, that is, the hold period in which the pixels are held without being driven after being driven in the first scanning operation in which all the pixels are driven. That is, a pixel which corresponds to the gate line L3, for example, is driven in the first second scanning operation without being held after being driven on the basis of a selected brightness I1 which does not match the target brightness I3 of the frame image signal in the first scanning operation. The pixel which corresponds to the gate line L2, for example, is held without being driven in the first second scanning operation after being driven on the basis of the selected brightness I1 which does not match the target brightness I2 of the frame image signal in the first scanning operation and is driven on the basis of the target brightness I2 in the second second scanning operation. For example, the pixel which corresponds to the gate line L4 is held without being driven in the first and second second scanning operations after being driven on the basis of the selected brightness I1 which does not match the target brightness I4 of the frame image signal in the first scanning operation, and is driven on the basis of the target brightness I4 in the third second scanning operation. Hence, as described with reference to the second embodiment, in the second corrector 218, adjustment of the hold period is required in order to determine the expected value for the brightness achieved by the pixel.

Figure 28:
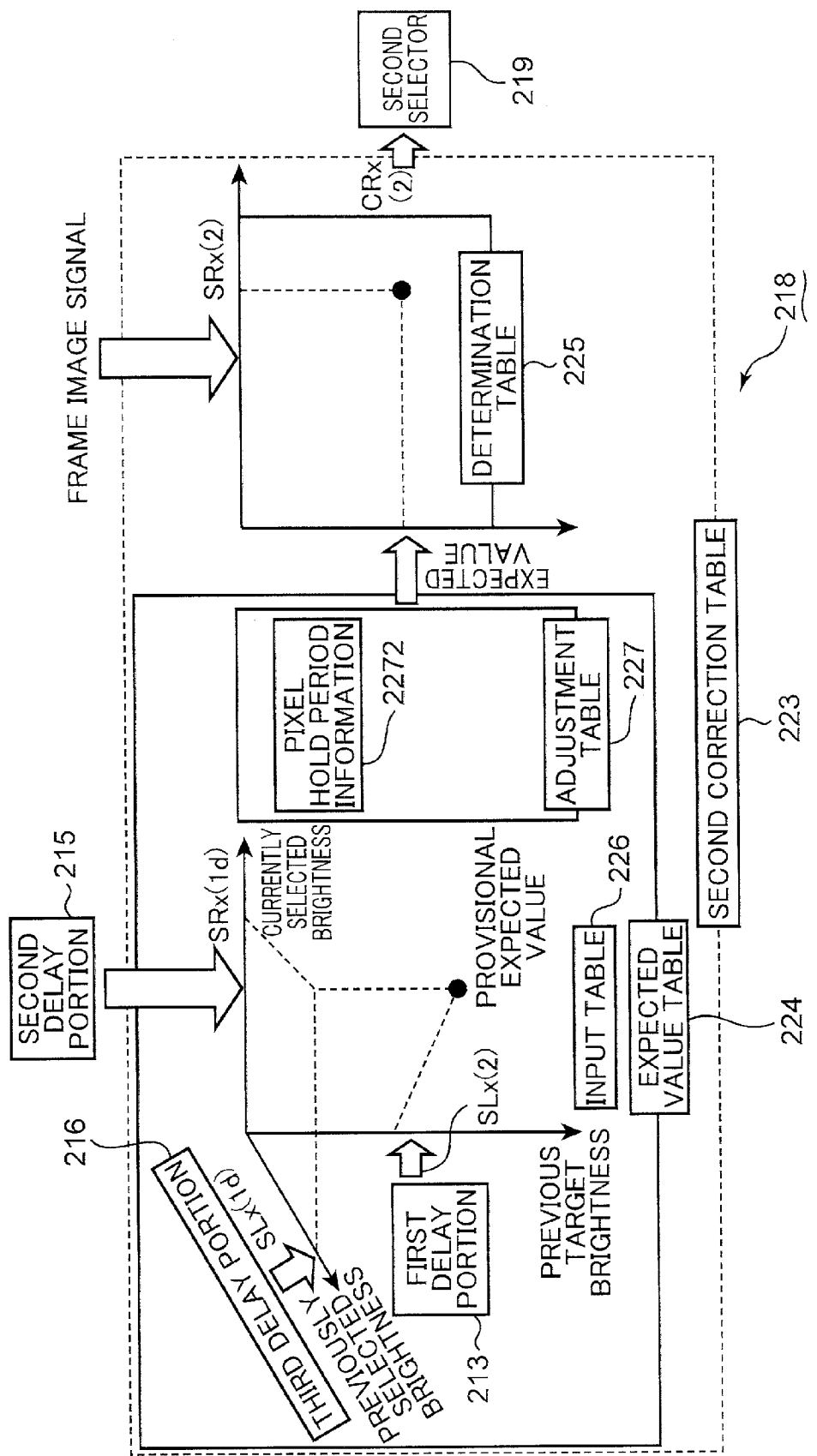
FIG. 28 is a conceptual drawing of a second correction table which a second corrector stores according to the third embodiment.

FIG. 28 is a conceptual diagram of the second correction table which is stored in the second corrector 218 according to the third embodiment. The same reference numerals are assigned to the same elements as in the second embodiment. The second corrector 218 will be described by using FIGS. 1 and 28 with an emphasis on the differences from the second embodiment.

As shown in FIG. 28, the expected value table 224 comprises the adjustment table 227. The adjustment table 227 comprises pixel hold period information 2272. The pixel hold period information 2272 contains information indicating the hold period of pixels for which the driving brightness is to be determined. The second corrector 218 uses the pixel hold period information 2272 of the adjustment table 227 to adjust the provisional expected value so as to reduce the difference in the achieved brightness due to the hold period described with reference to FIG. 25, and to determine the expected value.

According to the third embodiment, the video signal processor 210 generates the second image signal such that a pixel which is selected in the first scanning operation is not driven in the second scanning operation and retains the state of the first scanning operation. In this embodiment, the pixel selected in the first scanning operation exemplifies a specific pixel.

Further, according to the third embodiment, the liquid crystal driver 220 executes three (N=3) second scanning operations but the Jth (J is an integer of not less than two and not more than N) second image signal based on which the Jth second scanning operation is executed does not contain data for driving the pixels selected in the first to (J−1)th second scanning operations. For these pixels, in the Jth second scanning operation, the state of the last-driven scanning operation is held. In this embodiment, the pixels which are selected in the first to (J−1)th second scanning operations exemplify specific pixels.

Fourth Embodiment

According to the second and third embodiments above, the liquid crystal driver 220 executes N (N=2, 3) second scanning operations but, in a fourth embodiment, the liquid crystal driver 220 executes a third scanning operation after performing the one second scanning operation. A fourth embodiment will be described hereinbelow with an emphasis on the differences from the first and second embodiments.

Figure 30A:
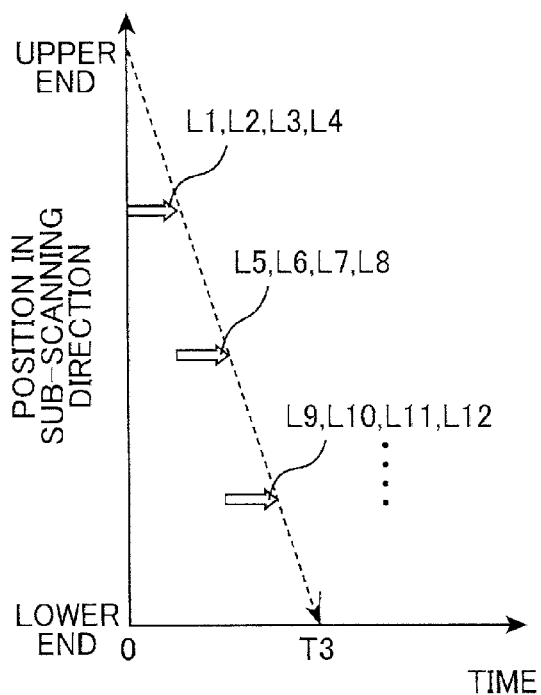
FIGS. 30A, 30B and 30C are schematic graphs which show scanning operations which are performed by a liquid crystal driver according to the fourth embodiment.
Figure 30B:
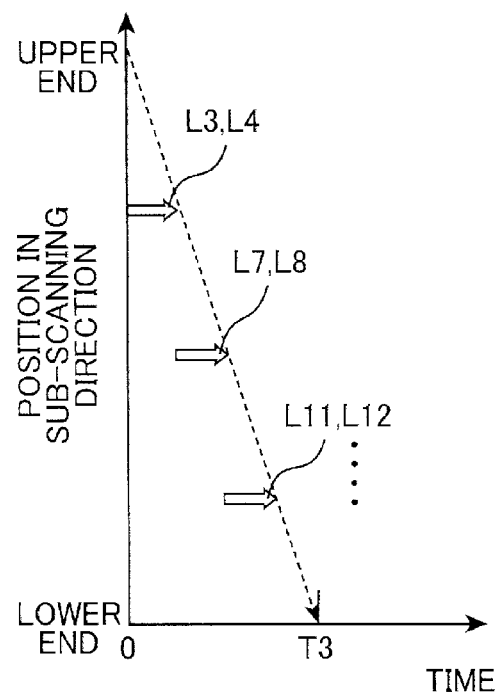
Figure 30C:
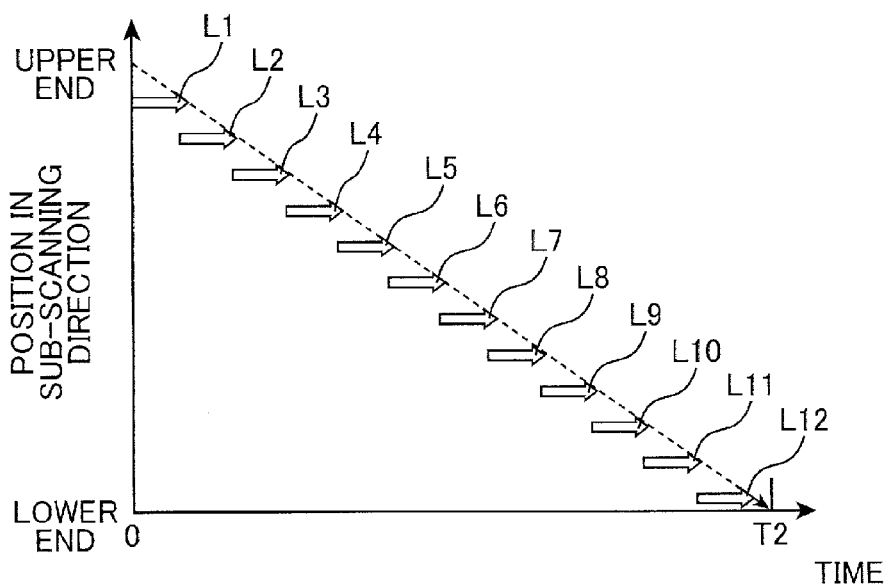

FIG. 29 is a diagram which schematically shows, in table format, target brightnesses which are configured in first, second, and third scanning operations, for target brightnesses which are defined by frame image signals that are input, according to a fourth embodiment. FIGS. 30A to 30C are schematic graphs which show scanning operations which are performed by the liquid crystal driver 220. FIG. 30A shows a first scanning operation based on a first image signal. FIG. 30B shows a second scanning operation based on a second image signal. FIG. 30C shows a third scanning operation. FIGS. 30A to 30C show scanning operations on gate lines L1 to L12. The horizontal axis in FIGS. 30A to 30C is time axis on which the scanning operations are performed on gate lines L1 to L12. The vertical axis in FIGS. 30A to 30C represents the position, in the sub-scanning direction, of the liquid crystal panel 231. The first, second, and third scanning operations according to the fourth embodiment are schematically described by using FIGS. 1, 29, and 30A to 30C.

As shown in FIG. 29, the target brightnesses I1 to I12 are defined by the frame image signals for the pixels on the data line M of the gate lines L1 to L12. As shown in FIG. 29, the first scanning operation is executed in the same way as the second embodiment above, and hence the descriptions according to the second embodiment pertaining to FIGS. 21 and 22A to 22C are suitably called upon.

As shown in FIG. 29, subsequently the second scanning operation is executed in the same way as the first second scanning operation according to the second embodiment above, and hence the descriptions according to the second embodiment pertaining to FIGS. 21 and 22A to 22C are suitably called upon.

Subsequently in the third scanning operation, the video signal processor 210 controls the liquid crystal driver 220 so as to drive the pixels on all the gate lines L1, L2, . . . on the basis of the frame image signals (the L frame image signal and R frame image signal). Therefore, the liquid crystal driver 220 performs sequential writing to the gate lines L1, L2, . . . .

Therefore, as shown in FIG. 30A, the first scanning period T3 is ¼ of the period in a case where sequential signal writing is performed on all the gate lines L1, L2, . . . (that is, the period T2 of the third scanning operation shown in FIG. 30C). Likewise, as shown in FIG. 30B, the second scanning period T3 is ¼ of the period in a case where sequential signal writing is performed on all the gate lines L1, L2, . . . (that is, the period T2 of the third scanning operation).

Thus, in the fourth embodiment, the driving of the liquid crystals of the liquid crystal panel 231 is executed in a short time across the whole display surface by means of the first and second scanning operations which are performed in a short time, and therefore crosstalk in the lower area of the display surface is reduced. Further, in the fourth embodiment, a third scanning operation for driving all the pixels on the basis of the frame image signals is executed after performing the second scanning operation. Therefore, brightness inconsistencies or the like which can arise, by the effect of a liquid crystal coupling or the like, during the hold period of the second scanning operation can be reduced.

(Second Correction Table)

According to the fourth embodiment, as described with reference to FIGS. 30A to 30C, the third scanning period T2 is long in comparison with the first and second scanning periods T3. Therefore, in the second corrector 218 according to the fourth embodiment, adjustment in the pixel position which has been described with reference to the second embodiment is necessary.

Furthermore, as described with reference to FIG. 29, in the fourth embodiment, when the pixels are driven by the third scanning operation, there is a difference in the hold period of these pixels, that is, the hold period in which the pixels are held without being driven after being driven in the first scanning operation in which all the pixels are driven. That is, pixels which correspond to the gate lines L1 and L2, for example, are each driven on the basis of the target brightnesses I1 and I2 in the third scanning operation after being driven on the basis of a selected brightness I1 in the first scanning operation and being held in the second scanning operation. Meanwhile, the pixels which correspond to the gate lines L3 and L4, for example, are each driven on the basis of a selected brightness I3 in the second scanning operation without being held after being driven on the basis of the selected brightness I1 in the first scanning operation and are each driven on the basis of the target brightnesses I3 and I4 in the third scanning operation. Hence, as described with reference to the second embodiment, in the second corrector 218, adjustment of the hold period is required in order to determine the expected value for the brightness achieved by the pixel.

Thus, in the fourth embodiment, since adjustment of the pixel position and hold period is required, the second corrector 218 according to the fourth embodiment stores a second correction table 223 which has been described with reference to FIG. 23.

Fifth Embodiment

In the above first to fourth embodiments, the first equivalence portion 211 and the second equivalence portion 214 perform selection processing as equivalence processing. However, according to a fifth embodiment, the first equivalence portion 211 and the second equivalence portion 214 perform an averaging processing instead of selection processing as equivalence processing.

(Equivalence Processing (Averaging Processing))

Figure 32A:
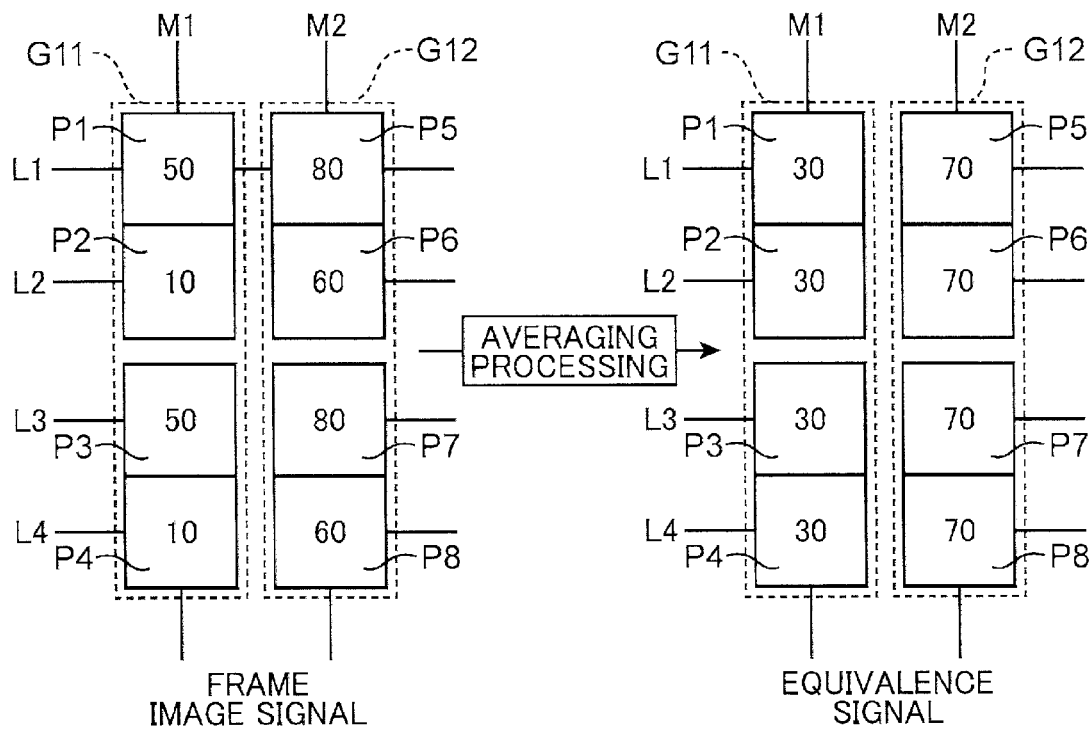
FIGS. 32A and 32B are diagrams which show pixel brightness variations which are configured via the averaging processing which represents an example of equivalence processing.
Figure 32B:
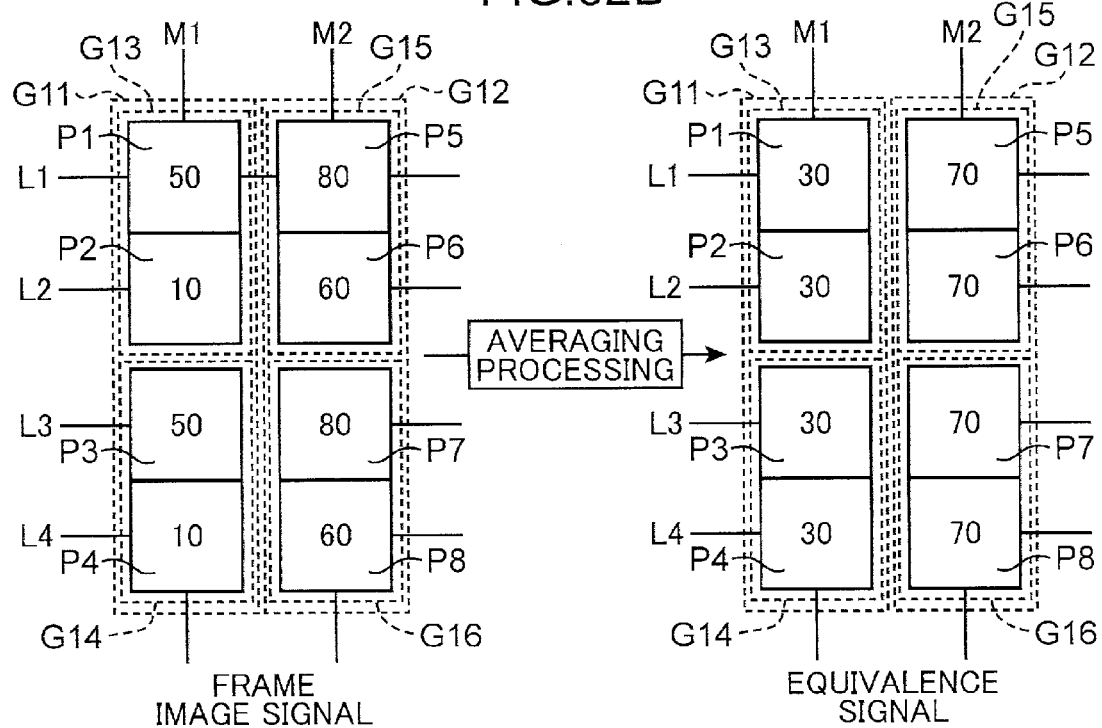

FIG. 31 is a schematic diagram which schematically shows a portion of the liquid crystal panel 231. FIGS. 32A and 32B show pixel brightness variations which are configured by way of an averaging processing which is an example of equivalence processing. The averaging processing will be described by using FIGS. 1, 7, 31, 32A, and 32B.

The liquid crystal panel 231 comprises a plurality of gate lines which extend in the main scanning direction and a plurality of data lines which extend in the sub-scanning direction. FIG. 31 shows gate lines L1 to L16 which are arranged in the sub-scanning direction and data lines M1 to M32 which are arranged in the main scanning direction. Liquid crystals (not shown) which correspond to the pixels P are each assigned to the intersections between each of the gate lines L1 to L16 and each of the data lines M1 to M32. The liquid crystal driving amounts are determined in accordance with voltages applied to each of the gate lines L1 to L16 and each of the data lines M1 to M32.

FIGS. 32A and 32B show pixels P1 to P8 which correspond to each of the intersections between the gate lines L1 to L4 and the data lines M1 and M2. The first equivalence portion 211 and the second equivalence portion 214 configure pixel groups (the sets of pixels surrounded by dotted lines in FIGS. 32A and 32B) which comprise a plurality of pixels arranged adjacently in the sub-scanning direction.

FIG. 32A shows a pixel group G11 which comprises a set of pixels P1, P2, P3, and P4 arranged adjacently on the data line M1, and a pixel group G12 which comprises a set of pixels P5, P6, P7, and P8 arranged adjacently on the data line M2. FIG. 32B further shows a subgroup G13 which comprises a set of pixels P1 and P2 and a subgroup G14 which comprises a set of pixels P3 and P4, which are obtained by dividing the pixel group G11, and a subgroup G15 which comprises a set of pixels P5 and P6 and a subgroup G16 which comprises a set of pixels P7 and P8, which are obtained by dividing the pixel group G12.

The numerical values shown in each pixel in FIG. 32A represent the brightnesses which are assigned to the pixels. The frame image signals define a brightness "50" for the pixels P1 and P3, define a brightness "10" for the pixels P2 and P4, define a brightness "80" for the pixels P5 and P7, and define a brightness "60" for the pixels P6 and P8, for example. The first equivalence portion 211 and the second equivalence portion 214 average the brightnesses in each of the pixel groups G11 and G12. The first equivalence portion 211 and the second equivalence portion 214 average the brightness "50", the brightness "10", the brightness "50", and the brightness "10" which are defined for the pixels P1, P2, P3, and P4 in the pixel group G11, and configure a brightness "30" for the pixels P1, P2, P3, and P4. The first equivalence portion 211 and the second equivalence portion 214 average the brightness "80", the brightness "60", the brightness "80", and the brightness "60" which are defined for the pixels P5, P6, P7, and P8 in the pixel group G12 and configure a brightness "70" for the pixels P5, P6, P7, and P8. As shown in FIG. 31, the foregoing averaging processing is executed for all the pixels P which correspond to the intersections between each of the gate lines L1 to L16 and each of the data lines M1 to M32. According to this embodiment, the average value of the target brightnesses which the frame image signal defines for the pixels in a pixel group exemplifies the average brightness.

According to this embodiment, the second corrector 218 determines the expected value on the basis of the average brightness defined by the first equivalence portion 211 and the second equivalence portion 214 instead of the selected brightness. The descriptions of the above first embodiment are suitably called upon regarding the remaining operations of the video signal processor 210.

According to the fifth embodiment, the liquid crystal driver 220 executes a third scanning operation after executing one second scanning operation, as per the fourth embodiment. The scanning operation of the fifth embodiment will be described hereinbelow with an emphasis on the differences from the first and fourth embodiments.

FIG. 33 is a diagram which schematically shows, in table format, target brightnesses which are configured in first, second, and third scanning operations, for target brightnesses which are defined by frame image signals that are input, according to the fifth embodiment. The first, second, and third scanning operations according to the fifth embodiment will be schematically described by using FIGS. 1 and 31 to 33.

As shown in FIG. 33, as per the above first embodiment, target brightnesses I1 to I12 respectively are defined by the frame image signal for the pixels on the data line M of the gate lines L1 to L12. In the first scanning operation, pixel groups which comprise four pixels arranged adjacently in the sub-scanning direction are configured. That is, as shown in FIG. 32A, for example, the pixel group G11 which comprises the pixels P1, P2, P3, and P4 which correspond to the gate lines L1, L2, L3, and L4 is configured.

In the first scanning operation, the video signal processor 210 generates, for each pixel group, a first image signal such that the average brightness found by the averaging processing described with reference to FIGS. 31, 32A and 32B is configured as the target brightness common to the pixels contained in the pixel group. The liquid crystal driver 220 executes a first scanning operation on the basis of the first image signal generated by the video signal processor 210 and drives all the pixels contained in the pixel group (that is, all the pixels on the data line M). That is, the sets of pixels (pixel groups) corresponding to the gate lines L1, L2, L3, and L4, for example, are each driven on the basis of the average brightness obtained by averaging the target brightnesses I1, I2, I3, and I4. Similarly, for example, the sets of pixels corresponding to the gate lines L9, L10, L11, and L12 are driven on the basis of the average brightness obtained by averaging the target brightnesses I9, I10, I11, and I12.

Subsequently in the second scanning operation, the pixel groups comprising four pixels are further divided, whereby subgroups which comprise two pixels are configured. That is, as shown in FIG. 32B, for example, the pixel group G11 is further divided, whereby a subgroup G13 which comprises pixels P1 and P2 which correspond to the gate lines L1 and L2 and a subgroup G14 which comprises pixels P3 and P4 which correspond to the gate lines L3 and L4 are configured.

In the second scanning operation, the video signal processor 210 generates a second image signal such that the pixels of one subgroup are driven and the pixels of the other subgroup are not driven and are held as is. The video signal processor 210 generates a second image signal such that, with respect to the pixels of the driven subgroup, the average brightness obtained by the averaging processing described with reference to FIGS. 31, 32A and 32B is configured as a target brightness which is common to the pixels contained in the subgroup. The liquid crystal driver 220 executes the second scanning operation on the basis of the second image signal generated by the video signal processor 210 and drives the pixels contained in some of the subgroups (that is, some of the pixels on the data line M).

That is, among the sets of pixels (pixel groups) corresponding to the gate lines L1, L2, L3, and L4 for example, the set of pixels (subgroup) corresponding to the gate lines L1 and L2 is held without being driven in the second scanning operation, whereas the set of pixels (subgroup) corresponding to the gate lines L3 and L4 is driven on the basis of the average brightness obtained by averaging the target brightnesses I3 and I4. Similarly, among the sets of pixels (pixel groups) which correspond to the gate lines L9, L10, L11, and L12 for example, the set of pixels (subgroup) which corresponds to the gate lines L9 and L10 is held without being driven in the second scanning operation, whereas the set of pixels (subgroup) which corresponds to the gate lines L11 and L12 is driven on the basis of the average brightness obtained by averaging the target brightnesses I11 and I12. According to this embodiment, some of the subgroups which are driven exemplify driven subgroups.

Subsequently in the third scanning operation, the video signal processor 210 controls the liquid crystal driver 220 to drive the pixels on all the gate lines L1, L2, . . . on the basis of the frame image signals (the L frame signal and R frame signal). Therefore, the liquid crystal driver 220 performs sequential writing to the gate lines L1, L2, . . . .

As can be seen in a comparison between FIGS. 33 and 29, the scanning periods performed by the liquid crystal driver 220 according to the fifth embodiment are the same as the fourth embodiment which is described with reference to FIGS. 30A to 30C. Therefore, as shown in FIG. 30A, the first scanning period T3 is ¼ of the period in a case where a signal is sequentially written to all the gate lines L1, L2, . . . (that is, the period T2 of the third scanning operation shown in FIG. 30C). Likewise, as shown in FIG. 30B, the second scanning period T3 is ¼ of the period in a case where a signal is sequentially written to all the gate lines L1, L2, . . . (that is, the period T2 of the third scanning operation).

Thus, in the fifth embodiment, the driving of the liquid crystals of the liquid crystal panel 231 is executed in a short time across the whole display surface by means of the first scanning operation and the second scanning operation which are performed in a short time, and hence the crosstalk in the lower area of the display is reduced. Further, according to the fifth embodiment, because the average brightness is employed, the brightness can be configured as a brightness which does not deviate greatly from the target brightness defined by the frame image signal for all the pixels contained in the pixel group. Further, according to the fifth embodiment, although each pixel is driven on the basis of an average brightness which differs from the target brightness up until the second scanning operation, after the second scanning operation, a third scanning operation which drives all the pixels on the basis of the frame image signal is executed, and hence the target brightness defined by the frame image signal can be realized.

As described earlier, the scanning operation performed by the liquid crystal driver 220 according to the fifth embodiment is the same as that of the fourth embodiment which is described with reference to FIGS. 30A to 30C. Hence, in the fifth embodiment, like the fourth embodiment, adjustment of the pixel position and adjustment of the pixel hold period are required. For this reason, the second corrector 218 according to the fifth embodiment stores a second correction table 223 which is described with reference to FIG. 23.

Note that the average brightnesses used in the first and second scanning operations of the fifth embodiment are not limited to those shown in FIG. 33. Different modes of the fifth embodiment will be described hereinbelow.

FIG. 34 is a diagram which schematically shows, in table format, target brightnesses which are configured in first, second, and third scanning operations, for target brightnesses which are defined by frame image signals that are input, according to a different mode of the fifth embodiment. The differences from the fifth embodiment will be described using FIGS. 1 and 34.

In the first scanning operation, the sets of pixels (pixel groups) which correspond to the gate lines L1, L2, L3, and L4, for example, are each driven on the basis of the average brightness obtained by averaging the target brightnesses I1 and I2. Likewise, for example, the sets of pixels (pixel groups) which correspond to the gate lines L9, L10, L11, and L12, for example, are each driven on the basis of the average brightness obtained by averaging the target brightnesses I9 and I10.

Subsequently in the second scanning operation, among the sets of pixels (pixel groups) which correspond to the gate lines L1, L2, L3, and L4 for example, the sets of pixels (subgroup) corresponding to the gate lines L1 and L2 are held without being driven in the second scanning operation, whereas the sets of pixels (subgroups) corresponding to the gate lines L3 and L4 are each driven on the basis of the average brightness which is obtained by averaging the target brightnesses I3 and I4. Likewise, among the sets of pixels (pixel groups) which correspond to the gate lines L9, L10, L11, and L12 for example, the sets of pixels (subgroups) which correspond to the gate lines L9 and L10 are held without being driven in the second scanning operation, whereas the sets of pixels (subgroups) which correspond to the gate lines L11 and L12 are each driven on the basis of the average brightness obtained by averaging the target brightnesses I11 and I12.

Subsequently in the third scanning operation, like the fifth embodiment, the video signal processor 210 controls the liquid crystal driver 220 to drive the pixels on all the gate lines L1, L2, . . . on the basis of the frame image signals, and the liquid crystal driver 220 performs sequential writing to the gate lines L1, L2, . . . .

(Effects of the Above Embodiments)

Figure 36A:
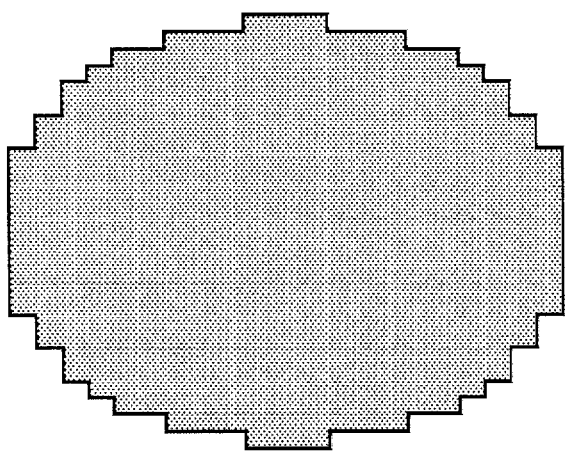
FIGS. 36A, 36B and 36C are diagrams which represent, by way of example, objects which are rendered by the first, second, and third scanning operations.
Figure 36B:
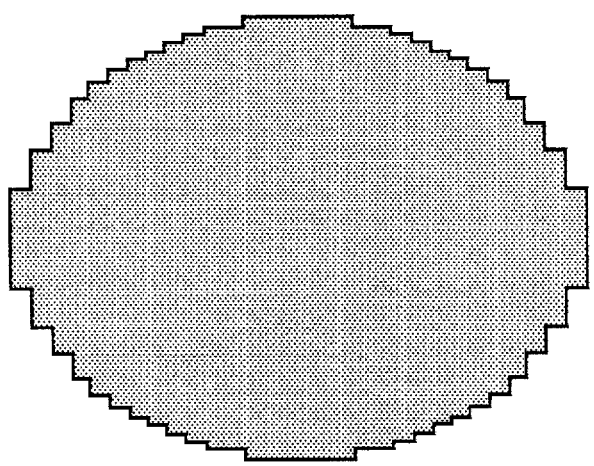
Figure 36C:
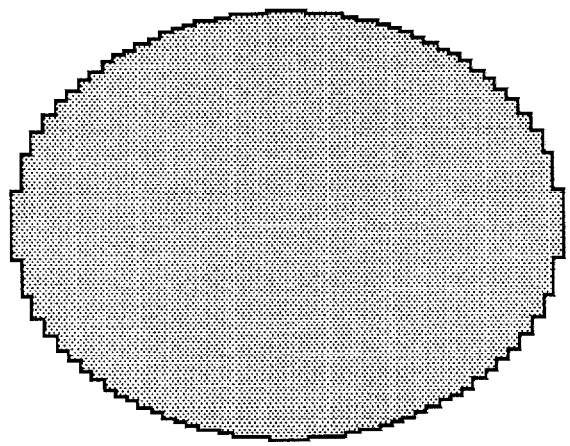
Figure 38:
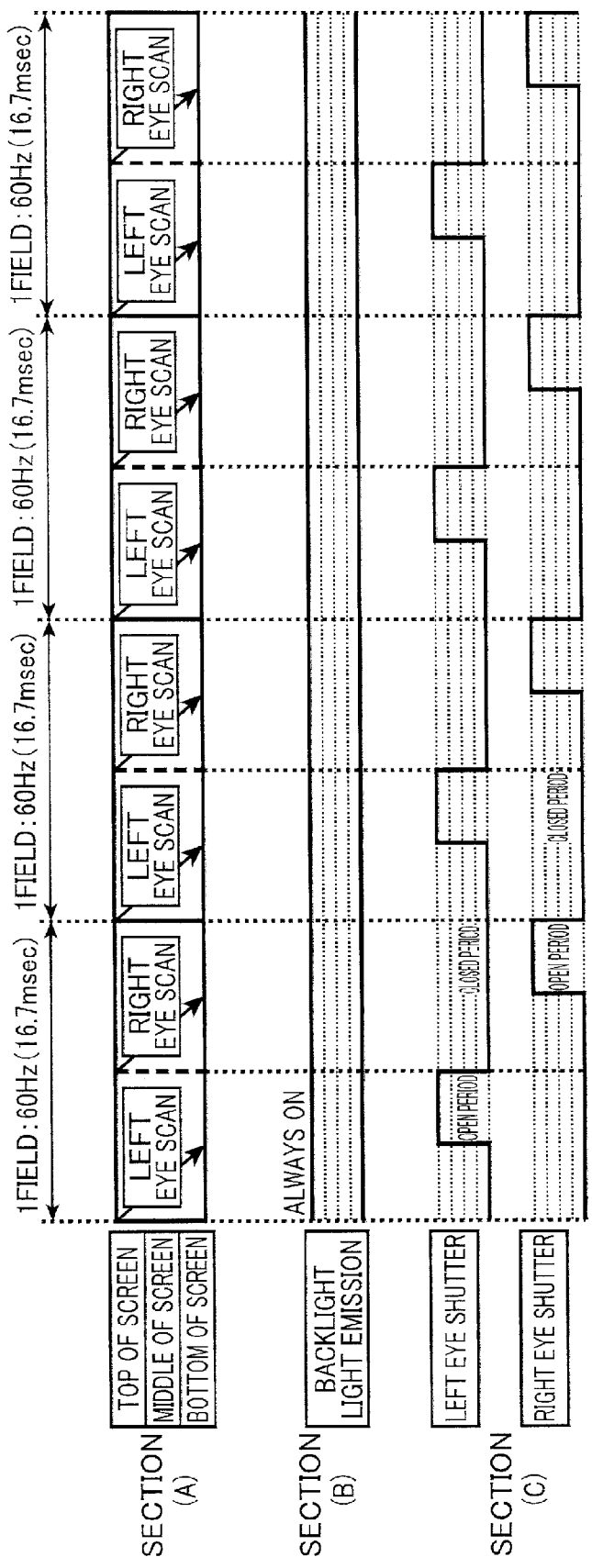
FIG. 38 is a control timing chart which represents, by way of example, control of a conventional video viewing system.

FIG. 35 is a graph which schematically shows spatial spectra which are obtained by a first scanning operation, a second scanning operation, and a third scanning operation according to the fourth embodiment or the fifth embodiment, for example. FIGS. 36A to 36C illustrate an object which has been rendered by the first scanning operation, the second scanning operation, and the third scanning operation. FIG. 36A shows an object rendered by the first scanning operation. FIG. 36B shows an object rendered by the second scanning operation. FIG. 36C shows an object rendered by the third scanning operation.

In the fourth embodiment, the brightness is configured for every four pixels in the first scanning operation. In the second scanning operation, for every two pixels, the brightness is configured or the brightness of the first scanning operation is held. In the third scanning operation, the brightness is configured for each pixel. Therefore, the resolution of an object rendered by the subsequent scanning operation is higher than the resolution rendered by the preceding scanning operation. The same is true for the other embodiments. In other words, in the first embodiment, for example, the brightness is configured for every two pixels in the first scanning operation, and in the second scanning operation, for every pixel, the brightness is configured or the brightness of the first scanning operation is held. Hence, the resolution of an object rendered by the subsequent scanning operation (second scanning operation) is higher than that of an object rendered by the preceding scanning operation (first scanning operation). If the resolution of an object is high, the spatial frequency is high. If the resolution of an object is low, the spatial frequency is low.

In general, as the spatial frequency of an area becomes lower, the crosstalk in the area becomes more easily perceived by a viewer. As shown in FIGS. 36A to 36C, areas of a low spatial frequency are rendered by the first scanning operation which is performed promptly. Areas of high spatial frequency are rendered in order by the subsequent second and third scanning operations. Therefore, even if the response of the liquid crystals is insufficient, because the rendering of areas in which crosstalk is readily perceived is completed promptly, the viewer barely notices the crosstalk. Accordingly, the driving of the liquid crystal panel 231 is achieved with limited crosstalk.

In the various embodiments above, the driving brightnesses for driving the liquid crystals are configured on the basis of various elements such as the brightness level of the preceding frame image and pixel position. Other elements may also be considered in addition to the various elements which are used to configure the driving brightness. For example, the temperature distribution of the liquid crystal panel and/or other elements which affect the liquid crystal response time or the pixel brightness may also be used to configure the driving brightness.

Further, in the various embodiments above, a display device 200 to which a left eye video signal and a right eye video signal are input and which displays video that is perceived in three dimensions is applied, but the present application is not limited to the display device 200. The present application can be applied to a normal display device to which a normal video signal is input and which displays video that is perceived in two dimensions. This display device is configured such that the second controller 240 is omitted from the display device 200 shown in FIG. 1 and such that a normal video signal is input to the video signal processor 210 instead of a left eye video signal and a right eye video signal.

Note that the specific embodiments above mainly include implementation having the following configuration.

In one general aspect, the instant application describes a display device that includes a liquid crystal panel which has a display surface including a plurality of pixels arranged in a matrix in a main scanning direction and a sub-scanning direction, and displays frame images on the display surface by switching the frame images over time; a generation portion which generates a first image signal and a second image signal on a basis of a frame image signal for displaying the frame images, the first image signal rendering an image of a lower resolution than the frame image signal and including data that is to be written to all the pixels of the display surface, the second image signal including data that is to be written to a part of the pixels among the pixels of the display surface and not including data that is to be written to remaining pixels other than the part of the pixels; and a liquid crystal driver which executes, after executing a first scanning operation in which scanning across the display surface on a basis of the first image signal is executed, at least once a second scanning operation in which scanning across the display surface on a basis of the second image signal is executed, to drive the liquid crystal panel. The data that has been written to the remaining pixels is held in the second scanning operation.

According to the above configuration, the liquid crystal panel displays frame images on the display surface by switching the frame images over time. The display surface of the liquid crystal panel includes a plurality of pixels which are arranged in a matrix in a main scanning direction and a sub-scanning direction. On the basis of a frame image signal for displaying a frame image, the generation portion generates a first image signal and a second image signal. The first image signal renders an image of a lower resolution than the frame image signal, and includes data that is to be written to all the pixels of the display surface. The second image signal includes data that is to be written to a part of the pixels among the pixels of the display surface, and does not include data that is to be written to remaining pixels other than the part of the pixels.

The liquid crystal driver executes a first scanning operation in which scanning across the display surface on the basis of the first image signal which renders an image of a lower resolution than the frame image signal and includes data that is to be written to all the pixels of the display surface is executed. Further, after executing the first scanning operation, the liquid crystal driver executes, at least once, a second scanning operation in which scanning across the display surface on the basis of a second image signal which includes data that is to be written to a part of the pixels among the pixels of the display surface and does not include data that is to be written to the remaining pixels other than the part of the pixels is executed. In the second scanning operation, data which has been written to the remaining pixels is held.

In general, crosstalk in image areas, in which frequency of brightness change in the sub-scanning direction is low, is easy for the viewer to perceive, and crosstalk in image areas, in which frequency of brightness change in the sub-scanning direction is high, is hard for the viewer to perceive. Here, the first image signal in the first scanning operation includes data which is to be written to all the pixels of the display surface, but since an image of a lower resolution than the frame image signal is rendered, the first scanning operation is performed at high speed, and hence the driving of the pixels of the whole display surface is carried out promptly. Further, the second image signal in the second scanning operation includes data which is to be written to a part of the pixels among the pixels of the display surface and does not include data which is to be written to the remaining pixels other than the part of the pixels, and in the second scanning operation, data that has been written to the remaining pixels is held. Thus, the second scanning operation can also be executed at high speed. Therefore, the rendering of image areas, in which frequency of brightness change in the sub-scanning direction is low, is achieved promptly by the first scanning operation and the second scanning operation. Hence, the viewer barely notices crosstalk between the preceding frame image and the subsequent frame image.

The above general aspect may include one or more of the following features. The display device may include that the frame images include a left eye frame image which is created for viewing by a left eye, and a right eye frame image which is created for viewing by a right eye, the generation portion generates the first image signal and the second image signal on a basis of the frame image signal for displaying the left eye frame image or the right eye frame image, and the liquid crystal panel displays an image that is perceived in three dimensions on the display surface by switching alternately over time between the left eye frame image and the right eye frame image.

According to the above configuration, the frame image includes a left eye frame image which is created for viewing by the left eye, and a right eye frame image which is created for viewing by the right eye. The generation portion generates the first image signal and the second image signal on the basis of frame image signals for displaying the left eye frame image or the right eye frame image. The liquid crystal panel switches alternately between the left eye frame image and the right eye frame image over time to display an image which is perceived in three dimensions on the display surface. The first and second scanning operations can be executed at high speed, and hence the rendering of image areas, in which frequency of brightness change in the sub-scanning direction is low, is achieved promptly by the first and second scanning operations. Hence, the viewer barely notices crosstalk between the left eye frame image and the right eye frame image.

The display device may include that the generation portion generates N second image signals where N is an integer of two or more, and the liquid crystal driver: executes the second scanning operation, in which scanning across the display surface on a basis of each of the N second image signals is executed, N times in order starting with a first second image signal and ending with an Nth second image signal; writes, in a Jth second scanning operation where J is an integer of not less than two and not more than N, data to driving pixels which are a part of the pixels to which data of the second image signal has not been written in a (J−1)th second scanning operation; and does not write data to pixels other than the driving pixels in the Jth second scanning operation.

According to the above configuration, the generation portion generates N second image signals where N is an integer of two or more. The liquid crystal driver executes the second scanning operation, in which scanning across the display surface on the basis of each of the N second image signals is executed, N times in order starting with the first second image signal and ending with the Nth second image signal. Further, in the Jth second scanning operation where J is an integer of not less than two and not more than N, the liquid crystal driver writes data to the driving pixels which are a part of the pixels to which data of the second image signal has not been written in a (J−1)th second scanning operation. Further, the liquid crystal driver does not write data to the pixels other than the driving pixels in the Jth second scanning operation. Therefore, in both the (J−1)th second scanning operation and the Jth second scanning operation, the driving pixels are driven, while the pixels other than the driving pixels are not driven and data that has been written is held, and hence all the second scanning operations can be performed at high speed. Therefore, crosstalk can be reduced across the whole of the display surface.

The display device may include that the plurality of pixels included in the display surface are divided into a plurality of pixel groups each including a plurality of pixels arranged adjacently in the sub-scanning direction, the generation portion generates, as the first image signal, a signal which includes write data for configuring, for each of the pixel groups, an equivalent brightness common to the pixels included in the pixel group as a driving brightness, and the liquid crystal driver which executes the first scanning operation simultaneously drives, for each of the pixel groups, each of the pixels included in the pixel group toward the driving brightness.

According to the above configuration, the plurality of pixels included in the display surface are divided into a plurality of pixel groups each including a plurality of pixels arranged adjacently in the sub-scanning direction. The generation portion generates, as the first image signal, for each of the pixel groups, a signal which includes write data for configuring an equivalent brightness common to the pixels included in the pixel group as a driving brightness. The liquid crystal driver which executes the first scanning operation simultaneously drives, for each pixel group, each of the pixels included in the pixel group toward the driving brightness. Therefore, the period in which the first scanning operation is executed is short in comparison with a case where all the pixels of the display surface are sequentially driven.

The display device may include that the pixel group is further divided into a plurality of subgroups each of which includes at least one pixel, the generation portion generates, as the second image signal, a signal which includes write data for configuring, as the driving brightness, an equivalent brightness common to the pixels included in driving subgroups which are a part of the subgroups, and does not include data that is written to pixels included in a subgroup other than the driving subgroups, and the liquid crystal driver which executes the second scanning operation simultaneously drives, for each of the driving subgroups, the at least one pixel which is included in the driving subgroup toward the driving brightness.

According to the above configuration, the pixel group is further divided into a plurality of subgroups each of which includes at least one pixel. The generation portion generates, as the second image signal, a signal which includes write data for configuring, as the driving brightness, an equivalent brightness common to the pixels included in driving subgroups which are a part of the subgroups, and does not include data that is written to pixels included in the subgroup other than the driving subgroup. The liquid crystal driver which executes the second scanning operation simultaneously drives, for each driving subgroup, the at least one pixel that is included in the driving subgroup toward the driving brightness. Therefore, since the pixels included in the driving subgroup are driven and pixels that are included in the subgroups other than the driving subgroup are not driven, the period for executing the second scanning operation is shorter than in a case where all the pixels of the display surface are sequentially driven.

The display device may include that the equivalent brightness is configured on a basis of a selected brightness selected from among target brightnesses defined by the frame image signal for each of the pixels included in the pixel group or the driving subgroup.

According to the above configuration, the equivalent brightness is configured on the basis of a selected brightness selected from among target brightnesses which the frame image signal defines for each of the pixels included in the pixel group or the driving subgroup, and hence rendering of the image areas, in which frequency of brightness change in the sub-scanning direction is low, is suitably performed. Further, because the selected brightness is defined, the brightness defined by the frame image signal is defined for at least the pixels corresponding to the selected brightness.

The display device may include that the selected brightness is a target brightness defined by the frame image signal for a specific pixel which is selected from among the pixels included in the pixel group or the driving subgroup, the second image signal does not include data that is written to the pixel selected as the specific pixel in the first image signal, and data that has been written to the pixel selected as the specific pixel is held in the second scanning operation.

According to the above configuration, the selected brightness is a target brightness defined by the frame image signal for a specific pixel which is selected from among the pixels included in the pixel group or the driving subgroup. The second image signal does not include data which is written to the pixel selected as the specific pixel in the first image signal. In the second scanning operation, data that has been written to the pixel selected as the specific pixel is held. Therefore, the target brightness of the pixel selected as the specific pixel in the first image signal matches the selected brightness but the pixel which is selected as the specific pixel is not driven by the liquid crystal driver in the second scanning operation and is held as is. It is therefore possible to implement pixel driving based on the frame image signal while enabling the high-speed execution of the second scanning operation.

The display device may include that the generation portion generates N second image signals where N is an integer of two or more, the liquid crystal driver executes the second scanning operation, in which scanning across the display surface on a basis of each of the N second image signals is executed, N times in order starting with a first second image signal and ending with an Nth second image signal, a Jth second image signal, on a basis of which a Jth second scanning operation is executed, does not include data that is written to the pixel selected as the specific pixel in a first to a (J−1)th second image signals, where J is an integer of not less than two and not more than N, and data that has been written to the pixel selected as the specific pixel is held in the Jth second scanning operation.

According to the above configuration, the generation portion generates N second image signals where N is an integer of two or more. The liquid crystal driver executes the second scanning operation, in which scanning across the display surface on the basis of each of the N second image signals is executed, N times in order starting with the first second image signal and ending with the Nth second image signal. The Jth second image signal, based on which the Jth second scanning operation is executed, does not include data which is written to the pixel selected as the specific pixel in the first to the (J−1)th second image signals, where J is an integer of not less than two and not more than N. In the Jth second scanning operation, data that has been written to the pixel selected as the specific pixel is held. Therefore, since the target brightness of the pixel selected as the specific pixel matches the selected brightness, it is possible to implement pixel driving based on the frame image signal while enabling the high-speed execution of the Jth second scanning operation.

The display device may include that the liquid crystal driver executes, after executing the second scanning operation, a third scanning operation in which scanning across the display surface on a basis of the frame image signal is executed.

According to the above configuration, the liquid crystal driver executes a third scanning operation in which scanning across the display surface on the basis of the frame image signal is executed, after executing the second scanning operation. The equivalent brightness is configured on the basis of the selected brightness, and hence, the pixel for which the selected brightness matches the target brightness should reach the target brightness. However, in a case where the pixel is not driven and held as is, while the pixel is being held, it is possible that the brightness of the pixel varies from the target brightness due to the effect of liquid crystal coupling or the like. Therefore, by executing the third scanning operation in which scanning across the display surface on the basis of the frame image signal is executed, each of the pixels can be reliably driven toward the target brightnesses defined by the frame image signal for each of the pixels included in the pixel group or driving subgroup.

The display device may include that the equivalent brightness is configured on a basis of an average brightness obtained by averaging target brightnesses defined by the frame image signal for each of the pixels included in the pixel group or the driving subgroup.

According to the above configuration, the equivalent brightness is configured on the basis of an average brightness obtained by averaging the target brightnesses defined by the frame image signal for each of the pixels included in the pixel group or driving subgroup, and hence rendering of the image areas, in which frequency of brightness change in the sub-scanning direction is low, is suitably performed. Further, because the average brightness is defined, a brightness is defined which does not deviate greatly from the target brightness defined by the frame image signal for all the pixels included in the group.

The display device may include that the liquid crystal driver executes, after executing the second scanning operation, a third scanning operation in which scanning across the display surface on a basis of the frame image signal is executed.

According to the above configuration, the liquid crystal driver executes a third scanning operation in which scanning across the display surface on the basis of the frame image signal is executed, after executing the second scanning operation. The equivalent brightness is configured on the basis of the average brightness, and therefore the brightness of the pixels included in the pixel group or driving subgroup is close to the average brightness but does not match the target brightness defined by the frame image signal for each of the pixels included in the pixel group or driving subgroup. Therefore, by executing the third scanning operation in which scanning across the display surface on the basis of the frame image signal is executed, each of the pixels can be reliably driven toward the target brightnesses defined by the frame image signal for each of the pixels included in the pixel group or driving subgroup.

The display device may include that the frame image signal includes a preceding image signal for displaying a preceding frame image which is displayed beforehand, and a subsequent image signal for displaying a subsequent frame image which is displayed after the preceding frame image, a brightness, which is obtained by averaging target brightnesses defined by the frame image signal for each of the pixels in the pixel group, is defined as an average brightness, a brightness, which is selected from among the target brightnesses defined by the frame image signal for each of the pixels in the pixel group, is defined as a selected brightness, and the generation portion: determines the driving brightness based on the average brightness or the selected brightness which is configured on a basis of the preceding image signal, and based on the average brightness or the selected brightness which is configured on a basis of the subsequent image signal; determines the driving brightness so as to be smaller than the average brightness or the selected brightness which is configured on a basis of the subsequent image signal, in a case where the average brightness or the selected brightness which is configured on a basis of the preceding image signal is greater than the average brightness or the selected brightness which is configured on a basis of the subsequent image signal; and determines the driving brightness so as to be greater than the average brightness or the selected brightness which is configured on a basis of the subsequent image signal, in a case where the average brightness or the selected brightness which is configured on a basis of the preceding image signal is smaller than the average brightness or the selected brightness which is configured on a basis of the subsequent image signal.

According to the above configuration, the frame image signal includes a preceding image signal for displaying a preceding frame image which is displayed beforehand, and a subsequent image signal for displaying a subsequent frame image which is displayed after the preceding frame image. A brightness, which is obtained by averaging the target brightnesses defined by the frame image signal for each of the pixels in the pixel group, is defined as an average brightness. A brightness, which is selected from among the target brightnesses defined by the frame image signal for each of the pixels in the pixel group, is defined as a selected brightness. The generation portion determines the driving brightness based on the average brightness or the selected brightness which is configured on the basis of the preceding image signal, and based on the average brightness or the selected brightness which is configured on the basis of the subsequent image signal. The generation portion determines the driving brightness so as to be smaller than the average brightness or the selected brightness configured on the basis of the subsequent image signal, in a case where the average brightness or the selected brightness which is configured on the basis of the preceding image signal is greater than the average brightness or the selected brightness which is configured on the basis of the subsequent image signal. Further, the generation portion determines the driving brightness so as to be greater than the average brightness or the selected brightness configured on the basis of the subsequent image signal, in a case where the average brightness or the selected brightness which is configured on the basis of the preceding image signal is smaller than the average brightness or the selected brightness configured on the basis of the subsequent image signal. Therefore, the pixel can approach the desired brightness relatively promptly.

The display device may include that the generation portion determines the driving brightness on a basis of an expected value for a brightness achieved by the pixel when a scanning operation is started by the liquid crystal driver.

According to the above configuration, the generation portion determines the driving brightness on the basis of an expected value for a brightness achieved by the pixel when the scanning operation is started by the liquid crystal driver. Hence, suitable liquid crystal driving is performed by means of a scanning operation in which a driving brightness is configured taking into consideration the brightness which the pixel has achieved.

In another general aspect, the video viewing system of the instant application includes a display device which displays a left eye frame image created for viewing by a left eye and a right eye frame image created for viewing by a right eye to provide an image that is perceived in three dimensions; and a glasses device which includes a left eye filter that adjusts a light amount reaching the left eye so that the left eye frame image is viewed, and a right eye filter that adjusts a light amount reaching the right eye so that the right eye frame image is viewed. The display device may include: a liquid crystal panel which has a display surface including a plurality of pixels arranged in a matrix in a main scanning direction and a sub-scanning direction, and displays an image perceived in three dimensions on the display surface by switching alternately over time between the left eye frame image created for viewing by the left eye and the right eye frame image created for viewing by the right eye; a generation portion which generates a first image signal and a second image signal on a basis of a frame image signal for displaying the left eye frame image or the right eye frame image, the first image signal rendering an image of a lower resolution than the frame image signal and including data that is to be written to all the pixels of the display surface, the second image signal including data that is to be written to a part of the pixels among the pixels of the display surface and not including data that is to be written to remaining pixels other than the part of the pixels; and a liquid crystal driver which executes, after executing a first scanning operation in which scanning across the display surface on a basis of the first image signal is executed, at least once a second scanning operation in which scanning across the display surface on a basis of the second image signal is executed, to drive the liquid crystal pane. The data that has been written to the remaining pixels is held in the second scanning operation.

According to the above configuration, the display device displays a left eye frame image that has been created for viewing by the left eye and a right eye frame image that has been created for viewing by the right eye. The left eye filter of the glasses device adjusts the amount of light that reaches the left eye so that the left eye frame image is viewed. The right eye filter of the glasses device adjusts the amount of light that reaches the right eye so that the right eye frame image is viewed. The liquid crystal panel alternately switches between the left eye frame image and the right eye frame image over time to display on the display surface. The viewer is therefore able to perceive the image provided by the display device in three dimensions.

The display surface of the liquid crystal panel includes a plurality of pixels which are arranged in a matrix in the main scanning direction and sub-scanning direction. The generation portion generates a first image signal and a second image signal on the basis of a frame image signal for displaying a left eye frame image or a right eye frame image. The first image signal renders an image of a lower resolution than the frame image signal, and includes data that is to be written to all the pixels of the display surface. The second image signal includes data that is to be written to a part of the pixels of the display surface, and does not include data that is to be written to remaining pixels other than the part of the pixels.

The liquid crystal driver executes a first scanning operation in which scanning across the display surface on the basis of the first image signal, rendering an image of a lower resolution than the frame image signal and including data that is to be written to all the pixels of the display surface, is executed. Further, after executing the first scanning operation, the liquid crystal driver executes, at least once, a second scanning operation in which scanning across the display surface on the basis of the second image signal, including data that is to be written to a part of the pixels among the pixels of the display surface and not including data that is to be written to the remaining pixels other than the part of the pixels, is executed. In the second scanning operation, data that has been written to the remaining pixels is held.

In general, crosstalk in image areas, in which frequency of brightness change in the sub-scanning direction is low, is easy for the viewer to perceive, and crosstalk in image areas, in which frequency of brightness change in the sub-scanning direction is high, is hard for the viewer to perceive. Here, the first image signal in the first scanning operation includes data which is to be written to all the pixels of the display surface, but since an image of a lower resolution than the frame image signal is rendered, the first scanning operation is performed at high speed, and hence the driving of the pixels of the whole display surface is carried out promptly. Further, the second image signal in the second scanning operation includes data which is to be written to a part of the pixels among the pixels of the display surface and does not include data which is to be written to the remaining pixels other than the part of the pixels, and in the second scanning operation, data that has been written to the remaining pixels is held. Thus, the second scanning operation can also be executed at high speed. Therefore, the rendering of image areas, in which frequency of brightness change in the sub-scanning direction is low, is achieved promptly by the first scanning operation and the second scanning operation. Hence, the viewer barely notices crosstalk between the left eye frame image and the right eye frame image.

As described above, the display device and the video viewing system according to the present disclosure are capable of suppressing crosstalk between a preceding frame image and a subsequent frame image.

INDUSTRIAL APPLICABILITY

The present disclosure is suitable as a display device and a video viewing system which are capable of reducing crosstalk.

The invention claimed is:
1. A display device, comprising:
a liquid crystal panel which has a display surface including a plurality of pixels arranged in a matrix in a main scanning direction and a sub-scanning direction, and which displays frame images on the display surface by switching the frame images over time;
a generation portion which generates a first image signal and a second image signal on a basis of a frame image signal for displaying the frame images, the first image signal rendering an image of a lower resolution than the frame image signal and including data that is to be written to all the pixels of the display surface, the second image signal including data that is to be written to a part of the pixels among the pixels of the display surface and not including data that is to be written to remaining pixels other than the part of the pixels; and
a liquid crystal driver which executes, after executing a first scanning operation in which scanning across the display surface on a basis of the first image signal is executed, at least once a second scanning operation in which scanning the part of the pixels across the display surface and holding data that has been written to the remaining pixels on a basis of the second image signal is executed, to drive the liquid crystal panel, and which executes, after executing the second scanning operation, a third scanning operation in which scanning across the display surface on a basis of the frame image signal is executed,
wherein:
the plurality of pixels included in the display surface are divided into a plurality of pixel groups each including at least four pixels arranged adjacently in the sub-scanning direction,
the generation portion generates, as the first image signal, a signal which includes write data for configuring, for each of the pixel groups, an equivalent brightness common to the at least four pixels included in the pixel group as a first driving brightness,
the liquid crystal driver which executes the first scanning operation simultaneously drives, for each of the pixel groups, each of the at least four pixels included in the pixel group toward the first driving brightness,
each of the plurality of pixel groups is further divided into a plurality of subgroups, each of which includes at least two pixels,
the generation portion generates, as the second image signal, a signal which includes write data for configuring, as a second driving brightness, an equivalent brightness common to the at least two pixels included in a driving subgroup which is a part of the subgroup included in the pixel group, and does not include data that is written to pixels included in a subgroup other than the driving subgroup,
the liquid crystal driver which executes the second scanning operation simultaneously drives, for each of the driving subgroups, the at least two pixels which are included in the driving subgroup toward the second driving brightness,
the generation portion configures, as the first driving brightness, the equivalent brightness on a basis of an average brightness obtained by averaging a target brightness defined by the frame image signal, for each of the at least two pixels included in a specific subgroup which is a subgroup selected from the plurality of subgroups included in the pixel group, and
the generation portion configures the first driving brightness for at least one subgroup other than the specific subgroup selected at a time of configuring the first driving brightness to be the driving subgroup, and configures, as the second driving brightness, the equivalent brightness on a basis of an average bright- ness obtained by averaging the target brightness defined by the frame image signal, for each of the at least two pixel pixels included in the driving subgroup.

2. The display device according to claim 1, wherein the frame images include a left eye frame image which is created for viewing by a left eye, and a right eye frame image which is created for viewing by a right eye, the generation portion generates the first image signal and the second image signal on a basis of the frame image signal for displaying the left eye frame image or the right eye frame image, and the liquid crystal panel displays an image that is perceptible in three dimensions on the display surface by switching alternately over time between the left eye frame image and the right eye frame image.

* * * * *